US 6,606,981 B2

(12) United States Patent
Itoyama

(10) Patent No.: US 6,606,981 B2
(45) Date of Patent: Aug. 19, 2003

(54) DIESEL ENGINE CONTROL

(75) Inventor: Hiroyuki Itoyama, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/842,117

(22) Filed: Apr. 26, 2001

(65) Prior Publication Data

US 2001/0045210 A1 Nov. 29, 2001

(30) Foreign Application Priority Data

May 12, 2000 (JP) ...................... 2000-139929

(51) Int. Cl.⁷ .............................................. F02M 25/07
(52) U.S. Cl. .................. 123/568.21; 60/605.2
(58) Field of Search ................. 123/568.11, 568.12, 123/568.21; 60/605.2, 602; 701/108

(56) References Cited

U.S. PATENT DOCUMENTS

| 6,035,639 A | 3/2000 | Kolmanovsky et al. |
| 6,247,311 B1 * | 6/2001 | Itoyama et al. ............... 60/602 |
| 6,305,167 B1 * | 10/2001 | Weisman et al. ...... 123/568.12 |

FOREIGN PATENT DOCUMENTS

| EP | 0 965 740 A2 | 12/1999 |
| EP | 1 031 719 A2 | 8/2000 |
| JP | 7-139413 | 5/1995 |
| JP | 8-86251 | 4/1996 |
| JP | 10-288071 | 10/1998 |

OTHER PUBLICATIONS

Shohei Ito et al., "Injection Rate Shaping Technology with Common Rail Fuel System (ECD–U2)", Lecture Papers of the 13$^{th}$ Symposium on the Internal Combustion Engine, pp. 73–77, Jul. 9–11, 1996.

Susumu Kohketsu et al., "EGR System in a Turbocharged Diesel Engine", Japan Institute of Automobile Technology, Oct. 1996.

A.J. Truscott et al., "Simulation of a variable geometry turbocharged diesel engine for control algorithm Development," published by the United Kingdom Institution of Mechanical Engineers (ImechE), pp. 69–77, 1997.

Koji, "Diesel Engine," Patent Abstract of Japan, vol. 1998, No. 11, Sep. 30, 1998, JP 10–169458, Jun. 23, 1998, Abstract.

* cited by examiner

*Primary Examiner*—Mahmoud Gimie
(74) *Attorney, Agent, or Firm*—Foley & Lardner

(57) ABSTRACT

A control unit (41) sets a target opening of a variable nozzle (53) of a turbocharger (50) according to a running condition of a diesel engine (1), and controls the opening of the variable nozzle (53) to the target opening. The control unit (41) calculates a target opening area of an exhaust gas recirculation valve (6) using the target opening of the variable nozzle (53) and a target exhaust gas recirculation amount determined according to the running condition. Control of an exhaust gas recirculation amount is performed according to the variation of turbocharging pressure by using the target opening of the variable nozzle (53) as a parameter representing the differential pressure upstream and downstream of the exhaust gas recirculation valve (6).

12 Claims, 46 Drawing Sheets

DIESEL ENGINE CONTROL

FIELD OF THE INVENTION

This invention relates to control of a diesel engine equipped with a variable capacity turbocharger and an exhaust recirculation device.

BACKGROUND OF THE INVENTION

Tokkai Hei 7-139413 published by the Japanese Patent Office in 1995 discloses a control method of a diesel engine equipped with a turbocharger and an exhaust gas recirculation (EGR) device. The EGR device comprises an EGR valve which regulates an EGR amount. The control method determines a turbocharging region and an EGR region according to a load and rotation speed of the engine.

"Simulation of a variable geometry turbocharged-diesel engine for control algorithm development", C524/127/97 published by the United Kingdom Institution of Mechanical Engineers (IMechE) in 1997 discloses a control method for controlling the EGR amount and an opening of a variable nozzle of the turbocharger in a transient state of the diesel engine.

"EGR System in a Turbocharged Diesel Engine", pp. 193–196, Technical Preprints, published by the Japan Institute of Automobile Technology in October, 1996, discloses control of the EGR amount of the EGR device by varying the opening area of the variable nozzle of the turbocharger.

SUMMARY OF THE INVENTION

In some of the prior art techniques, when the EGR amount is varied, the supercharging pressure of the turbocharger is maintained constant, and when the variation of turbocharging pressure is performed, the EGR amount is maintained constant.

However, when the EGR amount is varied, the turbocharging pressure will vary, and when the turbocharging pressure is varied, the EGR amount will also vary because the exhaust pressure varies. That is, the turbocharging pressure and the EGR amount affect each other. Therefore, if it is attempted to keep the turbocharging pressure constant when varying the EGR amount, the opening of the variable nozzle of the turbocharger must be readjusted. Moreover, if it is attempted to keep the EGR amount constant when the turbocharging pressure is varied, the opening of the EGR valve must be readjusted.

This control works effectively when the engine is operated in a steady state, but it does not work well in the transient state when running conditions of the engine vary. Further, if the opening of the variable nozzle and the opening of the EGR valve are changed simultaneously, the change in one of the turbocharging pressure and EGR amount may result in a disturbance in the control of the other.

In a diesel engine, the turbocharging pressure and the EGR amount affect the amount of noxious substances in the exhaust gas, so both the turbocharging pressure and the EGR amount must be controlled to optimum values in order to reduce the amount of noxious substances. However, it is difficult to control the EGR amount and the turbocharging pressure to optimum values for the above-mentioned reason, especially in the transient state of the engine.

It is therefore an object of this invention to precisely control the EGR amount according to the turbocharging pressure based on a differential pressure upstream and downstream of the EGR valve and the EGR amount as parameters.

In order to achieve the above objects, this invention provides a control device for an engine. The engine comprises an intake passage, an exhaust passage and a turbocharger having an exhaust gas turbine in the exhaust passage, and an exhaust gas recirculation valve which recirculates part of an exhaust gas in the exhaust passage upstream of the exhaust gas turbine to the intake passage. The turbocharger turbocharges an intake air in the intake passage according to a rotation of an exhaust gas turbine, and the exhaust gas turbine has an adjusting mechanism of a cross-sectional area of an exhaust gas flow in the exhaust gas turbine.

The control device comprises a sensor which detects a running condition of the engine, a sensor which detects the cross-sectional area, and a microprocessor programmed to determine a target recirculation amount of the exhaust gas recirculation valve according to the running condition, calculate a target control value of the exhaust gas recirculation valve based on the target recirculation amount and the cross-sectional area, and control the exhaust gas recirculation valve according to the target control value.

This invention also provides a control device comprising a mechanism for detecting a running condition of the engine, a mechanism for detecting the cross-sectional area, a mechanism for determining a target recirculation amount of the exhaust gas recirculation valve according to the running condition, a mechanism for calculating a target control value of the exhaust gas recirculation valve based on the target recirculation amount and the cross-sectional area, and a mechanism for controlling the exhaust gas recirculation valve according to the target control value.

This invention also provides control method for an engine comprising the steps of detecting a running condition of the engine, detecting the cross-sectional area, determining a target recirculation amount of the exhaust gas recirculation calculating a target control value of the exhaust gas recirculation valve based on the target recirculation amount and the cross-sectional area, and controlling the exhaust gas recirculation valve according to the target control value.

The details as well as other features and advantages of this invention are set forth in the remainder of the specification and are shown in the accompanying drawings.

DESCRIPTION OF THE PREFERRED EMBODIMENTS

Figure 1:
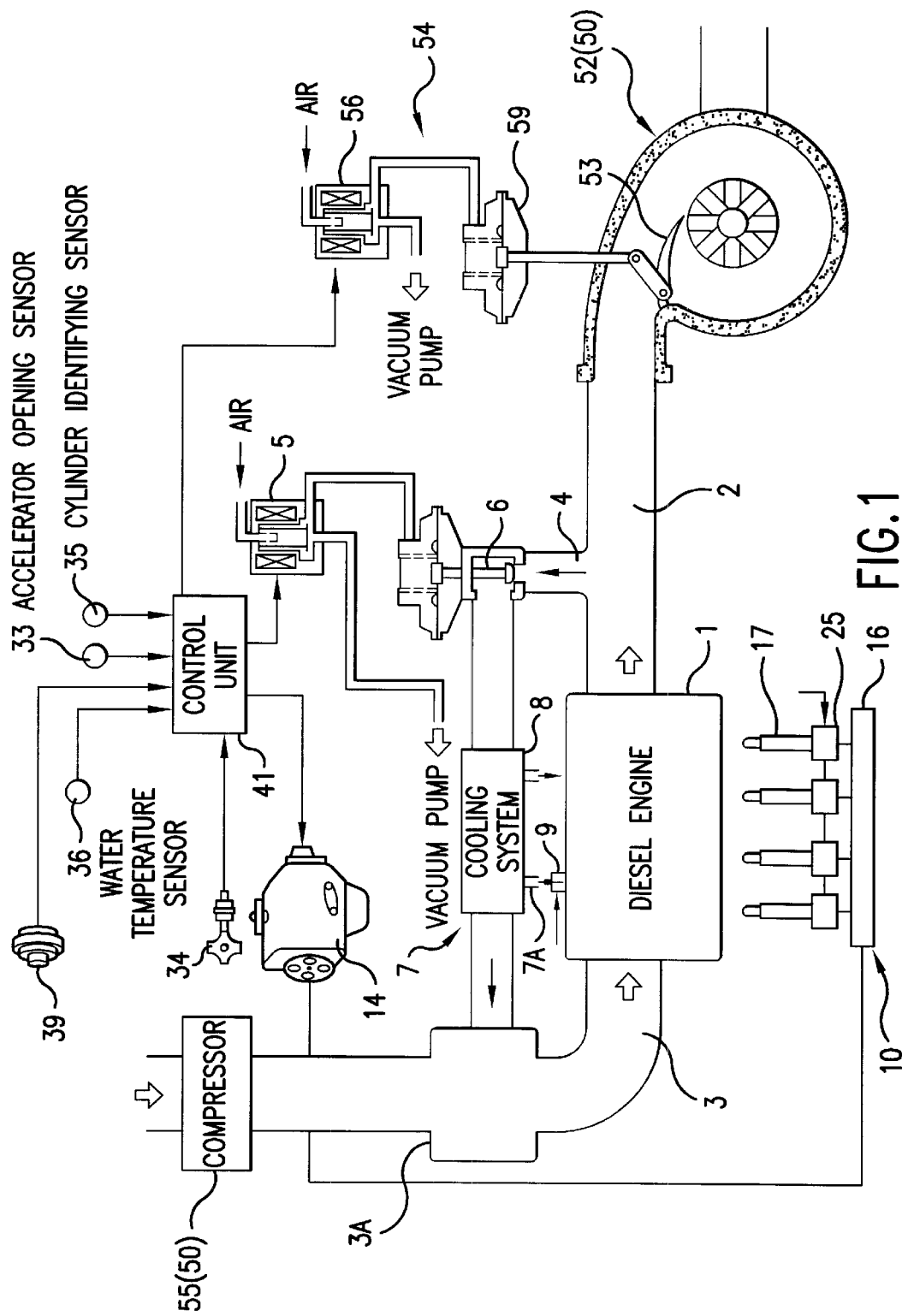
FIG. 1 is a schematic diagram of a control device for a diesel engine according to this invention.

Referring to FIG. 1 of the drawings, a diesel engine 1 comprises an intake passage 3 and exhaust passage 2. The diesel engine 1 is a multi cylinder diesel engine so constructed that the pattern of heat release is single stage combustion due to performing low temperature pre-mixture combustion. Such a diesel engine is disclosed by Tokkai Hei 8-86251 published by the Japanese Patent Office in 1999. Intake air of the intake air passage 3 is supplied to each cylinder of the diesel engine 1 via a collector 3A.

A swirl control valve is provided in an intake port leading from the intake passage 3 to each cylinder. When the diesel engine 1 is running at low rotation speed on low load, the swirl control valve closes part of the passage and sets up a swirl in the flow of air flowing into the combustion chamber of the diesel engine 1.

The combustion chamber comprises a large diameter toroidal combustion chamber. This is a combustion chamber wherein a cylindrical cavity of the same diameter is formed on a piston from a cap surface to a base. A conical part is formed at the base of the cavity. As a result, resistance to the swirl flowing in from the outside of the cavity is reduced, and mixing of air and fuel is promoted. Also, due to the shape of the cavity, the swirl diffuses from the center of the cavity to the outside as the piston descends.

The diesel engine 1 comprises a common rail type fuel injection mechanism 10.

Figure 2:
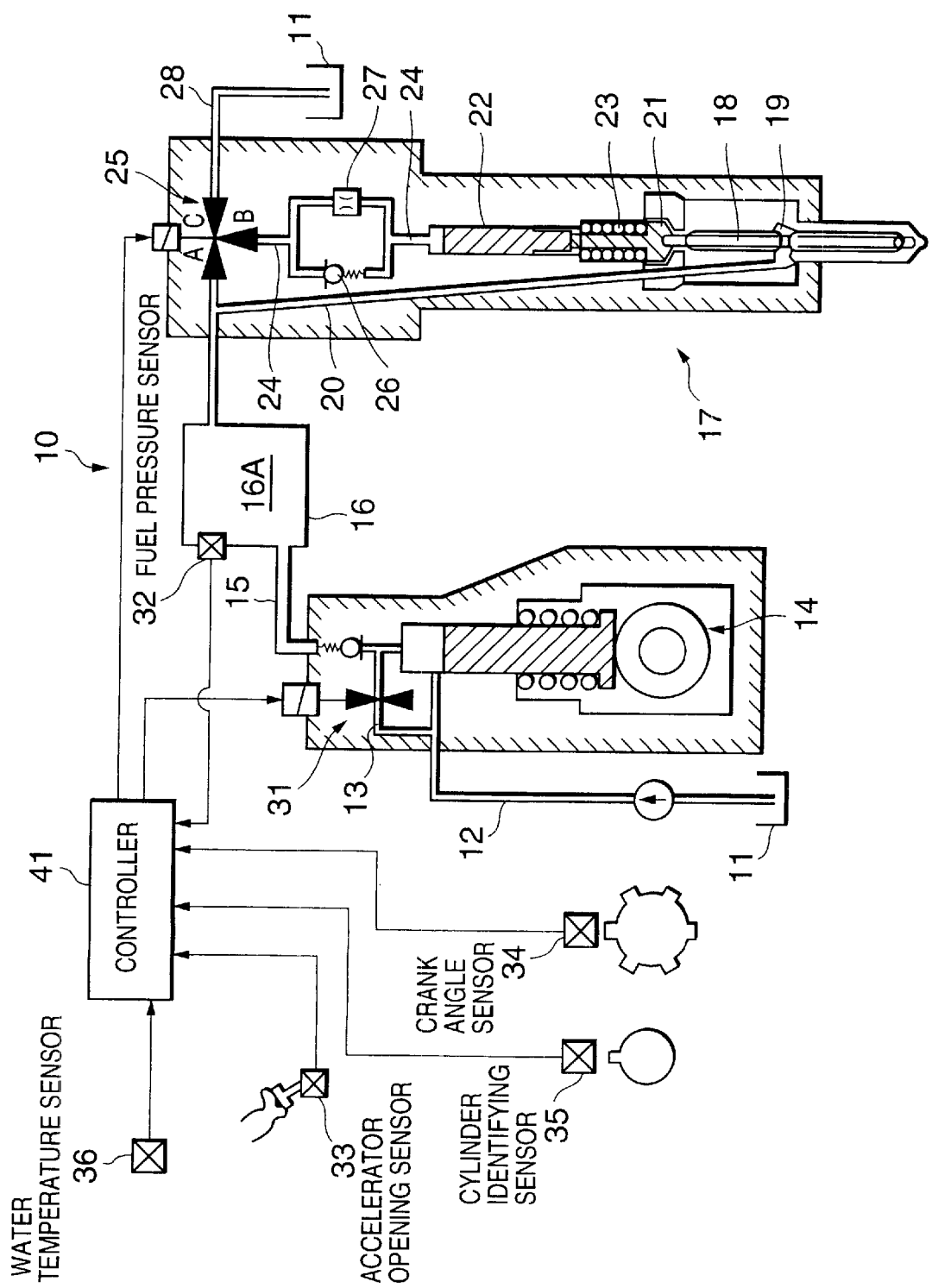
FIG. 2 is a schematic diagram of a common rail fuel injection mechanism with which the diesel engine is provided.

Referring to FIG. 2, a fuel injection mechanism 10 comprises a fuel tank 11, fuel supply passage 12, supply pump 14, pressure accumulating chamber 16A formed in a common rail 16, and a nozzle 17 which is provided for every cylinder. After the fuel supplied from the supply pump 14 is stored in a pressure accumulator 16A via a high pressure fuel passage 15, it is distributed to each of the nozzles 17.

The nozzle 17 comprises a needle valve 18, nozzle chamber 19, fuel passage 20 to the nozzle chamber 19, retainer 21, hydraulic piston 22, return spring 23, fuel passage 24 which leads high pressure fuel to the hydraulic piston 22, and three-way solenoid valve 25 interposed in the fuel passage 24. A check valve 26 and an orifice 27 are also provided in parallel in the fuel passage 24. The return spring 23 pushes the needle valve 18 in the closing direction of the lower part of the figure via the retainer 21. The hydraulic piston 22 comes in contact with the upper edge of the retainer 21.

The three-way valve 25 comprises a port A connected to the pressure accumulating chamber 16A, port B connected to the fuel passage 24 and port C connected to a drain 28. When the three-way valve 25 is OFF, ports A and B are connected and ports B and C are shut off. As a result, the fuel passages 20 and 24 are connected, and high pressure fuel is led to both the upper part of the hydraulic piston 22 and the nozzle chamber 19 from the pressure accumulating chamber 16A. As the pressure-receiving surface area of the hydraulic piston 22 is larger than the pressure-receiving surface area of the needle valve 18, in this state, the needle valve 18 sits in the valve seat, and the nozzle 17 is thereby closed.

In the state where the three-way valve 25 is ON, the ports A and B are shut off, and the ports B and C are connected. Consequently, the fuel pressure of the fuel passage 24 which pushes the hydraulic piston 22 downward is released to the fuel tank 11 via the drain 28, the needle valve 18 lifts due to the fuel pressure of the nozzle chamber 19 which acts on the needle valve 18 in an upward direction, and the fuel of the nozzle chamber 19 is injected from the hole at the end of the nozzle 17. If the three-way valve 25 is returned to the OFF state, the fuel pressure of the pressure accumulating chamber 16A again acts downward on the hydraulic piston 22, the needle valve 18 sits in the valve seat, and fuel injection is terminated.

That is, fuel injection start timing is adjusted by the change-over timing from OFF to ON of the three-way valve 25, and fuel injection amount is adjusted by the duration of the ON state. Therefore, if the pressure of the pressure accumulating chamber 16A is the same, the fuel injection amount increases the longer the ON time of the three-way valve 25.

Further, to adjust the pressure of the pressure accumulating chamber 16A, the fuel injection mechanism 10 comprises a return passage 13 which returns the surplus fuel discharged by the supply pump 14 to the fuel supply passage 12. The return passage 13 is provided with a pressure regulating valve 31. The pressure regulating valve 31 opens and closes the return passage 13, and adjusts the pressure of the pressure accumulating chamber 16A by varying the fuel injection amount to the pressure accumulating chamber 16A.

The fuel pressure of the pressure accumulating chamber 16A is equal to the fuel injection pressure of the nozzle 17, and the fuel injection rate is higher the higher the fuel pressure of the pressure accumulating chamber 16. The three-way valve 25 and the pressure regulating valve 31 function according to the input signal from a control unit 41.

The above construction of the fuel injection mechanism 10 is disclosed and known from pp. 73–77, Lecture Papers of the 13th Symposium on the Internal Combustion Engine.

Now, referring again to FIG. 1, after the exhaust gas in the exhaust passage 2 drives an exhaust gas turbine 52 of a variable capacity turbocharger 50, it is discharged into the atmosphere. The variable capacity turbocharger 50 comprises the exhaust gas turbine 52 and a compressor 55 which compresses air by the rotation of the exhaust gas turbine 52. The compressor 55 is provided in the middle of the intake passage 3, and the intake passage 3 supplies air compressed by the compressor 55 to the diesel engine 1. A variable nozzle 53 driven by a pressure actuator 54 is provided at an inlet to the exhaust gas turbine 52.

The pressure actuator 54 comprises a diaphragm actuator 59 which drives the variable nozzle 53 according to a signal pressure, and a pressure control valve 56 which generates the signal pressure according to a signal input from the control unit 41.

The control unit 41 controls the variable nozzle 53 to reduce the nozzle opening when the rotation speed of the diesel engine 1 is low. As a result, the flow velocity of exhaust gas introduced to the exhaust gas turbine 52 is increased so that a predetermined supercharging pressure is attained. On the other hand, the control unit 41 controls the variable nozzle 53 to fully open, when the rotation speed of the diesel engine 1 is high, in order to introduce exhaust gas into the exhaust gas turbine 52 without resistance.

When the air-fuel mixture is burnt in the diesel engine 1, noxious nitrogen oxides (NOx) are formed. The NOx amount largely depends on the combustion temperature, and the generation amount of NOx can be suppressed by making the combustion temperature low. This diesel engine 1 reduces the oxygen concentration in the combustion chamber by exhaust recirculation (EGR), and thereby realizes low-temperature combustion. For this purpose, the diesel engine 1 comprises an exhaust gas recirculation (EGR) passage 4 which connects the exhaust passage 2 upstream of the exhaust gas turbine 52 and a collector 3A of the intake passage 3. The EGR passage 4 is provided with a diaphragm type exhaust gas recirculation (EGR) valve 6 which responds to a control negative pressure provided from a negative pressure control valve 5 and a cooling system 7.

The negative pressure control valve 5 generates a negative pressure in response to a duty signal input from the control unit 41, and thereby varies the rate of exhaust gas recirculation (EGR rate) via the EGR valve 6.

For example, in the low rotation speed, low load range of the diesel engine 1, the EGR rate is a maximum 100 percent, and as the rotation speed and load of the diesel engine 1 increase, the EGR rate is decreased. On high load, since the exhaust gas temperature is high, intake air temperature will rise if a large amount of EGR is performed. If the intake air temperature rises, NOx will no longer decrease, the ignition delay of injected fuel becomes shorter, and it becomes impossible to achieve pre-mixture combustion. Therefore, the EGR rate is made to decrease in stages as the rotation speed and load of the diesel engine 1 increase.

The cooling system 7 leads part of the engine cooling water to a water jacket 8 surrounding the EGR passage 4, and cools the recirculated exhaust gas in the EGR passage 4. A cooling water inlet 7A of the water jacket 8 is provided with a flow control valve 9 which adjusts the recirculating amount of cooling water according to a signal from the control unit 41.

A pressure regulating valve 31, the three-way valve 25, the negative pressure control valve 5, a step motor 54 and the flow control valve 9 are respectively controlled by signals from the control unit 41. The control unit 41 comprises a microcomputer equipped with a central processing unit (CPU), random access memory (RAM), read-only memory (ROM) and input/output interface (I/O interface).

Signals corresponding to detection values are input to the control unit 41 from a pressure sensor 32 which detects a fuel pressure of the pressure accumulating chamber 16A, an accelerator opening sensor 33 which detects an opening Cl of a vehicle accelerator pedal, a crank angle sensor 34 which detects a rotation speed Ne and crank angle of the diesel engine 1, a cylinder identifying sensor 35 which identifies cylinders of the diesel engine 1, a water temperature sensor 36 which detects a cooling water temperature Tw of the diesel engine 1, and an air flow meter 39 which detects an intake air flowrate of the intake passage 3 upstream of the compressor 55.

Based on the rotation speed of the diesel engine 1 and accelerator opening, the control unit 41 calculates a target fuel injection amount of the nozzle 17 and target pressure of the pressure accumulating chamber 16A. The fuel pressure of the pressure accumulating chamber 16A is feedback controlled by opening and closing the pressure regulating valve 31 so that the actual pressure of the pressure accumulating chamber 16A detected by the pressure sensor 32 coincides with the target pressure.

The control unit 41 also controls an ON time of the three-way valve 25 according to the calculated target fuel injection amount, and a fuel injection start timing in response to the running conditions of the diesel engine 1 by the change-over timing to ON of the three-way valve 25. For example, when the diesel engine 1 is in a low rotation speed, low load state under a high EGR rate, the fuel injection start timing is delayed near top dead center (TDC) of the piston so that the ignition delay of injected fuel is long. Due to this delay, the combustion chamber temperature at the time of ignition is lowered, and the generation of smoke due to the high EGR rate is suppressed by increasing the pre-mixture combustion ratio. On the other hand, the injection start timing is advanced as the rotation speed and load of the diesel engine 1 increase. This is due to the following reason. Specifically, even if the ignition delay period is constant, the ignition delay crank angle obtained by converting the ignition delay period increases in proportion to the increase in engine speed. Therefore, in order to fire the injected fuel at a predetermined crank angle, the injection start timing needs to be advanced at high rotation speed.

The control unit 41 also controls the turbocharging pressure and EGR amount.

If the EGR amount is varied, as already stated, the turbocharging pressure will also vary. Conversely if the turbocharging pressure is varied, as the exhaust gas pressure varies, the EGR amount varies. Therefore, the turbocharging pressure and EGR amount cannot be controlled independently, and may cause an external control disturbance to each other.

If it is attempted to keep the turbocharging pressure constant when changing the EGR amount, the opening of the variable nozzle 53 of the turbocharger 50 must be readjusted. Also, if it is attempted to keep the EGR amount constant when changing the turbocharging pressure, the opening of the EGR valve 6 must be readjusted. In such a method, it is difficult to ensure control precision during a transient state of the engine 1.

A control unit 41 according to this invention calculates a target intake air amount tQac of an intake passage 3 according to vehicle running conditions, and sets a target opening Rvnt of a variable nozzle 53, which is an operating target value of a turbocharger 50, from a target intake air amount tQac, real EGR amount Qec of an EGR passage 4, and EGR rate Megrd of intake air passing through an intake valve of a diesel engine 1. The EGR rate Megrd is also referred to as a real EGR rate. A duty value Dtyvnt applied to a pressure control valve 56 is then determined using the routine shown in FIG. 15, and a corresponding command signal is output to the pressure control valve 56 so that the variable nozzle 53 attains the target opening Rvnt. In this way, the control unit 41 controls a turbocharging pressure of the turbocharger 50.

The control unit 41 also sets a target EGR amount Tqec based on a target EGR rate Megr and the running conditions of the vehicle. Further, a target EGR valve opening area Aev is calculated using the routine shown in FIG. 5 from the target EGR amount Tqec and a delay processing value RVNTE of the target opening Rvnt of the variable nozzle 53 of the turbocharger 50 and outputs a corresponding signal to the pressure control valve 5. In this way, the control unit 41 performs EGR control corresponding to the turbocharging pressure.

The above control performed by the control unit 41 will be described referring to the flowcharts. Of all the routines shown in the flowcharts, independent routines are performed at intervals which are described separately below, and subroutines are performed at the execution intervals of the parent routines.

FIG. 3, FIG. 4 and FIGS. 8–14 are known from Tokkai Hei 10-288071 published by the Japanese Patent Office in 1998.

The routine for calculating common parameters used for control of turbocharging pressure and the EGR amount will first be described. The common parameters are a target fuel injection amount Qsol of a fuel injection device 10, a target EGR rate Megr of the EGR valve 6, a time constant equivalent value Kkin, a real EGR rate Megrd and a real intake air amount Qac. The time constant equivalent value Kkin is a value representing an EGR control delay due to a collector 3A interposed between the EGR valve 6 and the intake valve of the diesel engine 1. The real EGR rate Megrd shows the EGR rate of the intake air which passes through the intake valve of the diesel engine 1. The real EGR rate Megrd varies with a first order delay relative to the target EGR rate Megr. The calculation of these parameters is performed independently of the turbocharging pressure control routine, and the EGR amount control routine.

Figure 3:
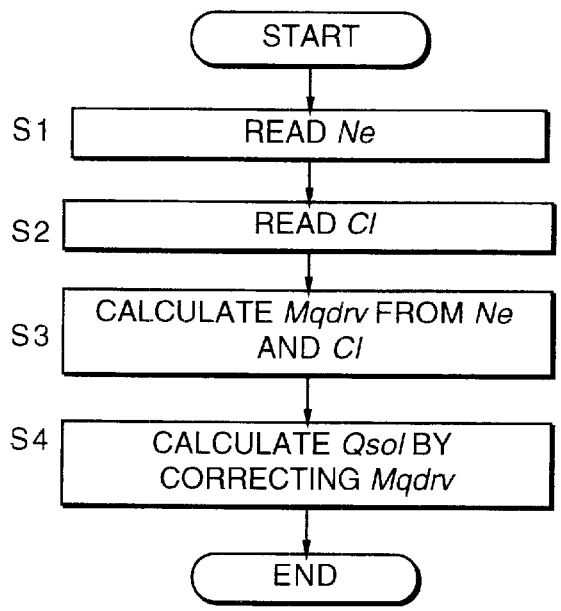
FIG. 3 is a flowchart describing a routine for calculating a target fuel injection amount Qso/performed by a control unit according to this invention.

First, referring to FIG. 3, the routine for calculating the target fuel injection amount Qsol will be described. This routine is performed in synchronism with a REF signal output by the crank angle sensor 34 for each reference position of the combustion cycle of each cylinder. In the case of a four-stroke cycle engine, the REF signal is output every 180 degrees for a four cylinder engine, and every 120 degrees for a six cylinder engine.

First, in a step S1, the engine speed Ne is read, and in a step S2, the accelerator opening Cl is read.

Figure 4:
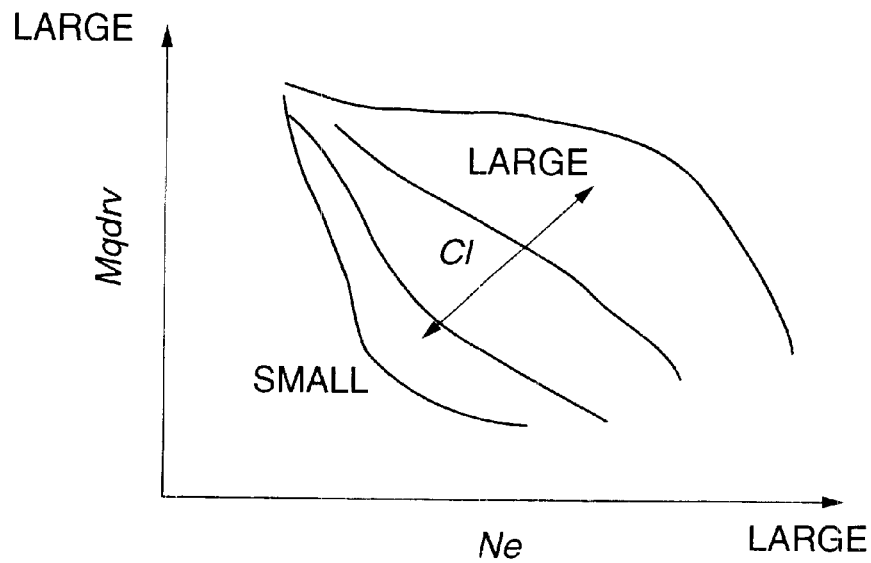
FIG. 4 is a diagram describing the contents of a basic fuel injection amount map stored by the control unit.

In a step S3, a basic fuel injection amount Mqdrv is calculated by looking up a map shown in FIG. 4 based on the engine rotation speed Ne and the accelerator opening Cl. This map is stored beforehand in the memory of the control unit 41.

In a step S4, the target fuel injection amount Qsol is calculated by adding an increase correction based on an engine cooling water temperature Tw, etc., to the basic fuel injection amount Mqdrv.

Figure 11:
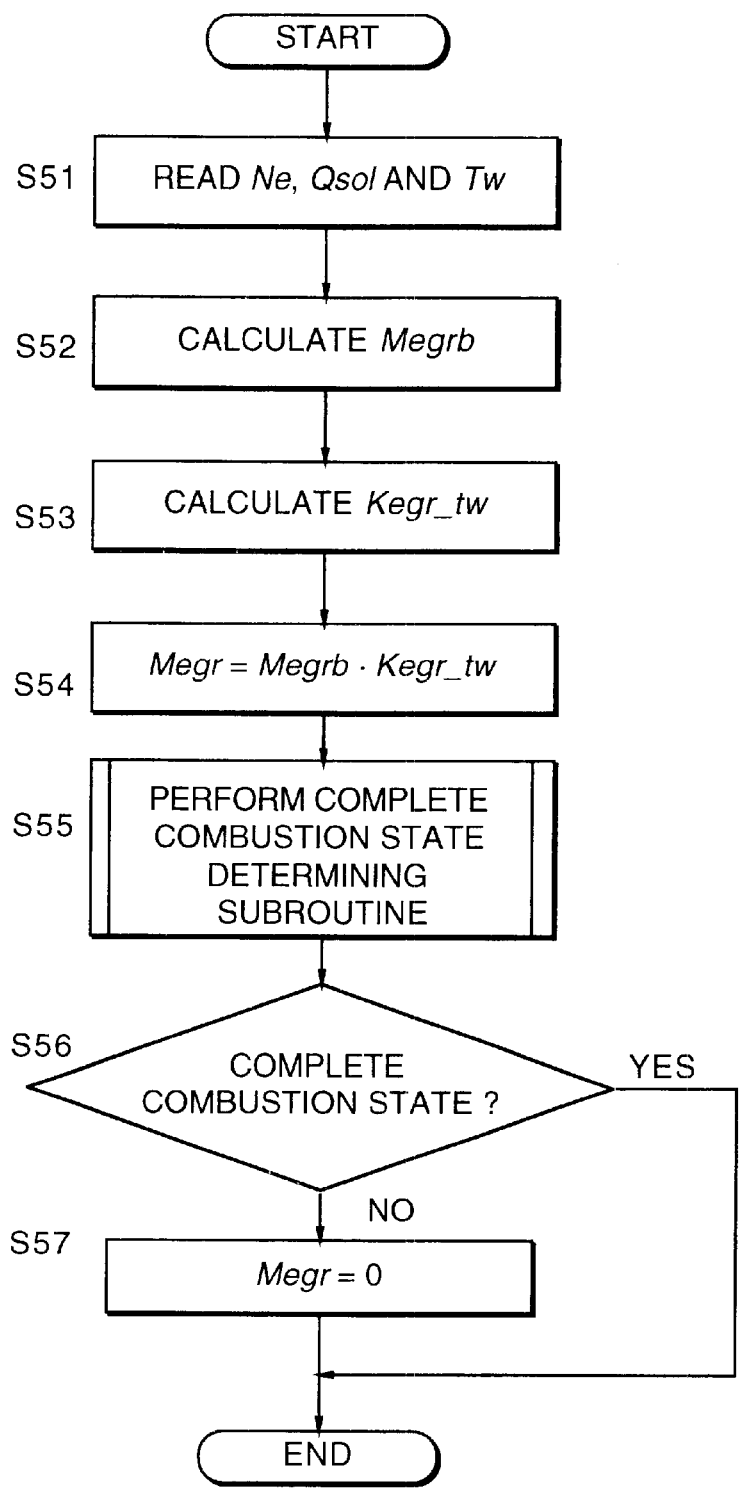
FIG. 11 is a flowchart describing a routine for calculating a target EGR rate Megr performed by the control unit.

Next, referring to FIG. 11, a routine for calculating the target EGR rate Megr will be described. This routine is also performed in synchronism with the REF signal.

The control unit 41 first reads the engine rotation speed Ne, the target fuel injection amount Qsol and the engine cooling water temperature Tw in a step S51.

Figure 12:
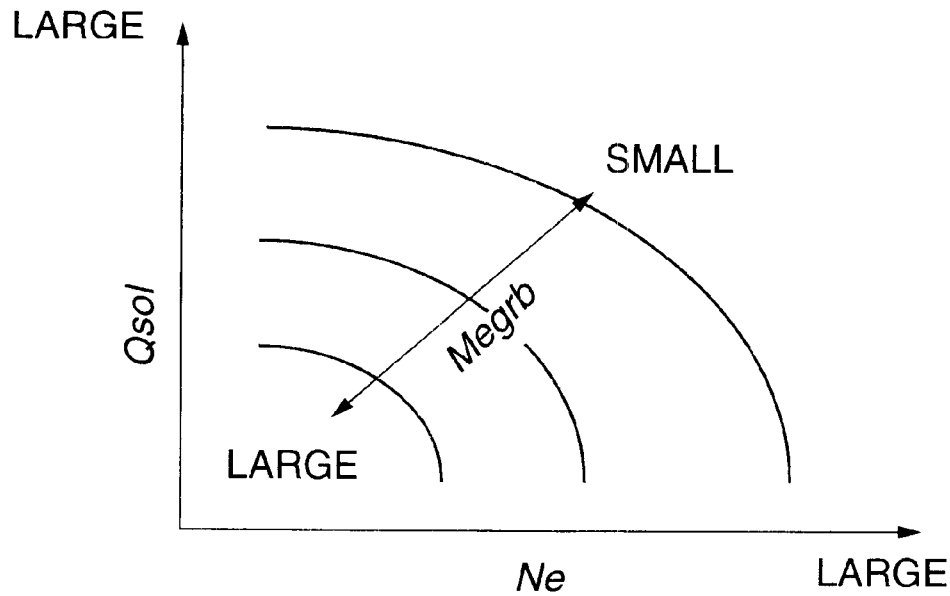
FIG. 12 is a diagram describing the contents of a map of a basic target EGR rate Megrb stored by the control unit.

In a step S52, referring to a map shown in FIG. 12, the basic target EGR rate Megrb is calculated from the engine rotation speed Ne and the target fuel injection amount Qsol. This map is stored beforehand in the memory of the control unit 41. In this map, the basic target EGR rate Megrb is set larger in a region where the operating frequency of the engine is higher. This region corresponds to a region where both the rotation speed Ne and the load are small. In this map, the load is represented by the target fuel injection amount Qsol . . . When the engine output is high, smoke tends to be generated, so in such a region, the basic target EGR rate Megrb is set to have small values.

Figure 13:
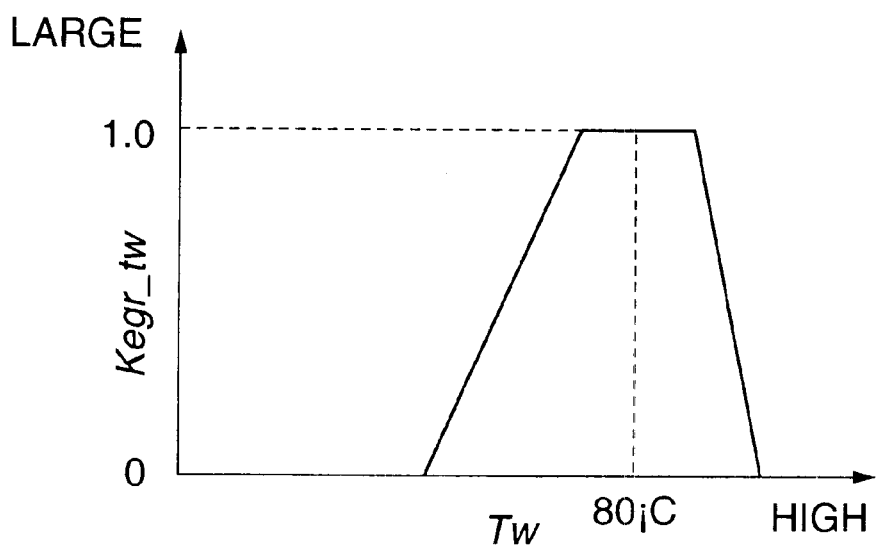
FIG. 13 is a diagram describing the contents of a map of a water temperature correction coefficient Kegr_tw stored by the control unit.

In a step S53, referring to a map shown in FIG. 13, a water temperature correction coefficient Kegr_Tw of the basic target EGR rate Megrb is calculated from the cooling water temperature Tw. This map is also stored beforehand in the memory of the control unit 41.

In a step S54, the target EGR rate Megr is calculated by the following equation (1) from the basic target EGR rate Megrb and water temperature correction coefficient Kegr_Tw.

$$Megr=Megrb*Kegr\_Tw \quad (1)$$

Figure 14:
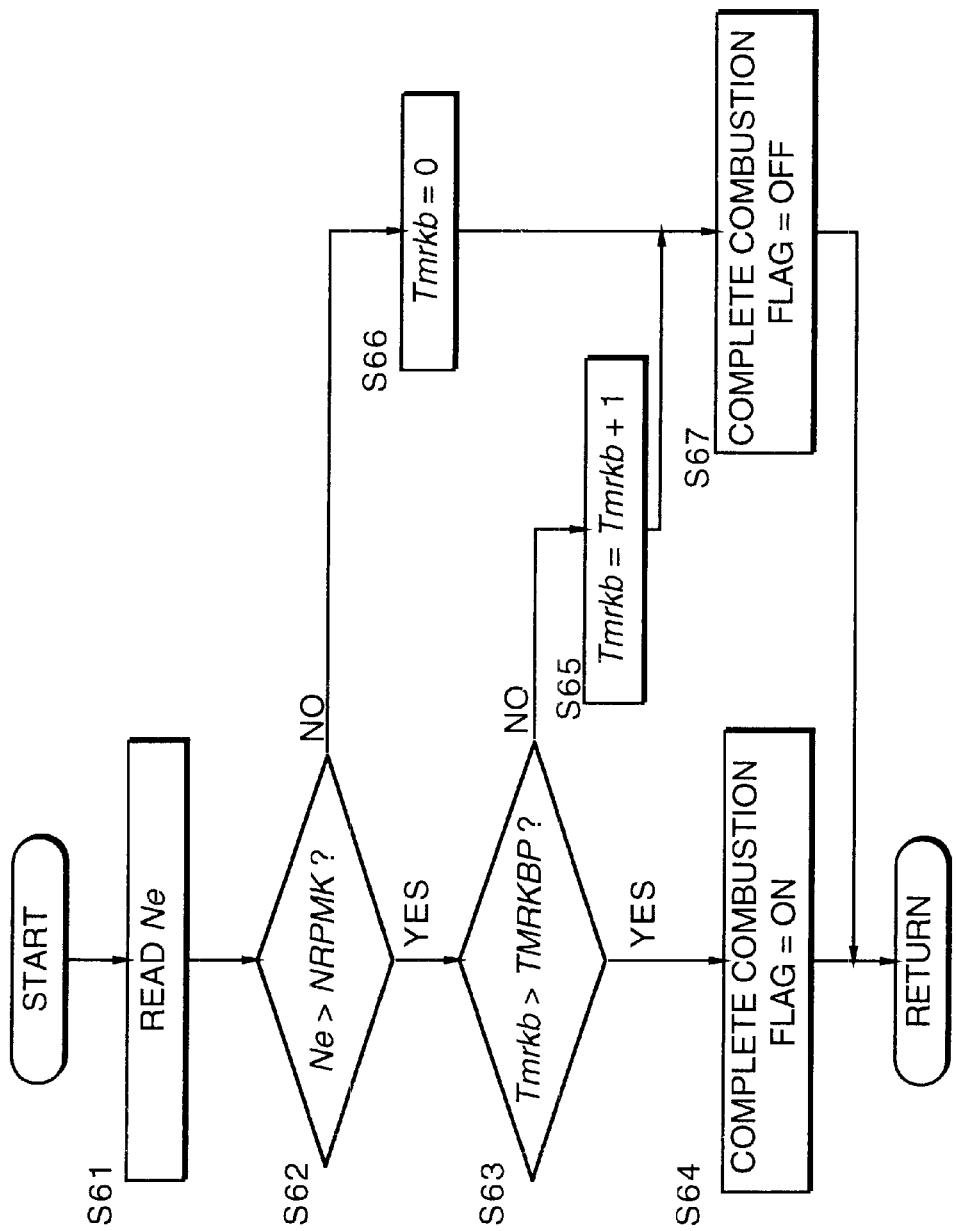
FIG. 14 is a flowchart describing a complete combustion determining routine performed by the control unit.

In a step S55, a subroutine shown in FIG. 14 which determines whether or not the diesel engine 1 is in a complete combustion state, is performed.

Describing this subroutine, firstly in a step S61, the engine rotation speed Ne is read, and in a step S62, the engine rotation speed Ne and a complete combustion determining slice level NRPMK corresponding to a complete combustion rotation speed are compared.

The slice level NRPMK is set, for example, to 400 rpm. When the engine rotation speed Ne exceeds the slice level NRPMK, the routine proceeds to a step S63.

Here, a counter value Tmrkb is compared with a predetermined time TMRKBP, and when the counter value Tmrkb is larger than the predetermined time TMRKBP, a complete combustion flag is turned ON in a step S64, and the subroutine is terminated.

When the engine rotation speed Ne is below the slice level NRPMK in the step S62, the subroutine proceeds to a step S66. Here, the counter value Tmrkb is cleared to 0, the complete combustion flag is turned OFF in a next step S67, and the subroutine is terminated.

When the counter value Tmrkb is below the predetermined time TMRKBP in the step S63, the counter value Tmrkb is incremented in a step S65 and the subroutine is terminated.

In this subroutine, even if the engine rotation speed Ne exceeds the slice level NRPMK, the complete combustion flag does not turn ON immediately, and the complete combustion flag only changes to ON after this state has continued for the predetermined time TMRKBP.

Referring again to FIG. 11, after performing the subroutine of FIG. 14, the control unit 41 determines the complete combustion flag in a step S56. When the complete combustion flag is ON, the subroutine of FIG. 11 is terminated. When the complete combustion flag is OFF, the target EGR rate Megr is reset to 0 in a step S57, and the subroutine of FIG. 11 is terminated.

Figure 17:
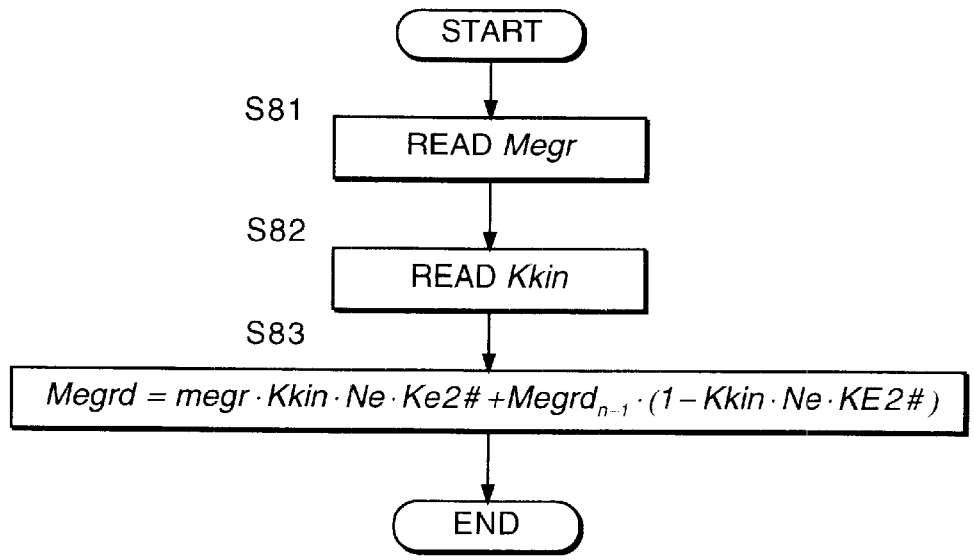
FIG. 17 is a flowchart describing a routine for calculating an EGR rate Megrd of an intake valve position performed by the control unit.
Figure 18:
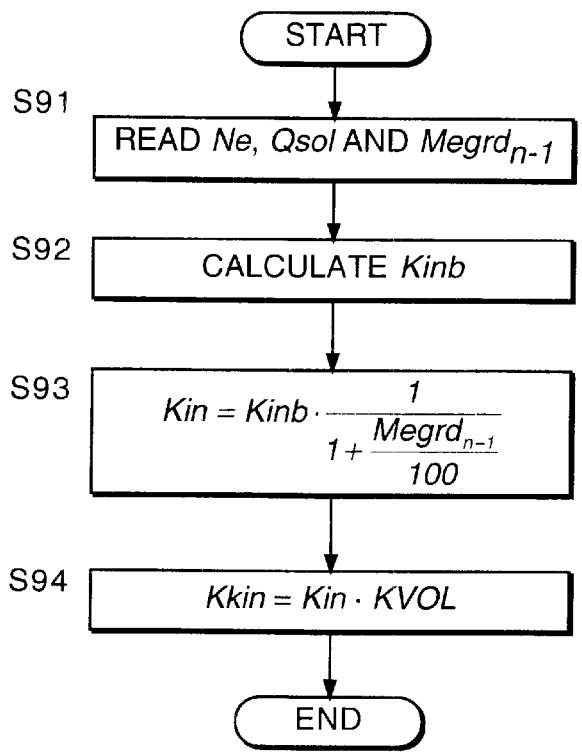
FIG. 18 is a flowchart describing a routine for calculating a time constant equivalent value Kkin performed by the control unit.

Referring to FIGS. 17 and 18, a routine for calculating the time constant equivalent value Kkin and the real EGR rate Megrd will now be described. The real EGR rate Megrd varies with a first order delay relative to the target EGR rate Megr. As the calculations of the time constant equivalent value Kkin and the real EGR rate Megrd are inter-related, they will be described together.

FIG. 18 shows a routine for calculating the time constant equivalent value Kkin. This routine is performed in synchronism with the REF signal.

The control unit 41 reads the engine rotation speed Ne, the target fuel injection amount Qsol and the immediately preceding value $Megrd_{n-1}$ (%) of the real EGR rate in a step S91. The immediately preceding value $Megrd_{n-1}$ is a value of Megrd calculated on the immediately preceding occasion when the routine was performed.

Figure 19:
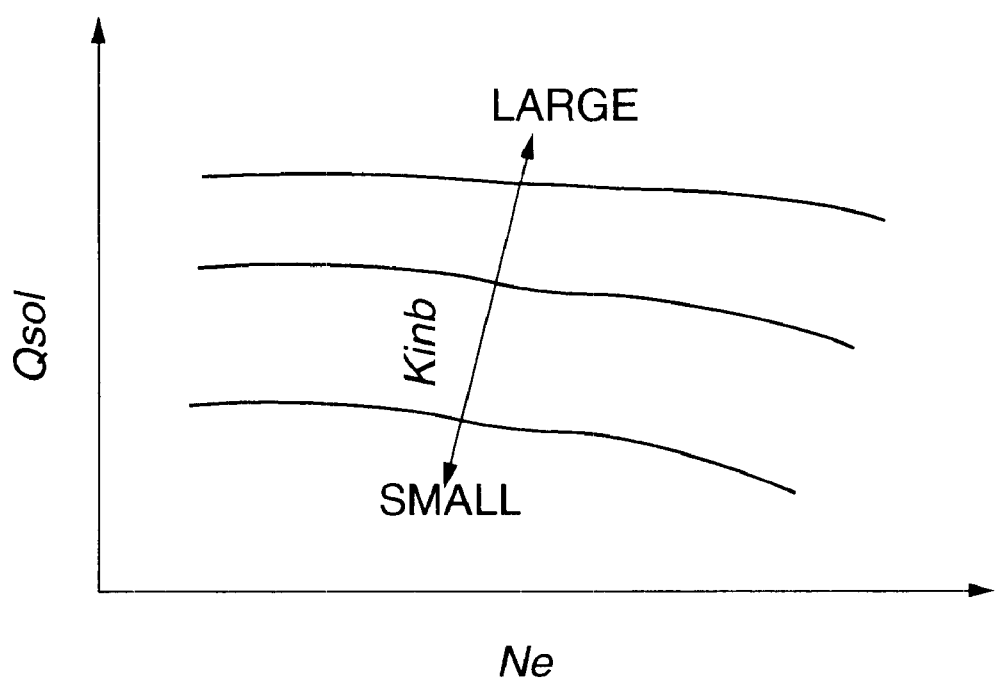
FIG. 19 is a flowchart describing the contents of a map of a volume efficiency equivalent basic value Kinb performed by the control unit.

In a step S92, a volume efficiency equivalent basic value Kinb is calculated from the engine rotation speed Ne and the target fuel injection amount Qsol by looking up a map shown in FIG. 19 previously stored in the memory of the control unit 41.

In a step S93, a volume efficiency equivalent value Kin is calculated from the following equation (2). When EGR is performed, the proportion of fresh air in the intake air falls, and the volume efficiency decreases. This reduction is reflected in the calculation of the volume efficiency equivalent value Kin via the volume efficiency equivalent basic value Kinb.

$$Kin = Kinb \cdot \frac{1}{1 + \frac{Megrd_{n-1}}{100}} \quad (2)$$

In a step S94, the time constant equivalent value Kkin corresponding to the capacity of the collector 3A is calculated by multiplying the volume efficiency equivalent value Kin by a constant KVOL.

The constant KVOL is expressed by the following equation (3):

$$KVOL=(VE/NC)/VM \quad (3)$$

where,

VE=displacement of diesel engine 1,

NC=number of cylinders of diesel engine 1, and

VM=capacity of passage from collector 3A to the intake valve.

FIG. 17 shows the routine for calculating the real EGR rate Megrd. This routine is performed at an interval of 10 milliseconds.

The control unit 41 first reads the target EGR rate Megr in a step S81.

In a following step S82, the time constant equivalent value Kkin is read. The routine of FIG. 18, which calculates the time constant equivalent value Kkin, is performed in synchronism with the REF signal, and this routine which calculates the real EGR rate Megrd is performed at an interval of 10 milliseconds. Therefore, the time constant equivalent value Kkin read here is the time constant equivalent value Kkin calculated by the routine of FIG. 18 immediately before the execution of the routine of FIG. 17. Likewise, the immediately preceding value $Megrd_{n-1}$ of the real EGR rate read by the routine of FIG. 18 is the real EGR rate calculated by the routine of FIG. 17 just before the execution of the routine of FIG. 18.

In a step S83, the real EGR rate Megrd is calculated from the following equation (4) using the target EGR rate Megr, immediately preceding value $Megrd_{n-1}$, and time constant equivalent value Kkin.

$$Megrd=megr \cdot Kkin \cdot Ne \cdot Ke2\# + Megrd_{n-1} \cdot (1-Kkin \cdot Ne \cdot KE2\#) \quad (4)$$

where,

KE2#=constant.

In this equation, Ne* KE2# is a value to convert the EGR rate per intake stroke of each cylinder, to an EGR rate per unit time.

Next, referring to FIG. 8, a routine for calculating the real intake air amount Qac will be described. This routine is performed in synchronism with the REF signal. The real intake air amount Qac expresses the intake air amount in the intake valve position of one cylinder of the diesel engine 1. The real intake air amount Qac is calculated from a flowrate Qas0 of the intake passage 3 detected by the air flow meter 39, but as the air flow meter 39 is situated upstream of the compressor 55, the real intake air amount Qac is calculated considering the time until the air which has passed through the air flow meter 39 is taken into the cylinder via the collector 3A.

First, in a step S31, the control unit 41 reads the engine rotation speed Ne and intake air flowrate Qas0 of the intake passage 3.

In a step S32, the intake air flowrate Qas0 is converted into an intake air amount Qac0 per cylinder by the following formula (5).

$$Qac0 = \frac{Qas0}{Ne} \cdot KCON\# \quad (5)$$

where,

KCON#=constant.

The constant KCON# is a constant for converting the intake air flowrate Qas0 of the intake passage 3 into the intake air amount per cylinder. In a four-cylinder engine, two cylinders perform air intake in each rotation, so the constant KCON# is 30. In a six-cylinder engine, three cylinders perform air intake in each rotation, so the constant KCON# is 20.

A considerable time is required until the air which has passed through the air flow meter 39 is actually taken into the cylinder. In order to correct for this time difference, the control unit 41 performs the processing of steps S33, S34.

In the step S33, considering the time required from the air flow meter 39 to the inlet of the collector 3A, a value $QacOn-L$ of Qac0 which was calculated in the routine executed L times ago, is set as an intake air amount $Qac_n$ per cylinder at the inlet of the collector 3A. The value of L is determined experimentally.

In the step S34, considering the time difference from the collector 3A to the intake valve of each cylinder of the diesel engine 1, the real intake air amount Qac is calculated by equation (6) of first order delay.

$$Qac = Qac_{n-1} \cdot (1-Kkin) + Qac_n \cdot Kkin \quad (6)$$

where,

Kkin=time constant equivalent value, and $Qac_{n-1}$=Qac calculated on the immediately preceding occasion the routine was executed.

Figure 9:
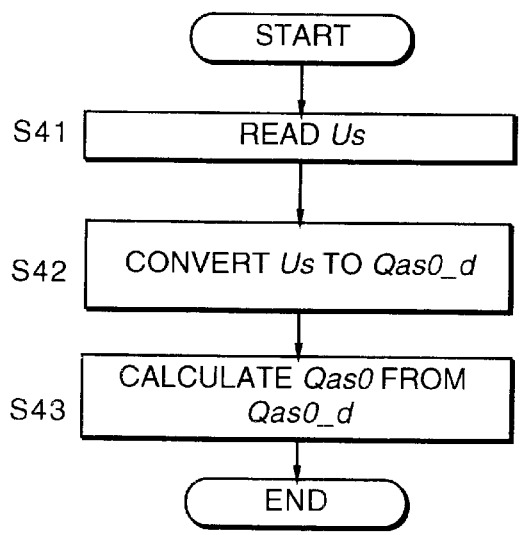
FIG. 9 is a flowchart describing a routine for calculating an intake air flowrate Qas0 of the intake passage performed by the control unit.
Figure 10:
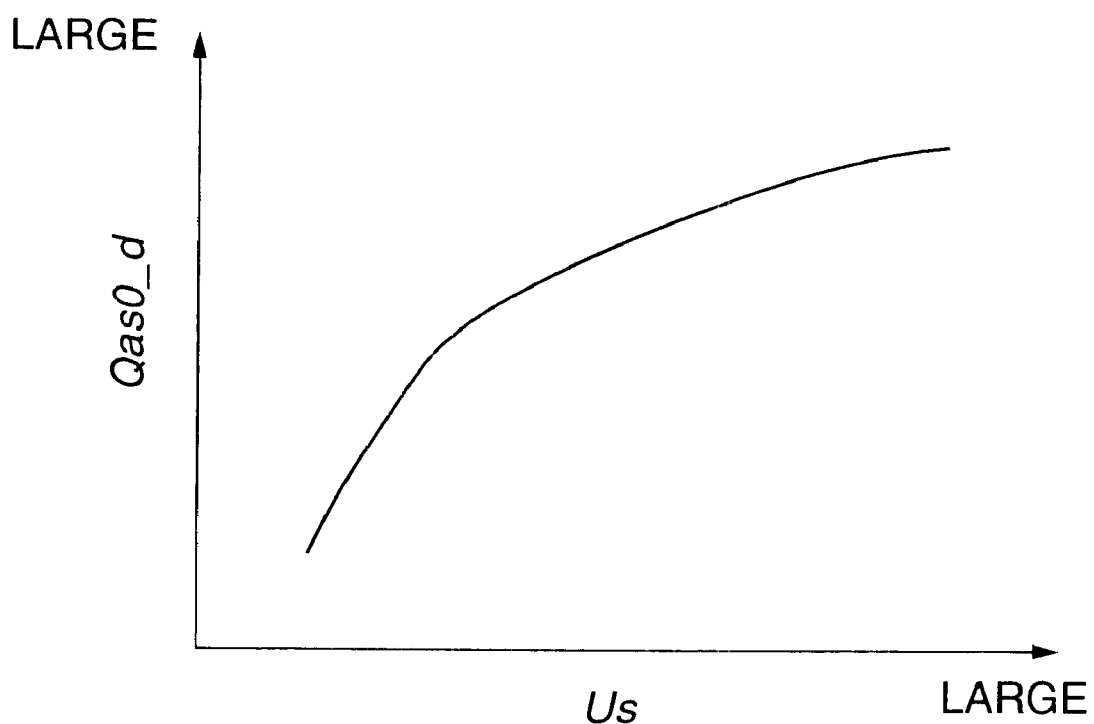
FIG. 10 is a diagram describing the contents of an intake air volume map stored by the control unit.

The signal input into the control unit 41 from the air flow meter 39 is an analog voltage signal Us, and the control unit 41 converts the analog voltage signal Us into the intake air flowrate Qas0 of the intake passage 3 by the routine shown in FIG. 9. This routine is performed at an interval of 4 milliseconds. In a step S41, the control unit 41 reads the analog voltage signal Us, and in a step S42, converts this into a flowrate Qas0_d by looking up a map shown in FIG. 10. This map is stored beforehand in the memory of the control unit 41.

Further, in a step S43, weighted average processing is performed on the flowrate Qas0_d, and the value obtained is taken as the intake air flowrate Qas0 of the intake passage 3.

The control of turbocharging pressure and control of the EGR amount corresponding to the turbocharging pressure performed by the control unit 41, are performed using the target fuel injection amount Qsol, time constant equivalent value Kkin, target EGR rate Megr, real EGR rate Megrd and the real intake air amount Qac calculated in this way.

The turbocharging pressure is controlled by a duty value Dtyvnt of a signal output to the pressure control valve 56 of the turbocharger 50. When the duty value Dtyvnt is zero, the pressure control valve 56 fully opens, and when the duty value is 1, it is fully closed.

Figure 15:
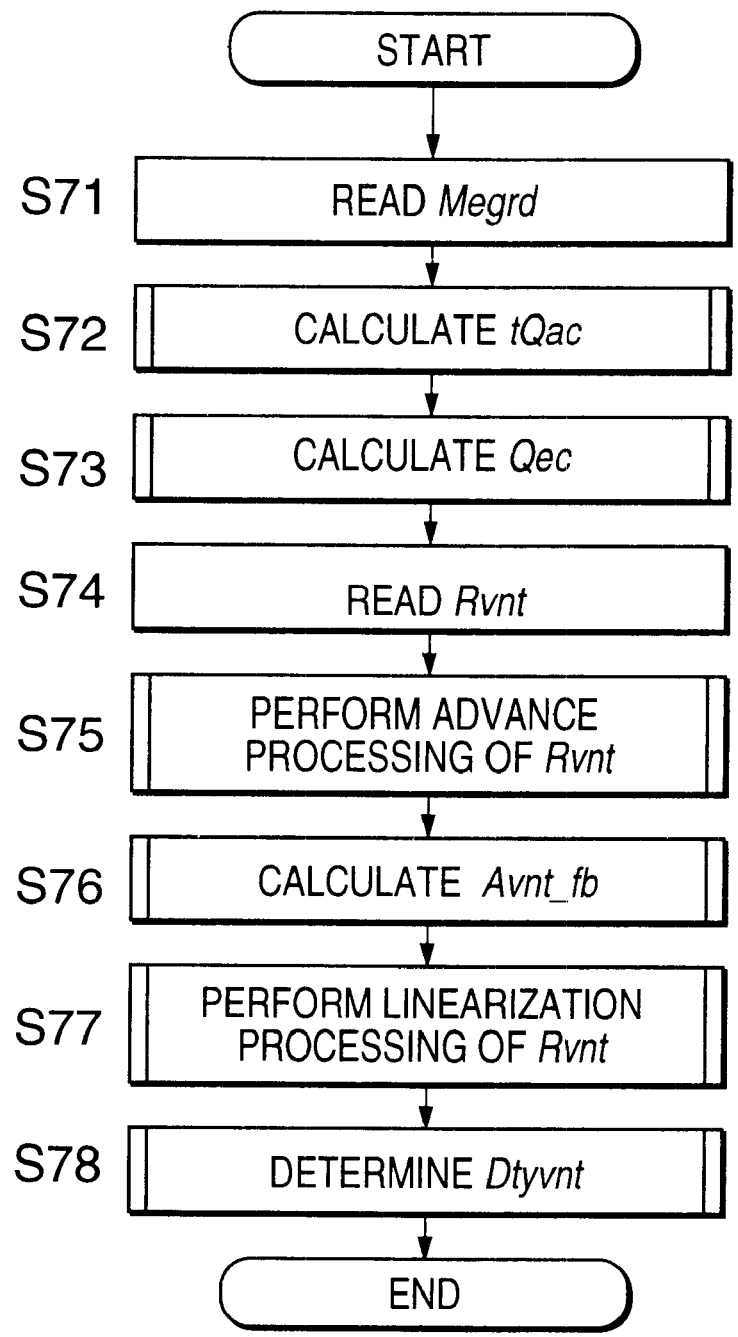
FIG. 15 is a flowchart describing a routine for calculating a duty value Dtyvnt of a pressure control valve of a turbo supercharger performed by the control unit.

The routine shown in FIG. 15 determines the duty value Dtyvnt. Therefore, this routine constitutes the main routine of turbocharging pressure control. This routine is performed at an interval of 10 milliseconds.

First, the control unit 41 reads the real EGR rate Megrd in a step S71. In a step S72, the target intake air amount tQac is calculated using the subroutine shown in FIG. 20.

Figure 20:
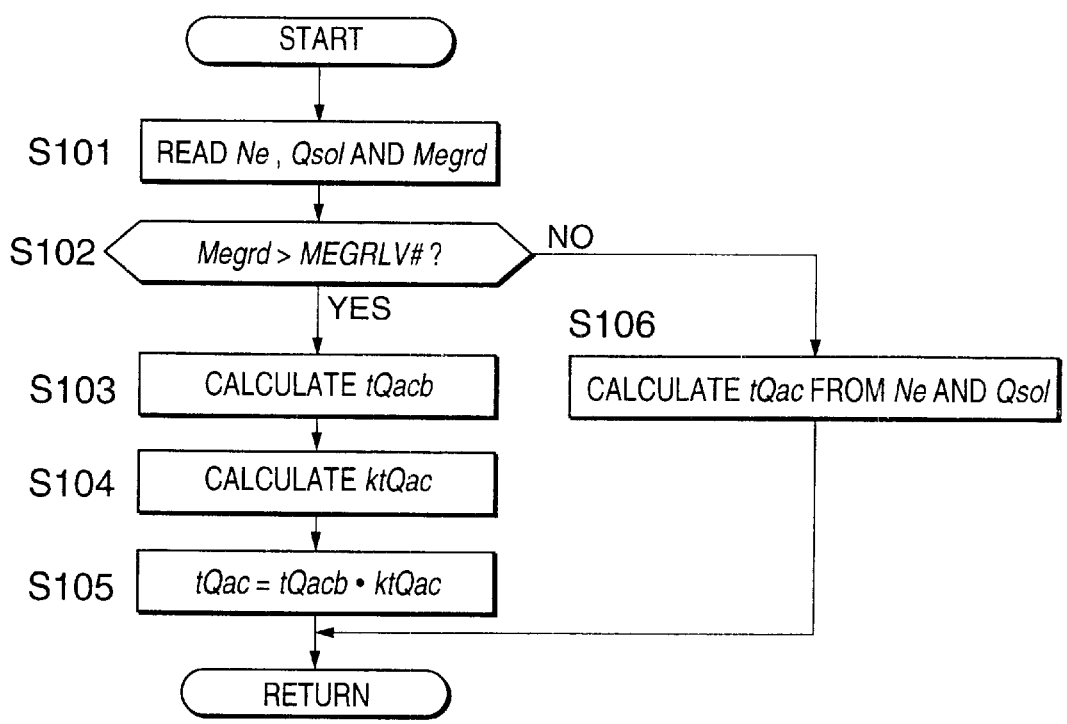
FIG. 20 is a flowchart describing a subroutine for calculating a target intake air amount tQac performed by the control unit.

Referring to FIG. 20, firstly in a step S101, the control unit 41 reads the engine rotation speed Ne, target fuel injection amount Qsol and real EGR rate Megrd. In a step S102, the real EGR rate Megrd is compared with a predetermined value MEGRLV#. The predetermined value MEGRLV# is a value for determining whether or not exhaust gas recirculation is actually being performed, and is set to, for example, 0.5%.

In the step S102, when Megrd>MEGRLV#, the subroutine proceeds to a step S103. On the other hand, if Megrd≦MEGRLV#, the subroutine proceeds to a step S106. In order to treat the case of a very small exhaust gas recirculation to be the same as the case where exhaust gas recirculation is not performed, the predetermined value MEGRLV# is not set to zero.

Figure 21:
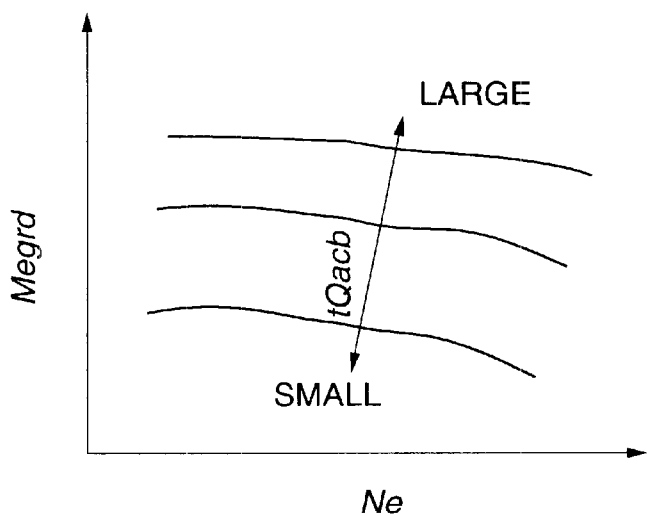
FIG. 21 is a diagram describing the contents of a map of a target intake air amount basic value tQacb stored by the control unit.

In the step S103, a target intake air amount basic value tQacb is calculated from the engine rotation speed Ne and real EGR rate Megrd by looking up a map shown in FIG. 21. When the engine rotation speed Ne is constant, this map gives a larger target intake air amount basic value tQacb the larger the real EGR rate Megrd. This map is previously stored in the memory of the control unit 41.

Figure 22:
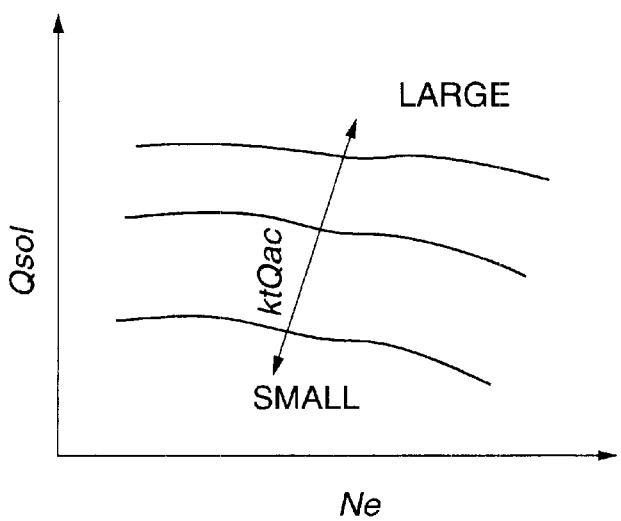
FIG. 22 is a diagram describing the contents of a map of a correction factor ktQac stored by the control unit.

Next, in a step S104, a correction coefficient ktQac of the target intake air amount is calculated from the engine rotation speed Ne and the target fuel injection amount Qsol by looking up a map shown in FIG. 22. The correction coefficient ktQac is a coefficient for setting the target intake air amount according to the running condition of the vehicle.

In a step S105, the target intake air amount tQac is calculated by multiplying the target intake air amount basic value tQacb by the correction coefficient ktQac.

Figure 23:
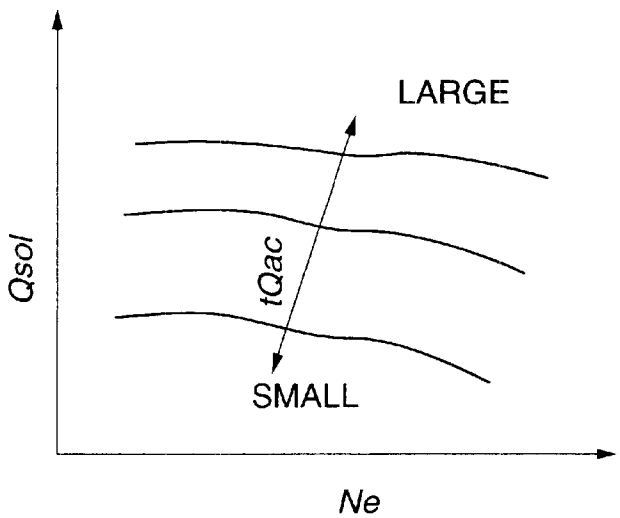
FIG. 23 is a diagram describing the contents of a map of a target intake air amount tQac stored by the control unit.

On the other hand, in the step S106, the target intake air amount tQac when exhaust gas recirculation is not performed, is calculated from the engine rotation speed Ne and the target fuel injection amount Qsol by looking up a map shown in FIG. 23.

After calculating the target intake air amount tQac in this way, the subroutine is terminated.

Figure 24:
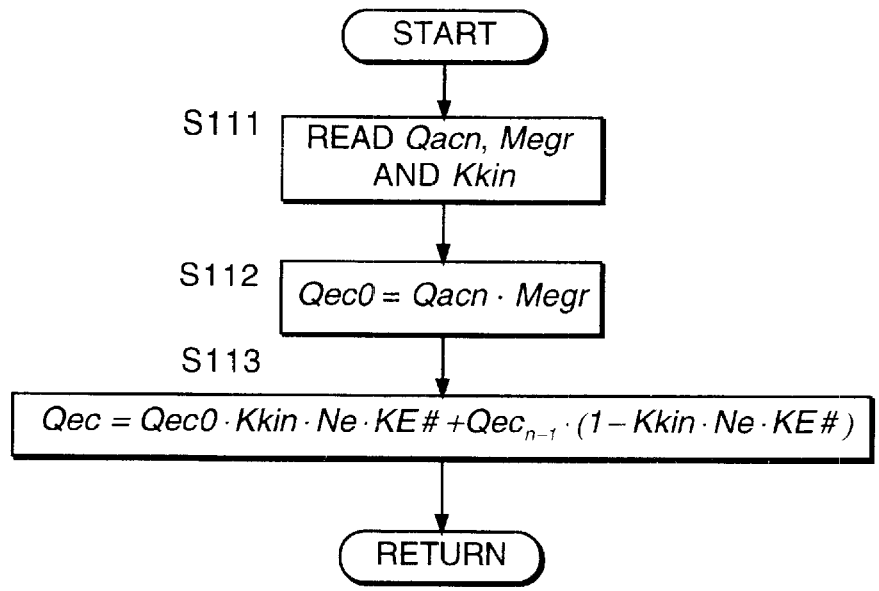
FIG. 24 is a flowchart describing a subroutine for calculating a real EGR amount Qec performed by the control unit.

Next, in a step S73 of FIG. 15, the control unit 41 calculates the real EGR amount Qec which is the exhaust gas amount passing through the intake valve of the diesel engine 1 using the subroutine shown in FIG. 24.

Referring to FIG. 24, firstly in a step S111, the control unit 41 reads the intake air amount $Qac_n$ per cylinder at the inlet of the collector 3A, the target EGR rate Megr, and the time constant equivalent value Kkin corresponding to the collector capacity. For the intake air amount $Qac_n$ per cylinder at the inlet of the collector 3A, a value calculated by the routine of FIG. 8 is used, and for the time constant equivalent value Kkin, a value calculated by the routine of FIG. 18 is used.

In a next step S112, an EGR amount Qec0 per cylinder at the inlet of the collector 3A is calculated by the following equation (7).

$$Qec0 = Qac_n \cdot Mger \tag{7}$$

In a next step S113, real EGR amount Qec is calculated by the following equation (8) and the subroutine is terminated.

$$Qec = Qec0 \cdot Kkin \cdot Ne \cdot KE\# + Qec_{n-1} \cdot (1 - Kkin \cdot Ne \cdot KE\#) \tag{8}$$

After this subroutine is terminated, in a step S74 of FIG. 15, the control unit 41 reads the target opening Rvnt of the variable nozzle 53. Here, the opening is a value which expresses the opening area of the variable nozzle 53 as a percentage relative to the opening area when the nozzle is fully open. Therefore, the opening when the nozzle is fully open is 100%, and the opening when it is fully closed is 0%. The opening is used in order to express the opening of the variable nozzle 53 as a universal value which is not affected by the capacity of the turbocharger 50, but the opening area of the variable nozzle 53 may of course also be used.

Figure 25:
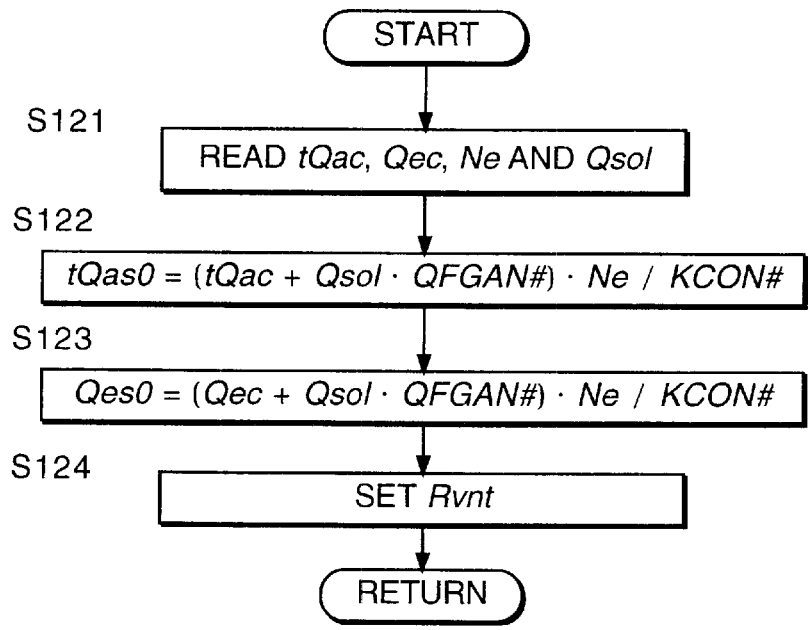
FIG. 25 is a flowchart describing a routine for calculating a target opening Rvnt of a variable fuel injection nozzle performed by the control unit.

The target opening Rvnt of the variable nozzle 53 is calculated by a routine shown in FIG. 25. This routine is performed independently of the main routine of FIG. 15 in synchronism with the REF signal.

Referring to FIG. 25, in a step S121, the control unit 41 first reads the target intake air amount tQac, real EGR amount Qec, engine rotation speed Ne and target fuel injection amount Qsol. In a following step S122, an intake air amount equivalent value tQas0 for calculating the target opening Rvnt of the variable nozzle 53 is calculated by the following equation (9).

$$tQas0 = (tQac + Qsol \cdot QFGAN\#) \cdot Ne/KCON\# \tag{9}$$

where,

KCON#=constant.

In a step S123, an EGR amount equivalent value Qes0 is calculated by the following equation (10).

$$Qes0 = (Qec + Qsol \cdot QFGAN\#) \cdot Ne/KCON\# \tag{10}$$

In equations (9) and (10), Ne/KCON# is a coefficient for converting the intake air amount per cylinder or the EGR amount into a value per unit time.

Moreover, in equations (9) and (10), Qsol*QFGAN# is added to the target intake air amount tQac or the real EGR amount Qec in order to vary the target opening Rvnt according to the load of the diesel engine 1.

The effect of the target fuel injection amount Qsol, which represents the load of the diesel engine 1, is adjusted by the gain QFGAN#. In the following description, tQas0 calculated in this way is referred to as an intake air amount equivalent value, and Qes0 is referred to as a set EGR amount equivalent value.

Figure 26:
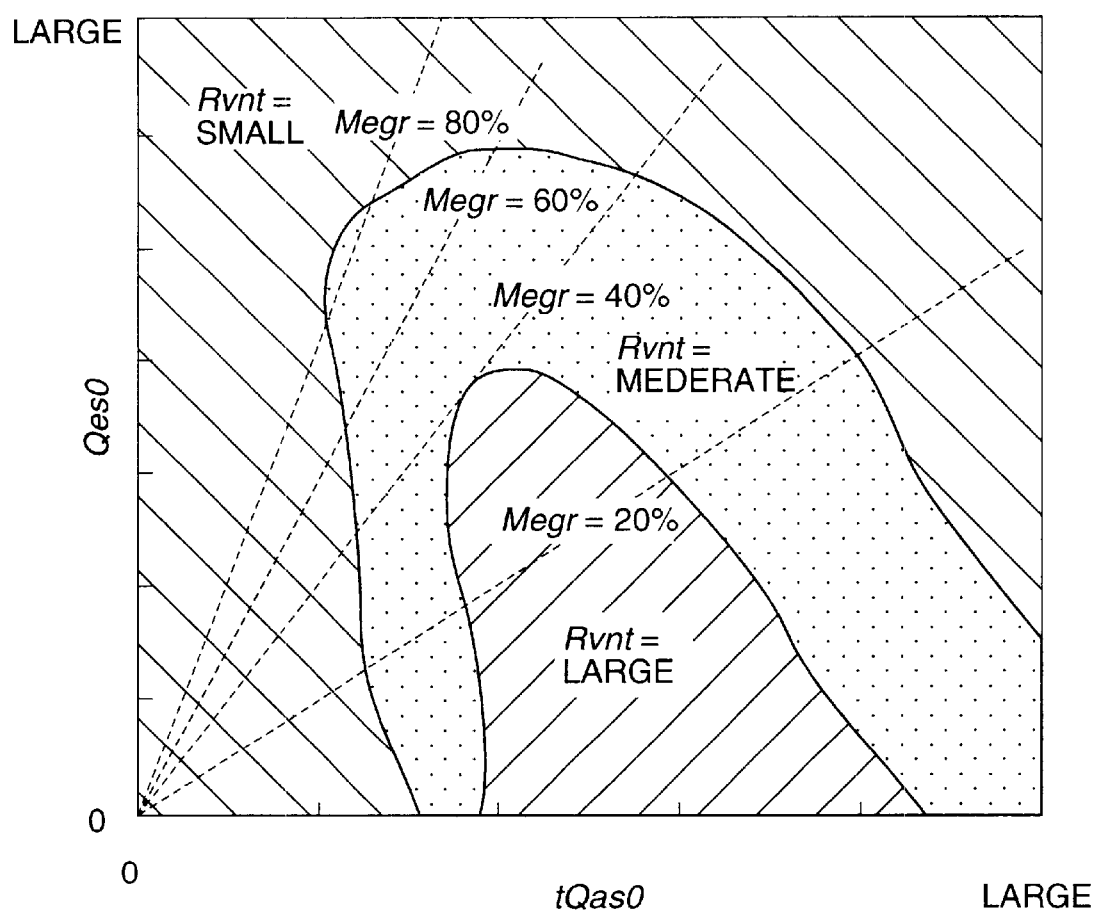
FIG. 26 is a diagram describing the contents of a map of the target opening Rvnt stored by the control unit.

In a following step S124, the target opening Rvnt of the variable nozzle 53 is calculated by looking up a map shown in FIG. 26 stored beforehand based on the intake air amount equivalent value tQas0 and the EGR amount equivalent value Qes0. This map is stored beforehand in the memory of the control unit 41.

Describing the characteristics of the target opening Rvnt specified by this map, in the region on the right-hand side of the figure where the intake air amount equivalent value tQas0 is large, the target opening Rvnt decreases with increase of the EGR amount equivalent value Qes0. This is due to the following reason. Fresh air decreases as the EGR amount increases, and as a result, the air-fuel ratio becomes rich and smoke is easily generated. To avoid this situation, the target opening Rvnt is decreased and the fresh air intake amount is increased by raising the turbocharging pressure of the turbocharger 50 the more the EGR amount increases.

In the region on the left-hand side of the figure where the intake air amount equivalent value tQas0 is small, the turbocharging efficiency of the turbocharger 50 is small. In this map, in this region, the target opening Rvnt is decreased as the intake air amount equivalent value tQas0 decreases. This is because the exhaust pressure required to rotate the exhaust gas turbine 52 is difficult to establish if the target opening Rvnt is increased in this region. It is also because, when the vehicle is accelerated by fully opening the accelerator pedal, the acceleration effect due to turbocharging is larger if the initial opening of the variable nozzle 53 is small.

In the figure, the target opening Rvnt of the region indicated by Rvnt=Small is about 20%. The target opening Rvnt of the region indicated by Rvnt=Large is set to about 30% when fuel-cost performance is emphasized, and to about 60% when exhaust gas purification is emphasized.

Figure 29:
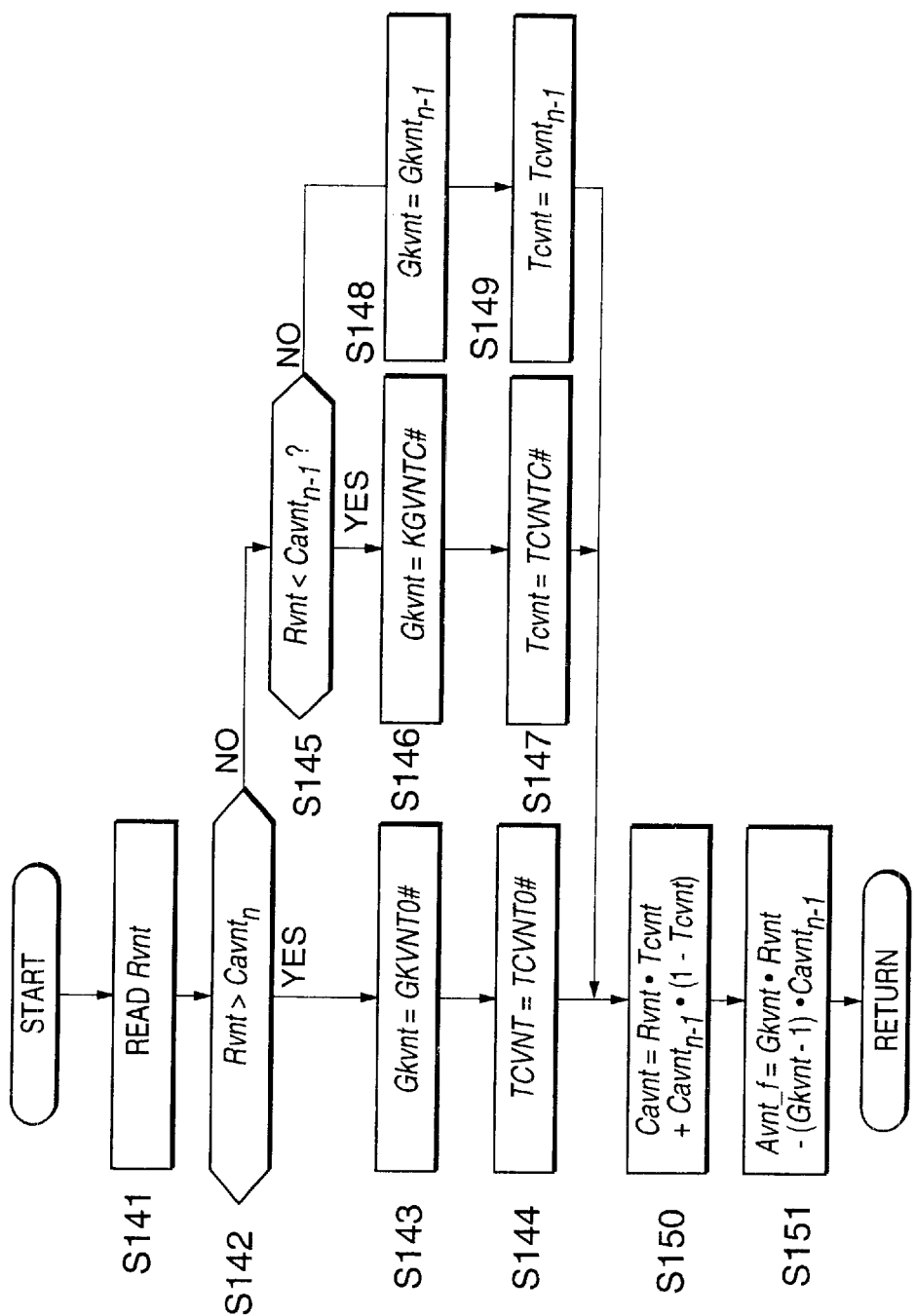
FIG. 29 is a flowchart describing a routine for calculating an open loop control amount Avnt_f of the target opening performed by the control unit.

Now, after reading the target opening Rvnt in the step S74 of FIG. 15, the control unit 41, in a step S75, adds advance processing to the target opening Rvnt using the subroutine shown in FIG. 29. This advance processing aims to compensate the operating delay based on the time required to operate the pressure actuator 54 which drives the variable nozzle 53. This processing is needed as the operation of the pressure actuator 54 using the pressure control valve 56 and the diaphragm actuator 59 has a large response delay compared to a step motor.

Referring to FIG. 29, the control unit 41 first reads the target opening Rvnt in a step S141.

In a step S142, an opening prediction value $Cavnt_{n-1}$ calculated on the immediately preceding occasion when the subroutine was executed, is compared with the target opening Rvnt. The opening prediction value $Cavnt_{n-1}$ will be described in a later step S150.

When Rvnt>$Cavnt_{n-1}$, the variable nozzle 53 is operating in the opening direction. In this case, in a step S143, the subroutine sets a advance correction gain Gkvnt as a predetermined value GKVNTO#, sets a advance correction time constant equivalent value Tcvnt as a predetermined value TCVNTO# in a step S144, and proceeds to the step S150.

Here, the time constant equivalent value Tcvnt is the inverse of a time constant, and shows that the response is faster for a larger value.

On the other hand, when Rvnt≦$Cavnt_{n-1}$ in the step S142, the subroutine determines whether or not Rvnt<$Cavnt_{n-1}$ in a step S145.

When Rvnt<$Cavnt_{n-1}$, the variable nozzle 53 is operating in the closing direction. In this case, the subroutine sets the advance correction gain Gkvnt to a predetermined value GKVNTC# in a step S146, sets the advance correction time constant equivalent value Tcvnt to a predetermined value TCVNTC# in a step S147, and proceeds to the step S150. Herein, GKVNTO#<GKVNTC# and TCVNTO#<TCVNTC#.

The reason for this setting is that, when the variable nozzle 53 is being closed, the exhaust gas pressure works as a resistance force, hence it is desirable to set the gain larger and set the time constant smaller than when the nozzle is being opened to expedite the operation of the variable nozzle 53. Making the time constant small means making the time constant equivalent value Tcvnt large, as mentioned above.

In a step S145, when the target opening Rvnt is not smaller than the opening prediction value $Cavnt_{n-1}$, i.e., Rvnt is equal to $Cavnt_{n-1}$, the subroutine sets the advance correction gain Gkvnt equal to the immediately preceding value $Gkvnt_{n-1}$ in a step S148, sets the advance correction time constant equivalent value Tcvnt equal to the immediately preceding value $Tcvnt_{n-1}$, and proceeds to the step S150.

In the step S150, an opening prediction value Cavnt is calculated from the equation (11 below using the advance correction time constant equivalent value Tcvnt and the target opening Rvnt.

$$Cavnt=Rvnt \cdot Tcvnt + Cavnt_{n-1} \cdot (1-Tcvnt) \quad (11)$$

where, $Cavnt_{n-1}$=Cavnt calculated on the immediately preceding occasion the subroutine was executed.

In a subsequent step S151, an open loop control amount Avnt_f of the target opening is calculated by the following equation (12) using the opening prediction value Cavnt and the target opening Rvnt.

$$Avnt\_f = Gkvnt \cdot Rvnt - (Gkvnt-1) \cdot Cavnt_{n-1} \quad (12)$$

Figure 30:
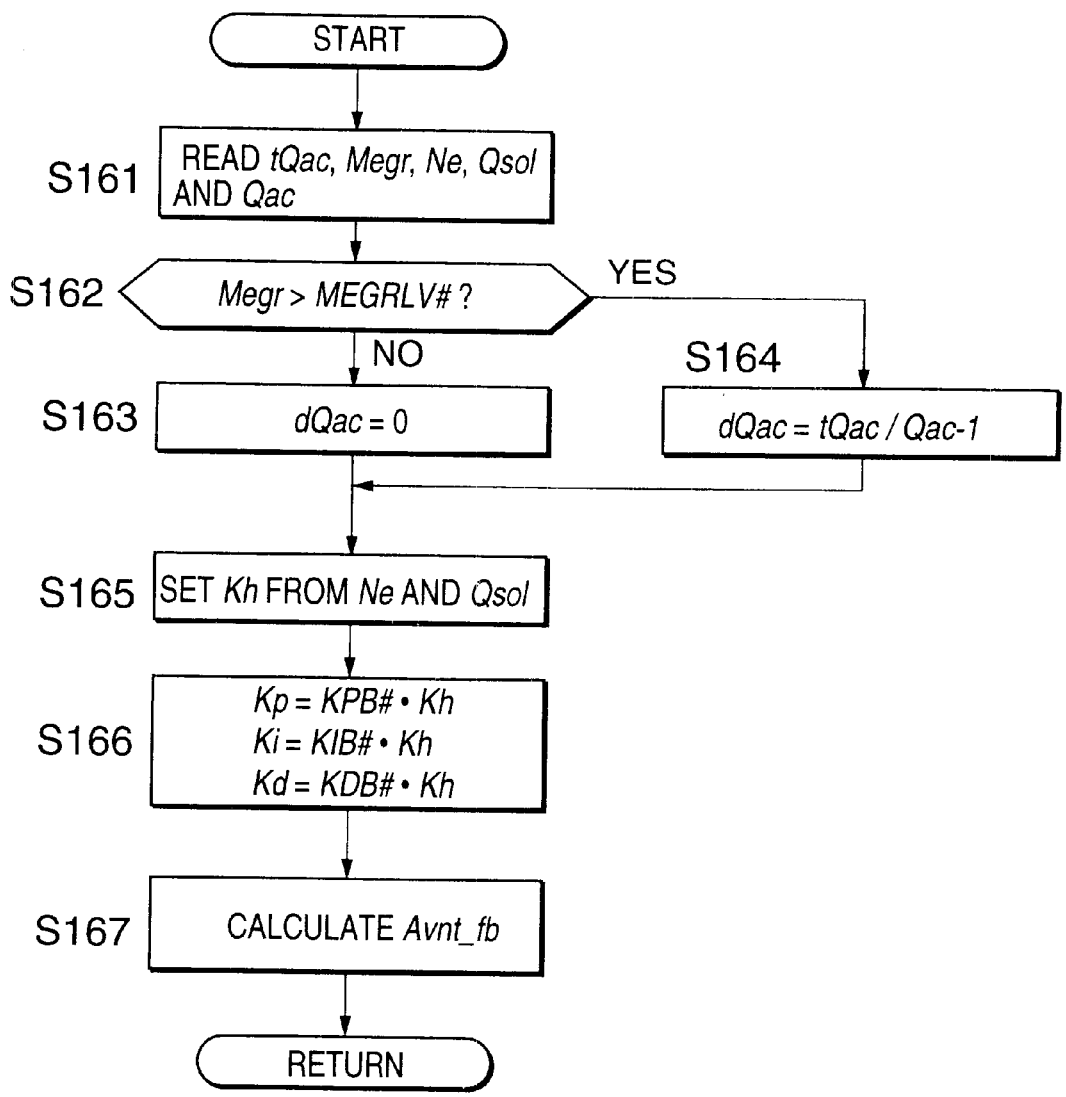
FIG. 30 is a flowchart describing a routine for calculating a feedback control amount Avnt_fb of the target opening performed by the control unit.

After executing the subroutine of FIG. 29, the control unit 41 returns to the routine of FIG. 15, and calculates a feedback correction amount Avnt_fb of the target opening Rvnt using the subroutine shown in FIG. 30 in a step S76.

Referring to FIG. 30, the control unit 41 first reads the target intake air amount tQac, target EGR rate Megr, engine rotation speed Ne, target fuel injection amount Qsol and the real intake air amount Qac in a step S161.

In a step S162, the target EGR rate Megr is compared with the predetermined value MEGRLV#. The predetermined value MEGRLV# is the same as that which was used in the step S102 of FIG. 20. Herein, it is determined whether or not to perform exhaust gas recirculation by comparing the target EGR rate Megr with the predetermined value MEGRLV#.

Megr≧MEGRLV# is a region where exhaust gas recirculation should be performed. In this case, the subroutine proceeds to a step S164, and an error rate dQac of the target intake air amount tQac is calculated relative to the real intake air amount Qac by the following equation (13).

$$dQac=(tQac/Qac)-1 \quad (13)$$

When the target intake air amount tQac is larger than the real intake air amount Qac, the error rate dQac takes a positive value, and when the target intake air amount tQac is smaller than the real intake air amount Qac, the error rate dQac takes a negative value.

If the target intake air amount tQac is equal to the real intake air amount Qac, the error rate dQac is zero.

Megr<MEGRLV# is a region in which exhaust gas recirculation is not performed. In this case, the subroutine sets the error rate dQac to 0 in a step S163.

After setting the error rate dQac, the subroutine proceeds to a step S165.

In the step S165, a feedback gain correction coefficient Kh used for feedback control of the target opening Rvnt is calculated, from the engine rotation speed Ne and the target fuel injection amount Qsol, by looking up a map stored beforehand in the control unit 41. The map is set so as to increase the correction coefficient Kh the larger the load of the diesel engine 1 represented by the target fuel injection amount Qsol, and the larger the rotation speed Ne of the diesel engine 1.

In a following step S166, a proportional feedback gain Kp, integral feedback gain Ki and differential feedback gain Kd are calculated by multiplying the correction coefficient Kh by a proportion constant KPB#, integral constant KIB# and differential constant KDB#, respectively.

In a step S167, based on these gains, the feedback control amount Avnt_fb of the target opening Rvnt of the variable nozzle 53 is calculated using proportional/integral/differential control equations known in the art.

Figure 31:
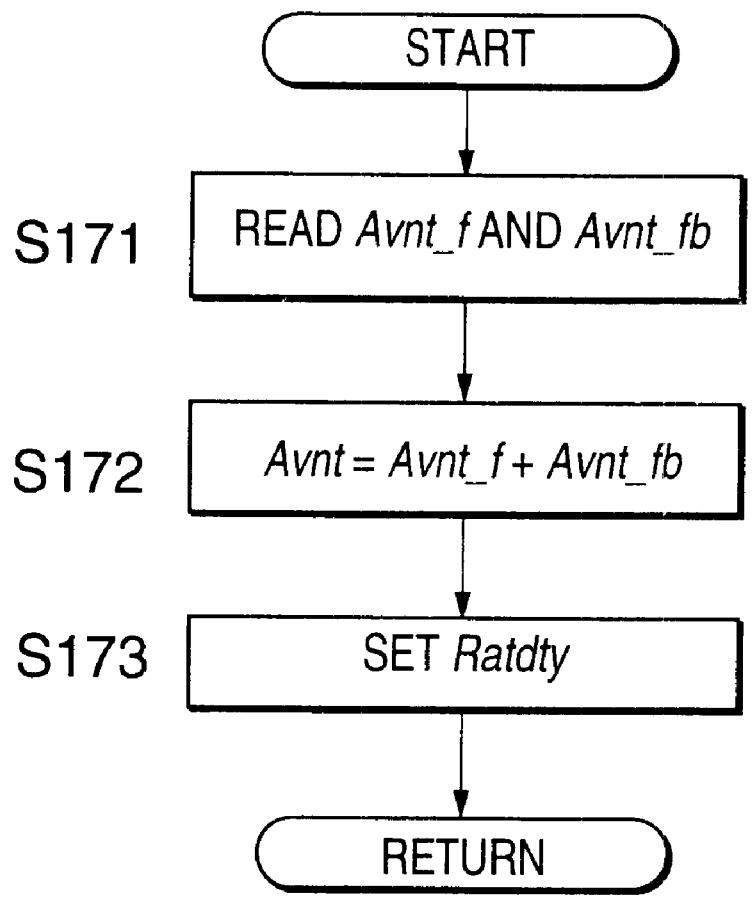
FIG. 31 is a flowchart describing a subroutine for performing linearization processing on the target opening performed by the control unit.

After the above calculation, the control unit 41 returns to the routine of FIG. 15, and performs linearization processing on the target opening Rvnt using a subroutine shown in FIG. 31 in a step S77.

Referring to FIG. 31, in a step 171, the control unit 41 reads the open loop control amount Avnt_f and the feedback control amount Avnt_fb of the target opening Rvnt.

In a next step S172, a command opening Avnt is calculated by summing these control amounts.

Figure 32:
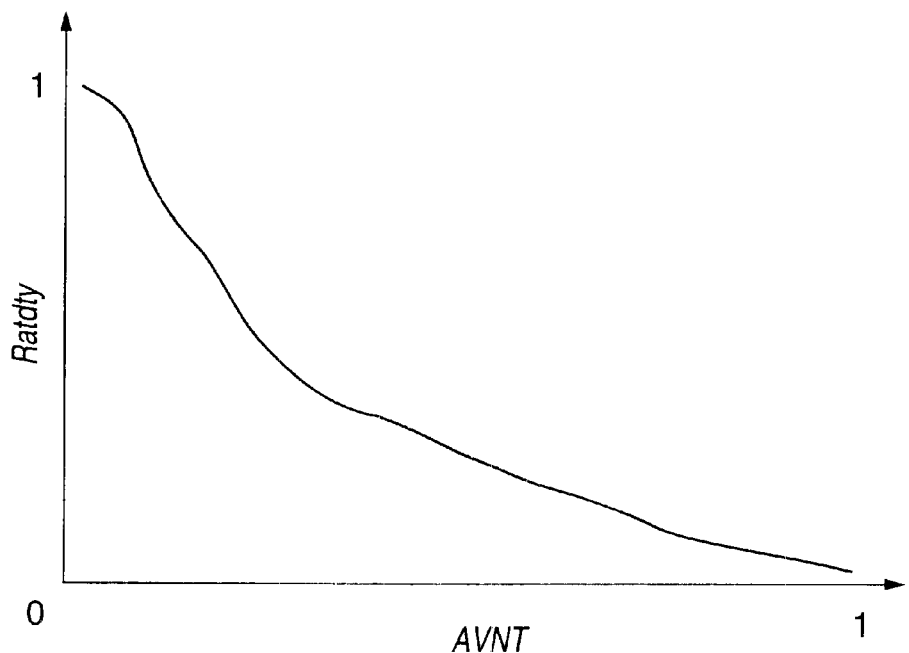
FIG. 32 is a diagram describing the contents of a map of the target opening Rvnt stored by the control unit.

In a following step S173, a linearization processing value Ratdty of the command opening Avnt is calculated from the command opening Avnt by looking up a map of FIG. 32 previously stored in the memory of the control unit 41.

Figure 34:
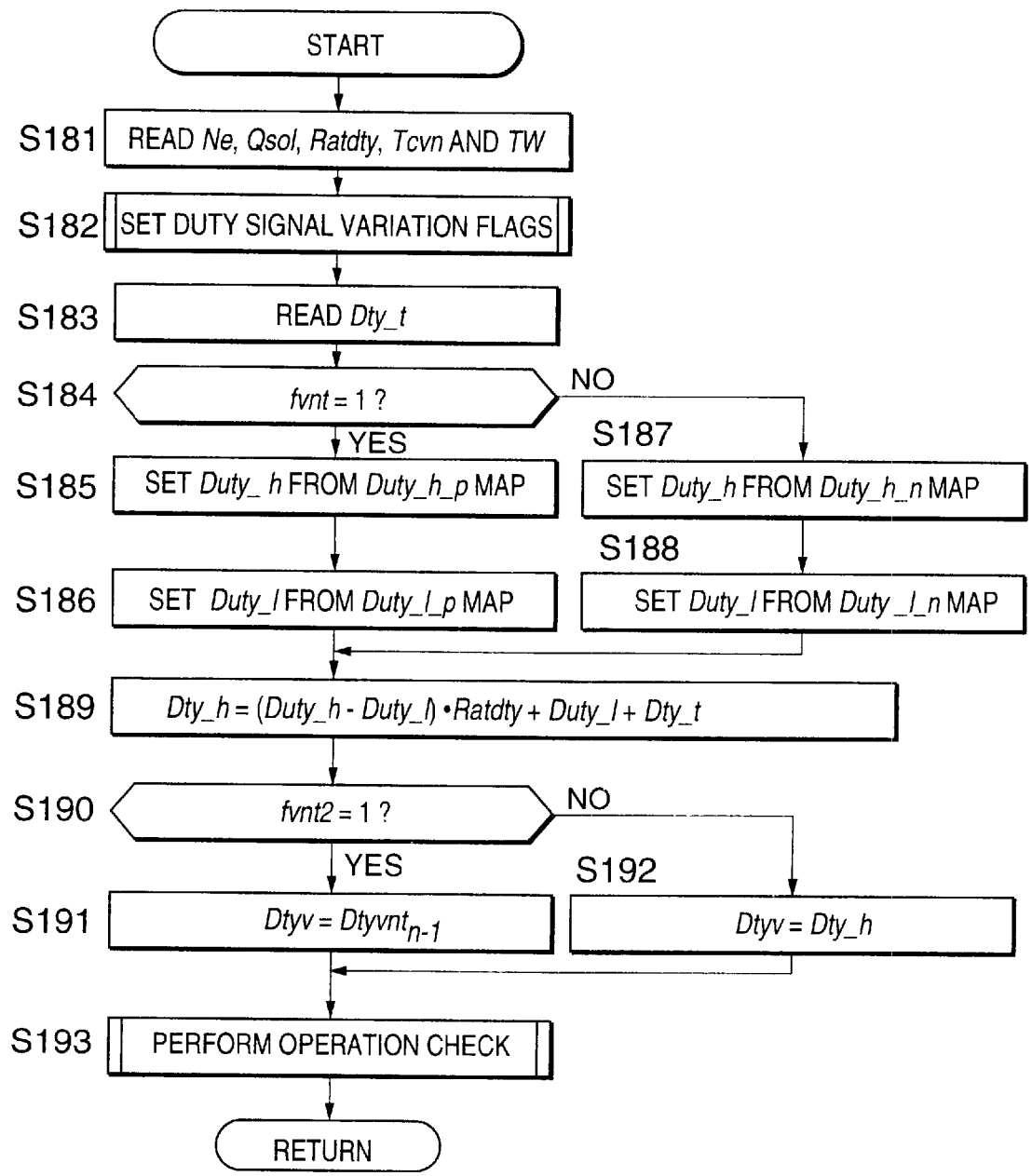
FIG. 34 is a flowchart describing a subroutine for setting the duty value Dtyvnt of the pressure control valve of the turbocharger performed by the control unit.

After this processing, the control unit 41 returns again to the routine of FIG. 15, and determines the duty value Dtyvnt using a subroutine shown in FIG. 34 in a step S78.

Figure 33:
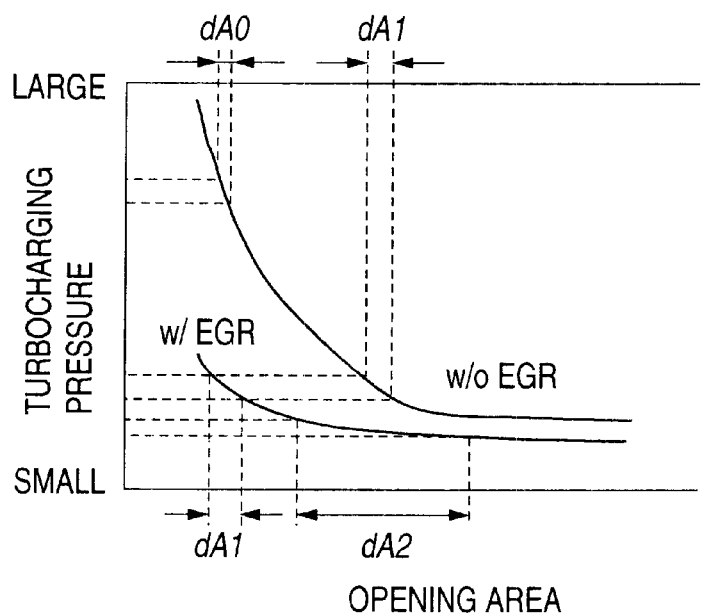
FIG. 33 is a diagram describing a relation between an opening area of a variable nozzle, and a turbocharging pressure.

The subroutine of FIG. 34 sets the duty value Dtyvnt of the signal output to the pressure control valve 56 of the variable nozzle 53. This linearization is required for the following reason. FIG. 33 shows the characteristics of the opening area of the variable nozzle 53 with respect to the turbocharging pressure. The characteristics when EGR is performed is indicated by a curve w/EGR and the characteristics when EGR is not performed is indicated by another curve w/o EGR. As can be understood from this figure, when the turbocharging pressure is high, or the intake air amount is large, the variation of the opening area of the variable nozzle 53 relative to the variation of the turbocharging pressure is small. When the turbocharging pressure is low, or the intake air amount is small, the opening area of the variable nozzle 53 largely varies with respect to the variation of the turbocharging pressure. EGR further promotes this tendency. In other words, if the opening area of the variable nozzle 53 is controlled with a fixed feedback gain, it is difficult to control precisely the turbocharging pressure. In order to ensure the prompt response of the turbocharging pressure, the feedback gain Kh must be set to vary according to running conditions.

Referring to FIG. 34, in a step S181, the control unit 41 reads the engine rotation speed Ne, target fuel injection amount Qsol, linearization processing value Ratdty of the command opening, advance correction time constant equivalent value Tcvnt and cooling water temperature Tw of the diesel engine 1.

Figure 35:
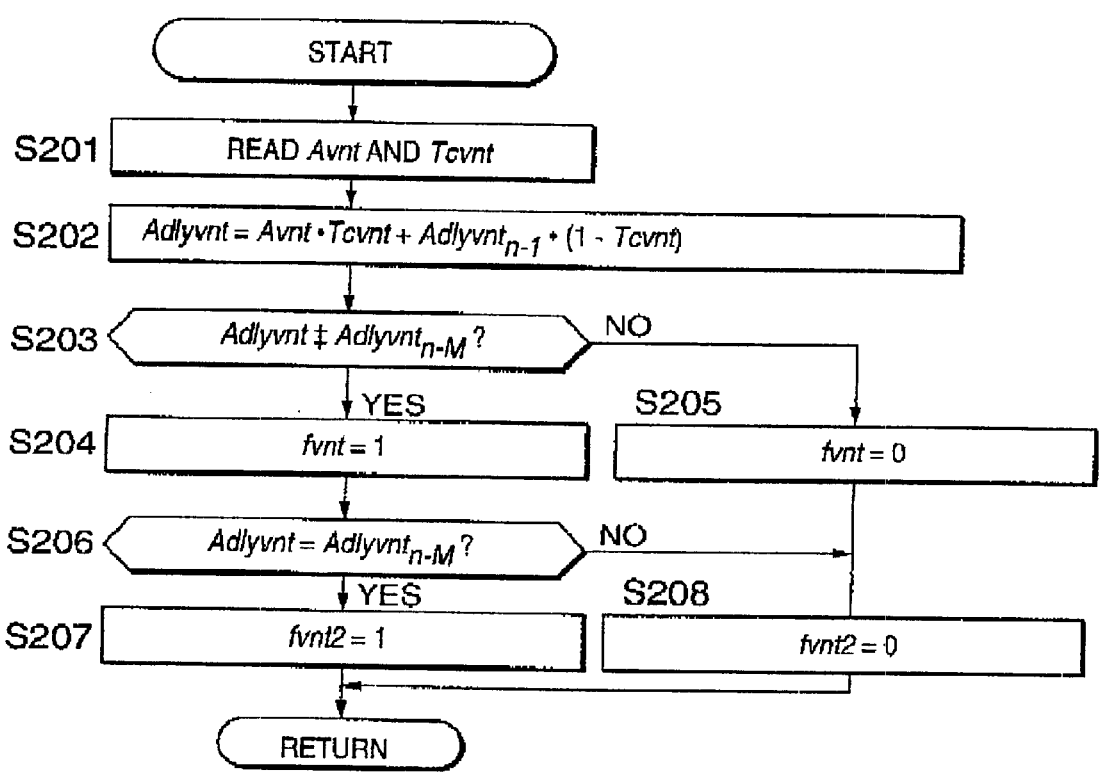
FIG. 35 is a flowchart describing a subroutine for setting a duty selection signal flag fvnt2 performed the control unit.

In a step S182, duty signal variation flags are set using the subroutine shown in FIG. 35.

Referring to FIG. 35, the control unit 41 first reads the command opening Avnt and the advance correction time constant equivalent value Tcvnt in a step S201.

In a next step S202, a command opening prediction value Adlyvnt is calculated by the following equation (14).

$$Adlyvnt = Avnt \cdot Tcvnt + Adlyvnt_{n-1} \cdot (1-Tcvnt) \tag{14}$$

where,

Adlyvnt$_{n-1}$=value of Adlyvnt calculated on the immediately preceding occasion the subroutine was executed.

Here, the relation between the command opening Avnt and the command opening prediction value Adlyvnt corresponds to the relation between the target opening Rvnt and the opening prediction value Cavnt.

In a following step S203, the command opening prediction value Adlyvnt is compared with a command opening prediction value Adlyvnt$_{n-M}$ calculated by the subroutine executed M times ago.

When Adlyvnt≧Adlyvnt$_{n-M}$, the command opening is increasing or constant. In this case, the subroutine sets an operation direction flag fvnt to 1 in a step S204, and proceeds to a step S206.

In the step S206, it is determined whether or not Adlyvnt=Adlyvnt$_{n-M}$. When Adlyvnt=Adlyvnt$_{n-M}$, in a step S207, a duty hold flag fvnt2 is set to 1, and the subroutine is terminated.

When Adlyvnt=Adlyvnt$_{n-M}$ is not satisfied, the routine proceeds to a step S208.

When Adlyvnt<Adlyvnt$_{n-M}$ in the step S203, it shows that the command opening is decreasing. In this case, the subroutine resets the operation direction flag fnvt to zero in a step S205, and the routine proceeds to the step S208.

In the step S208, the duty hold flag fvnt2 is reset to zero, and the subroutine is terminated.

Thus, after setting the two flags fvnt and fvnt2, the control unit 41 reads a duty value temperature correction amount Dty_t in a step S183 of FIG. 34. The duty value temperature correction amount Dty_t is calculated by a routine of FIG. 36 performed independently in synchronism with the REF signal.

Figure 36:
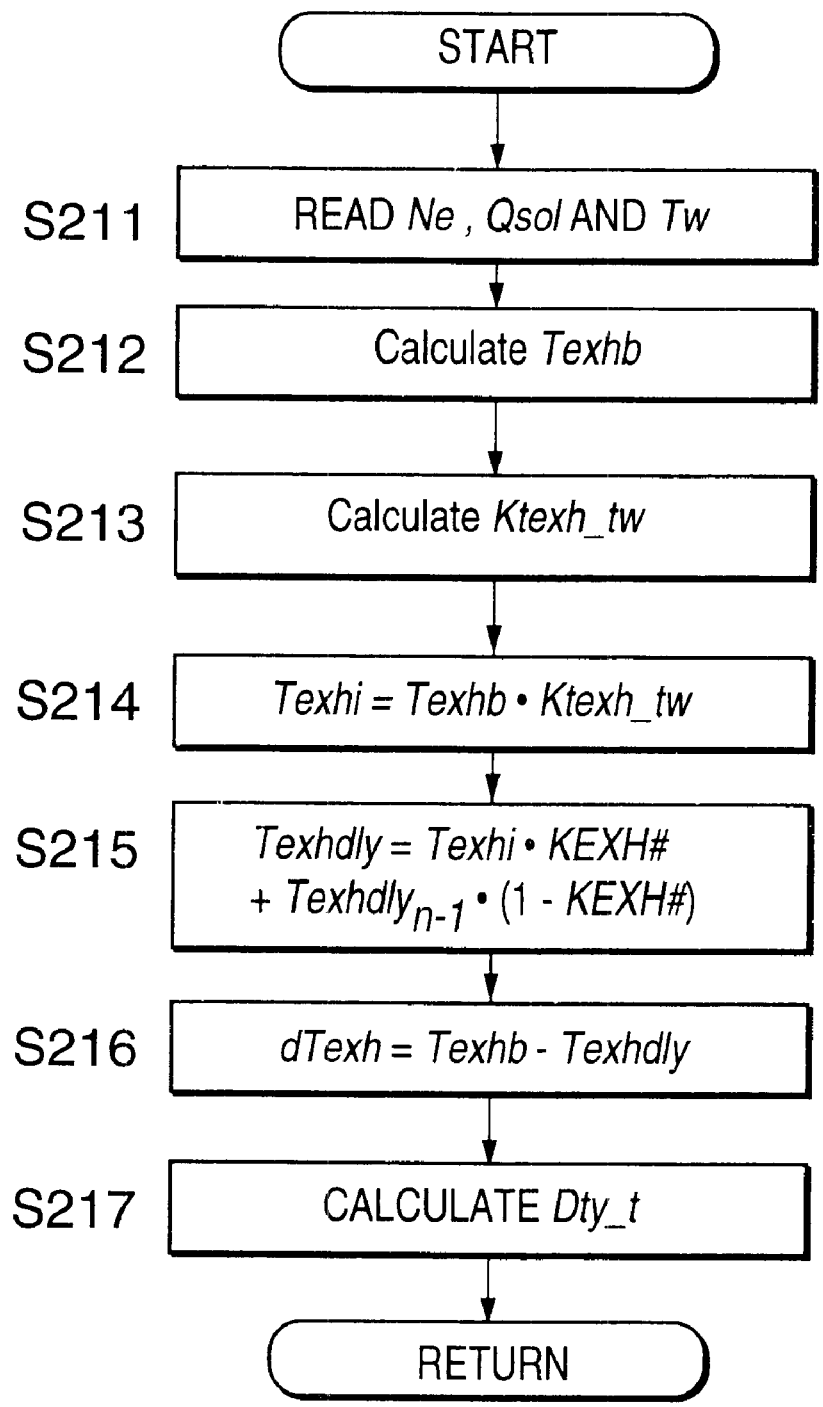
FIG. 36 is a flowchart describing a routine for correcting a temperature correction amount Dty_t of the duty value performed by the control unit.

Referring to FIG. 36, in a step S211, the control unit 41 first reads the engine rotation speed Ne, target fuel injection amount Qsol and cooling water temperature Tw.

Figure 37:
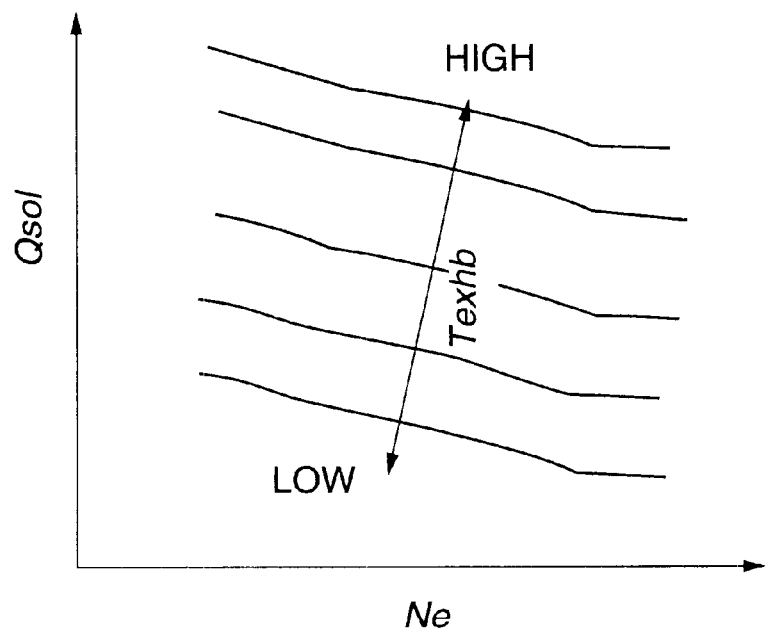
FIG. 37 is a diagram describing the contents of a map of a basic exhaust gas temperature Texhb stored by the control unit.

In a step S212, a basic exhaust gas temperature Texhb is calculated from the engine rotation speed Ne and target fuel injection amount Qsol by looking up a map shown in FIG. 37 previously stored in the memory of the control unit 41. The basic exhaust gas temperature Texhb is the exhaust gas temperature after the diesel engine 1 has completed warming up.

Figure 38:
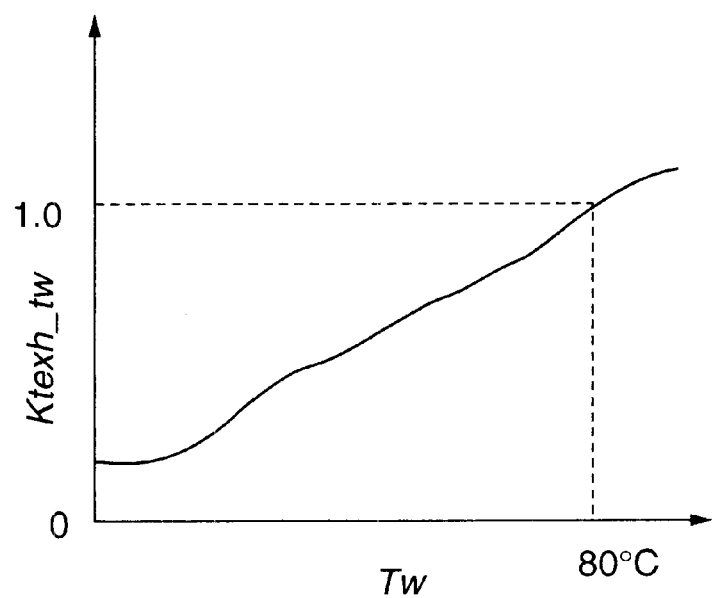
FIG. 38 is a diagram describing the contents of a map of a water temperature correction coefficient Ktexh_Tw stored by the control unit.

In a next step S213, a water temperature correction coefficient Ktexh_Tw is calculated by looking up a map shown in FIG. 38 stored in the control unit 41, based on the cooling water temperature Tw.

In a step S214, an exhaust gas temperature Texhi is calculated by multiplying the basic exhaust gas temperature Texhb by the water temperature correction coefficient Ktexh_Tw.

In a next step S215, a real exhaust gas temperature Texhdly is calculated by adding a first order processing delay to the exhaust gas temperature Texhi by the following equation (15). This value is a value which takes account of the delay due to the heat inertia in the variation of exhaust gas temperature.

$$Texhdly = Texhi \cdot KEXH\# + Texhdly_{n-1} \cdot (1-KEXH\#) \tag{15}$$

where,

KEXH#=constant, and

Texhdly$_{n-1}$=Texhdly calculated on the immediately preceding occasion when the subroutine was executed.

In a following step S216, a difference dTexh of the basic exhaust gas temperature Texhb and this real exhaust gas temperature Texhdly is calculated.

Figure 39:
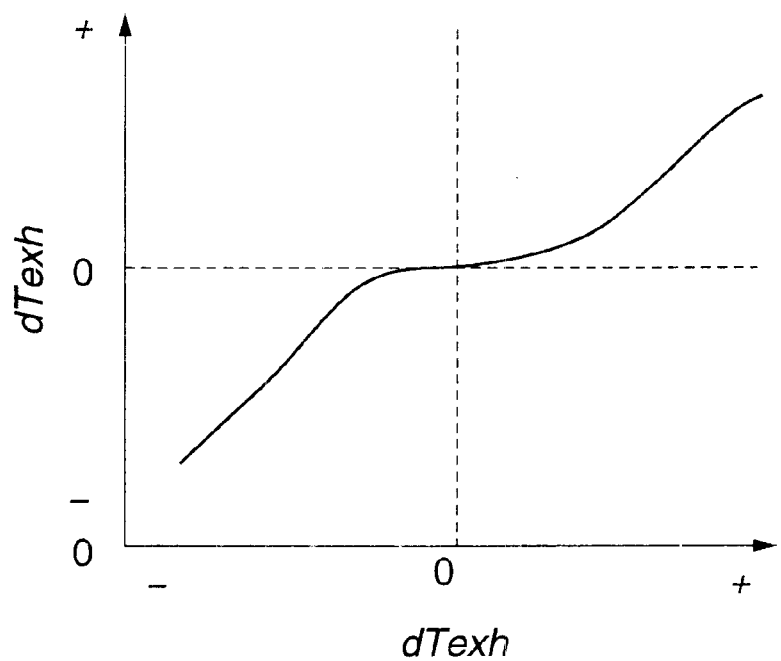
FIG. 39 is a diagram describing the contents of a map of the temperature correction amount Dty_t stored by the control unit.

In a last step S217, the duty value temperature correction amount Dty_t is calculated by looking up a map shown in FIG. 39 previously stored in the memory of the control unit 41, based on the difference dTexh. The meaning of the processing of the steps S216 and S217 will be described in detail later.

After the end of the subroutine, the control unit 41 returns to the subroutine of FIG. 34 and performs processing after the step S184. Steps S184–S189 are steps which add hysteresis processing to the duty value.

Figure 40:
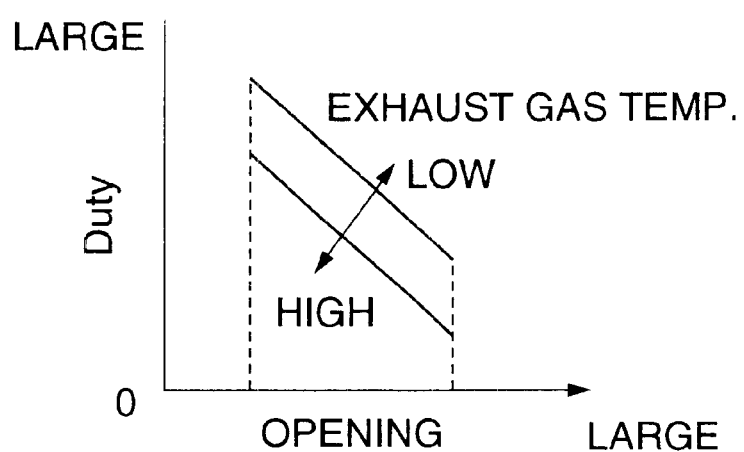
FIG. 40 is a diagram describing the temperature characteristics of an actuator of the turbocharger.
Figure 45:
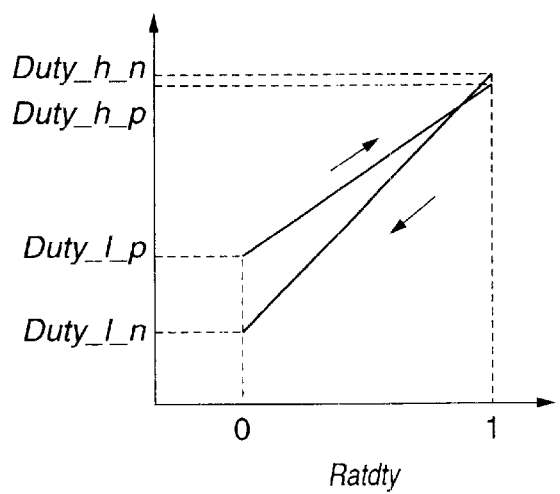
FIG. 45 is a diagram describing a hysteresis in the relation between a command opening linearization processing value and the duty value according to this invention.

Describing this hysteresis processing with reference to FIG. 45, when the linearization processing value Ratdty of the command opening Avnt is increasing, the duty value is made to vary according to a straight line which joins a command signal Duty_l_p when the variable nozzle 53 is fully open, and a command signal Duty_h_p when the variable nozzle 53 is fully closed. On the other hand, when the linearization processing value Ratdty is decreasing, the duty value is made to vary according to a straight line which connects a command signal Duty_l_n when the variable nozzle 53 is fully open, and a command signal Duty_h_n when the variable nozzle 53 is fully closed. In the drawing, two lines intersect in the region where the variable nozzle 53 is nearly closed, but this region is a region which is not used in actual control of the pressure control valve 56. These characteristics are set assuming that the diesel engine 1 has completely warmed up. When the real exhaust gas temperature Texhdly is low, the pressure actuator 54 has the characteristic of opening the variable nozzle 53 larger for the same duty value, as shown in FIG. 40. Hence, it is necessary to apply the temperature correction amount Dty_t calculated in the steps S216, S217 of FIG. 36, to compensate the difference in the characteristic of the pressure actuator 54 due to the exhaust gas temperature.

Figure 41:
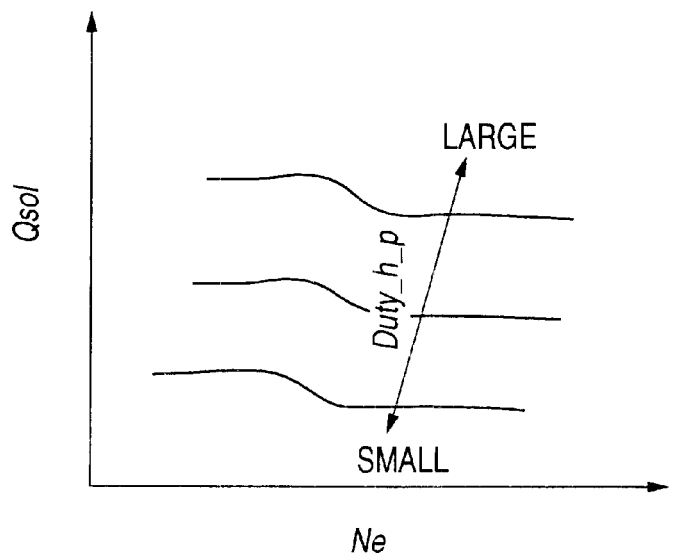
FIG. 41 is a diagram of the contents of a map of a duty value Duty_h when the variable nozzle is fully closed, when the opening of the variable nozzle is constant or increasing, stored by the control unit.

Now, the control unit 41 determines the operation direction flag fvnt in the step S184. When the operation direction flag fvnt is 1, i.e., when the command opening Avnt is increasing or constant, the processing of steps S185, S186 is performed. In the step S185, a duty value Duty_h when the variable nozzle 53 is fully closed, is calculated based on the target fuel injection amount Qsol by looking up a Duty_h_p map shown in FIG. 41.

Figure 42:
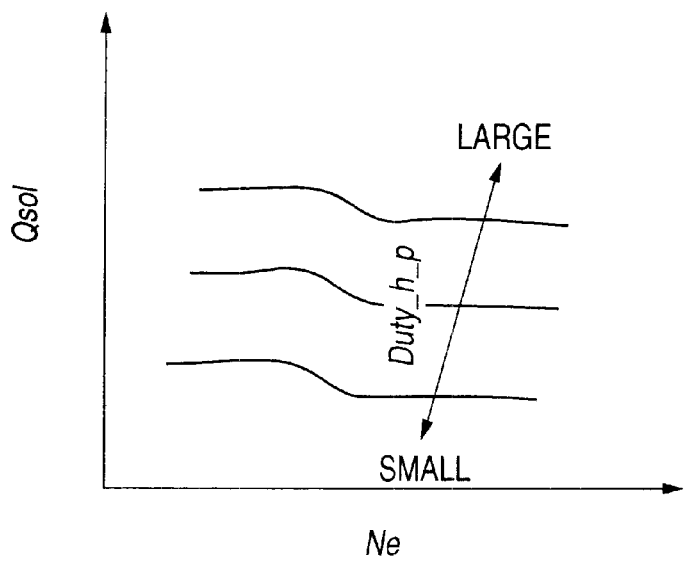
FIG. 42 is a diagram of the contents of a map of a duty value Duty_l when the variable nozzle is fully open, when the opening of the variable nozzle is constant or increasing, stored by the control unit.

In the following step S186, a duty value Duty_l when the variable nozzle 53 is fully open, is calculated by looking up a Duty_l_p map shown in FIG. 42. After this processing, the subroutine proceeds to a step S189.

Figure 43:
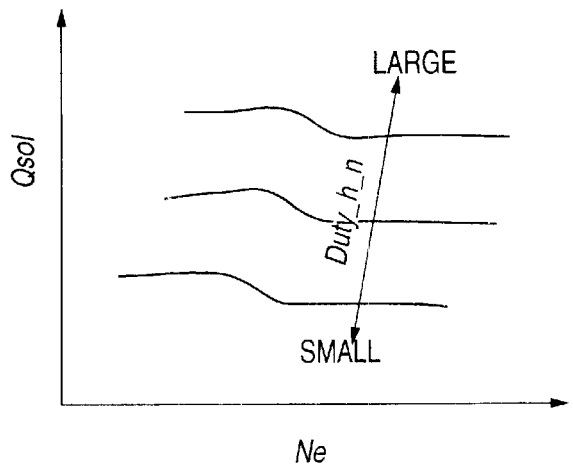
FIG. 43 is similar to FIG. 41, but showing a case where the opening of the variable nozzle is decreasing.
Figure 44:
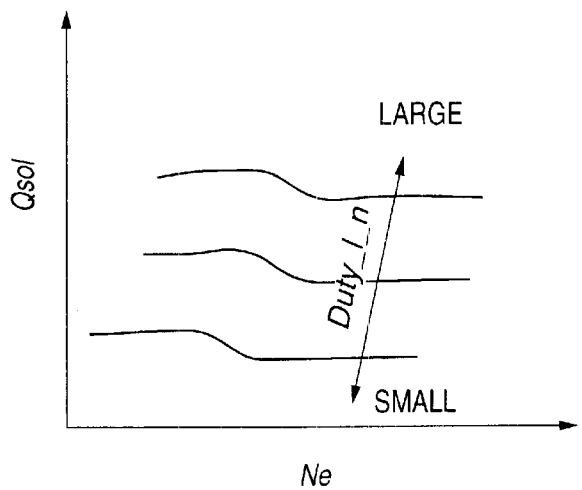
FIG. 44 is similar to FIG. 42, but showing a case where the opening of the variable nozzle is decreasing.

When the operation direction flag fvnt is 0 in the step S184, i.e., when the command opening Avnt is decreasing, the processing of steps S187, S188 is performed. In the step S187, the duty value Duty_h when the variable nozzle 53 is fully closed, is calculated based on the target fuel injection amount Qsol by looking up a Duty_h_n map shown in FIG. 43. In the following step S188, the duty value Duty_l when the variable nozzle 53 is fully open, is calculated based on the target fuel injection amount Qsol by looking up a Duty_l_n map shown in FIG. 44.

After this processing, the subroutine proceeds to a step S189.

In the step S189, a command duty basic value Dty_h is calculated by performing linear interpolation processing using the duty values Duty_h, Duty_l found by the above processing, the linearization processing value Ratdty of the command opening Avnt, and the temperature correction amount Dty_t. By changing the straight line used for linear interpolation processing in the case where the command opening Avnt, is decreasing, and the case where it is not, the command duty basic value Dty_h is made smaller, for the same linearization processing value Ratdty, in the case where the command opening Avnt is decreasing than in other cases.

In a next step S190, the duty hold flag fvnt2 is determined. When the duty hold flag fvnt2 is 1, i.e., the command opening prediction value Adlyvnt is not changing, a command duty value Dtyv is set equal to the duty value $Dtyvnt_{n-1}$ calculated on the immediately preceding occasion the subroutine was executed, in a step S191. The duty value $Dtyvnt_{n-1}$ will be described in detail later.

When the duty maintenance flag fvnt2 is 0, i.e., when the command opening prediction value Adlyvnt is changing, in a step S192, the command duty value Dtyv is set equal to the command duty basic value Dty_h calculated in the step S189.

Figure 46:
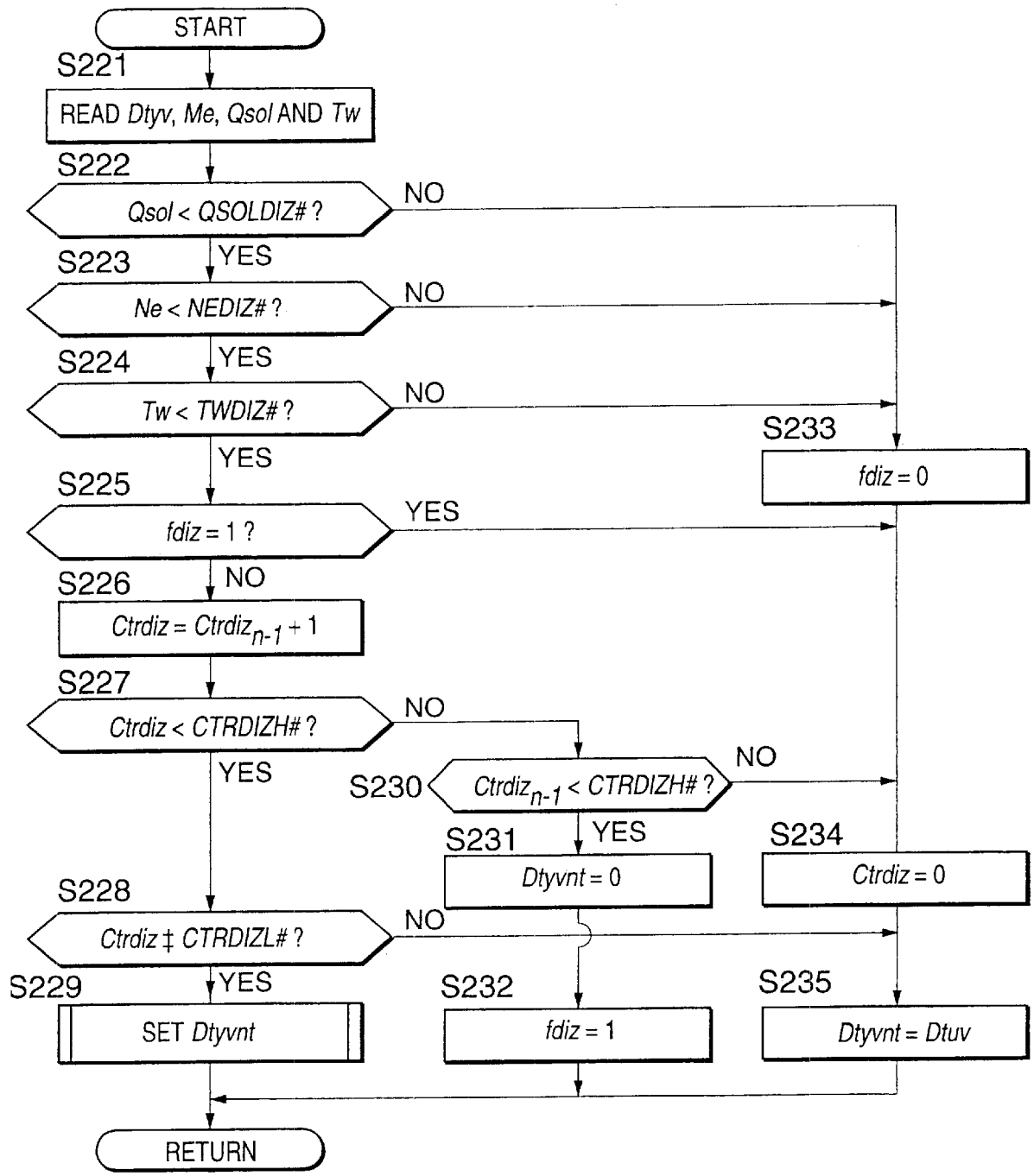
FIG. 46 is a flowchart describing an operation check subroutine performed by the control unit.

Thus, after determining the command duty value Dtyv in the step S191 or step S192, in a final step S193, the control unit 41 performs an operation check on the variable nozzle 53 using the subroutine of FIG. 46 based on the command duty value Dtyv.

Referring to FIG. 46, in a step S221, the control unit 41 first reads the command duty value Dtyv, engine rotation speed Ne, target fuel injection amount Qsol and the cooling water temperature Tw.

In subsequent steps S222–S225, it is determined whether or not operation check conditions are satisfied. An operation check is performed only when all these conditions are satisfied.

In the step S222, it is determined whether or not the target fuel injection amount Qsol is less than a predetermined value QSOLDIZ#. When this condition is satisfied, it means that the diesel engine 1 is performing fuel cut.

In the step S223, it is determined whether or not the engine rotation speed Ne is less than a predetermined value NEDIZ#. When this condition is satisfied, it means that the rotation speed Ne of the diesel engine 1 is in an intermediate or low speed, region.

In the step S224, it is determined whether or not the cooling water temperature Tw is less than a predetermined value TwDIZ#. When this condition is satisfied, it means that warming up of the diesel engine 1 is not complete.

In the step S225, it is determined whether or not an operation check flag Fdiz is 0. When this condition is satisfied, it means that an operation check has not yet been performed.

When all the conditions are satisfied, an operation check counter value CtFdiz is incremented in a step S226, and the routine proceeds to a step S227.

If any of the determination results of the steps S222–S224 is not satisfied, the subroutine resets the operation check flag Fdiz to 0 in a step S233, and proceeds to a step S234. However, when the operation check flag Fdiz is 1 in the step S225, it proceeds to the step S234 immediately.

In a step S227, the operation check counter value CtFdiz is compared with a predetermined upper limiting value CTRDIZH#.

When the operation check counter value CtFdiz is smaller than the upper limiting value CTRDIZH#, in a step S228, the operation check counter value CtFdiz is compared with a predetermined lower limiting value CTRDIZL#. When the operation check counter value CtFdiz is not less than the lower limiting value CTRDIZL#, in a step S229, a duty value Dtyvnt is set for checking operation using a subroutine shown in FIG. 47.

The upper limiting value CTRDIZH# is set to, for example, 7 seconds, and the lower limiting value CTRDIZL# is set to, for example, 2 seconds. In this case, the duty value for checking operation is set only in a 5 second interval of the difference between the upper limiting value and lower limiting value.

Figure 47:
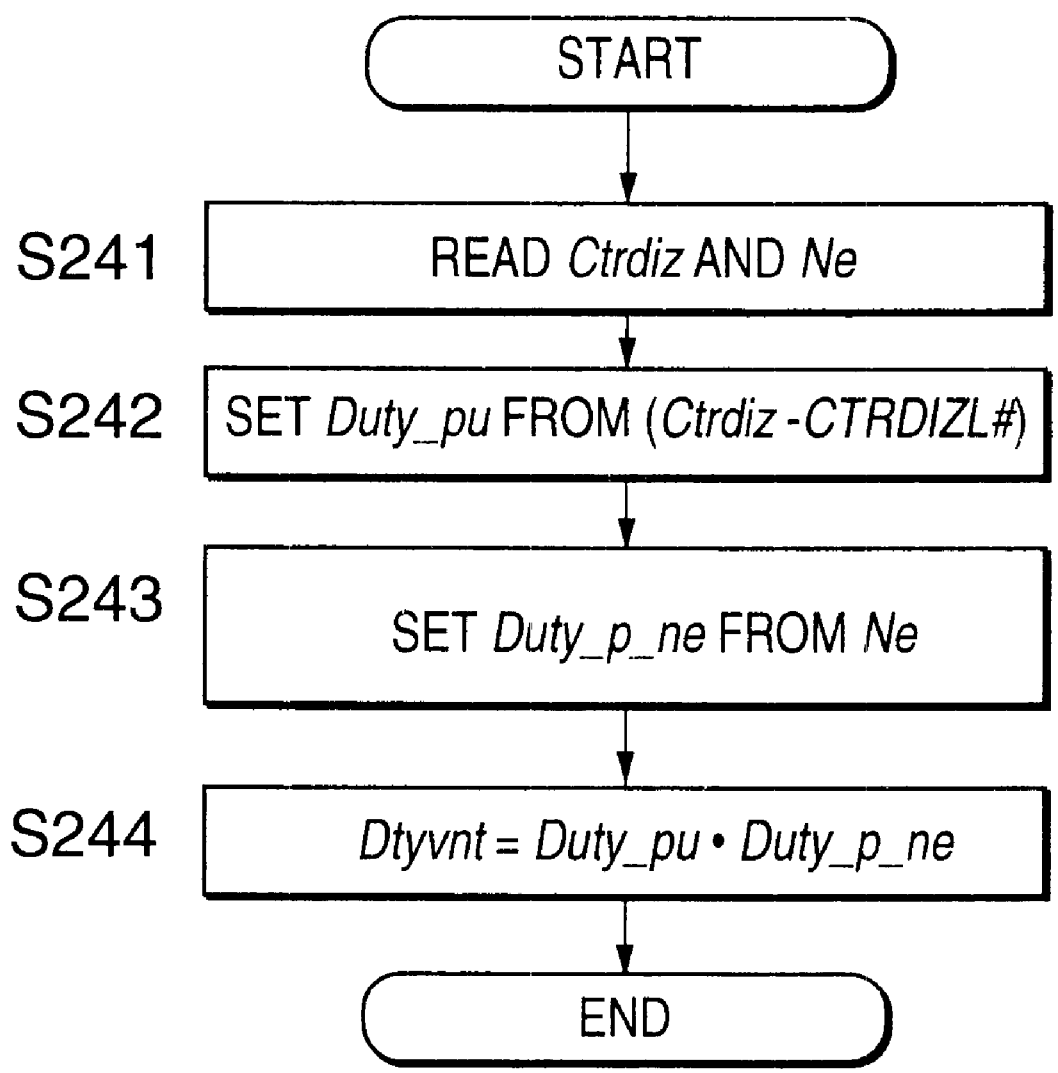
FIG. 47 is a flowchart describing a routine for calculating the duty value Dtyvnt performed by the control unit.

Here, referring to FIG. 47, a subroutine for setting the duty value for operation check will be described.

The control unit 41, in a step S241, first reads the operation check counter value CtFdiz and engine rotation speed Ne.

Figure 48:
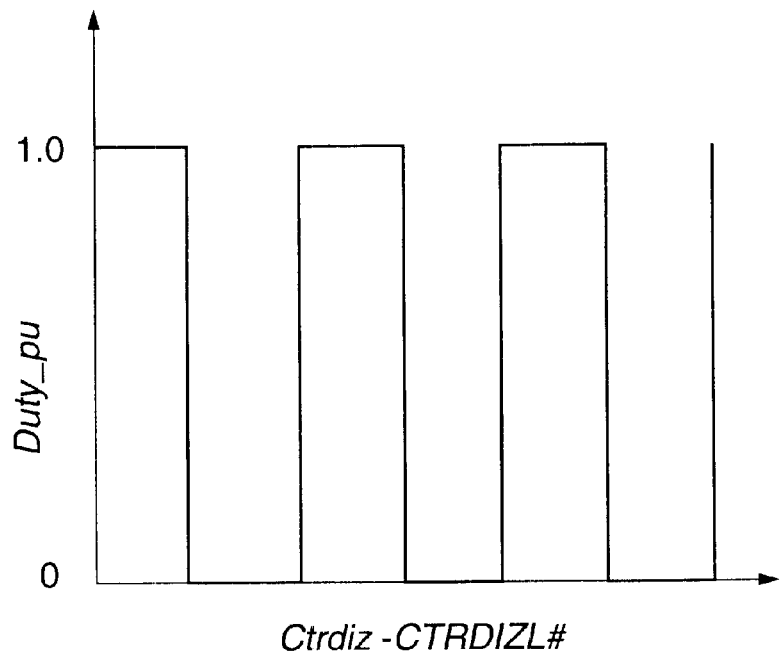
FIG. 48 is a diagram describing the contents of a map of a control pattern value Duty_pu stored by the control unit.

In a following step S242, a control pattern value Duty_pu is set by looking up a map shown in FIG. 48 based on the difference of the operation check counter value CtFdiz and lower limiting value CTRDIZL#. This map is previously stored in the memory of the control unit 71 The control pattern value Duty_pu is set so that it repeatedly varies between 0 and 1 with a short period according to the elapsed time after the operation check counter value CtFdiz exceeds the lower limiting value CTRDIZL#.

Figure 49:
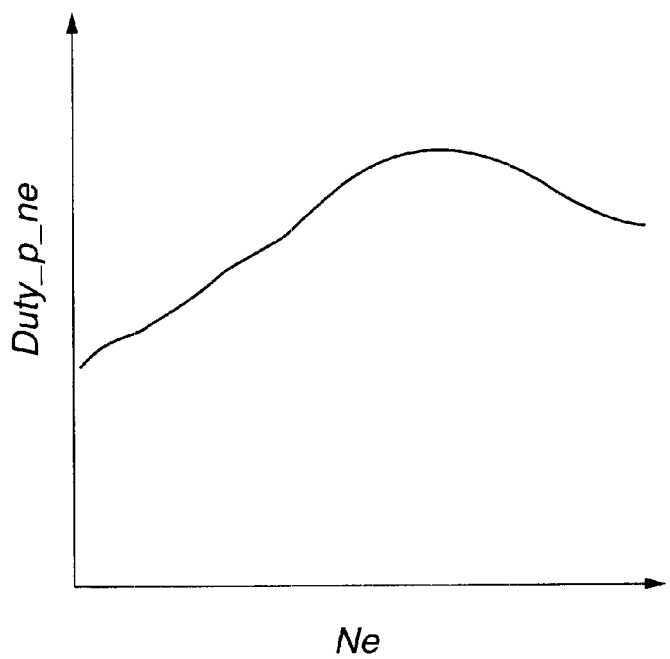
FIG. 49 is a diagram describing the contents of a map of a duty value Duty—p_ne stored by the control unit.

In a next step S243, a duty value Duty_p_ne commanded to the pressure control valve 56 is calculated by looking up a map shown in FIG. 49 previously stored in the memory of the control unit 41, based on the engine rotation speed Ne. The duty value Duty_p_ne is set supposing that the duty for checking the opening and closing operation of the variable nozzle 53 differs according to the engine rotation speed Ne. For example, when the variable nozzle 53 is to be closed, it must close against the exhaust gas pressure. The exhaust gas pressure increases in accordance with the increase in engine rotation speed Ne.

Further, when the engine rotation speed Ne is in the high-speed region, the closing of the variable nozzle 53 to check operation has a major impact on the engine running environment. Therefore, in the high speed region, the duty value Duty_p_ne is decreased as the engine rotation speed Ne increases so as to reduce the impact on the engine running environment.

In a following step S244, the duty value Dtyvnt is calculated by multiplying the duty value Duty_p_ne by the control pattern value Duty_pu, and the subroutine is terminated.

In this way, after terminating the setting of the duty value for checking operation in the step S229 of FIG. 46, the subroutine of FIG. 46 is also terminated.

On the other hand, in the step S227 of FIG. 46, when the operation check counter value CtFdiz is not less than the upper limiting value CTRDIZH#, the processing of the step S230 is performed. Here, an immediately preceding value CtFdiz$_{n-1}$ of the operation check counter value CtFdiz operation is compared with the upper limiting value CTRDIZH#. If the immediately preceding value CtFdiz$_{n-1}$ is less than the upper limiting value CTRDIZH#, it means that CTRDIZH# reached the upper limiting value CTRDIZH# for the first time in the repeat execution of this subroutine, the duty value Dtyvnt is set to 0 in a step S231, the operation check flag Fdiz is set to 1 in a step S232, and the subroutine is terminated.

By once setting the duty value Dtyvnt to 0 in the step S231 when the operation check is completed, the variable nozzle 53 fully opens. This operation aims to maintain control precision during ordinary control performed thereafter. By setting the operation check flag Fdiz to 1, the determination result of the step S225 will always be negative in the execution of the subroutine thereafter. It means the operation check of the variable nozzle 53 is performed only once after starting the diesel engine 1.

On the other hand, when the immediately preceding value CtFdiz$_{n-1}$ of the operation check counter value CtFdiz is not less than the upper limiting value CTRDIZH# in the step S230, the subroutine proceeds to the step S234. In the step S234, the operation check counter value CtFdiz is reset to 0, and the routine proceeds to a step S235.

When the operation check counter value CtFdiz is less than the predetermined lower limiting value CTRDIZL# in the step S228, the subroutine also proceeds to the step S235.

In the step S235, the duty value Dtyvnt for operation check is set equal to the command duty value Dtyv determined in the step S191 or step S192, and the subroutine is terminated. In this case therefore, the ordinary control of the variable nozzle 53 is performed.

In particular, when operation of the pressure actuator 54 is unstable such as at low temperatures etc., this operation check of the variable nozzle 53 makes the operation of the variable nozzle 53 smooth and increases reliability in control of turbocharging pressure.

In this way, by ending the subroutine of FIG. 46, the processing of the subroutine of FIG. 34 and also that of the main routine of FIG. 15 is terminated.

Next, referring to FIG. 5, the calculation of the target opening area Aev of the EGR valve 6 will be described. This routine constitutes the main feature of this invention. This routine is performed every time the REF signal is input.

Figure 7:
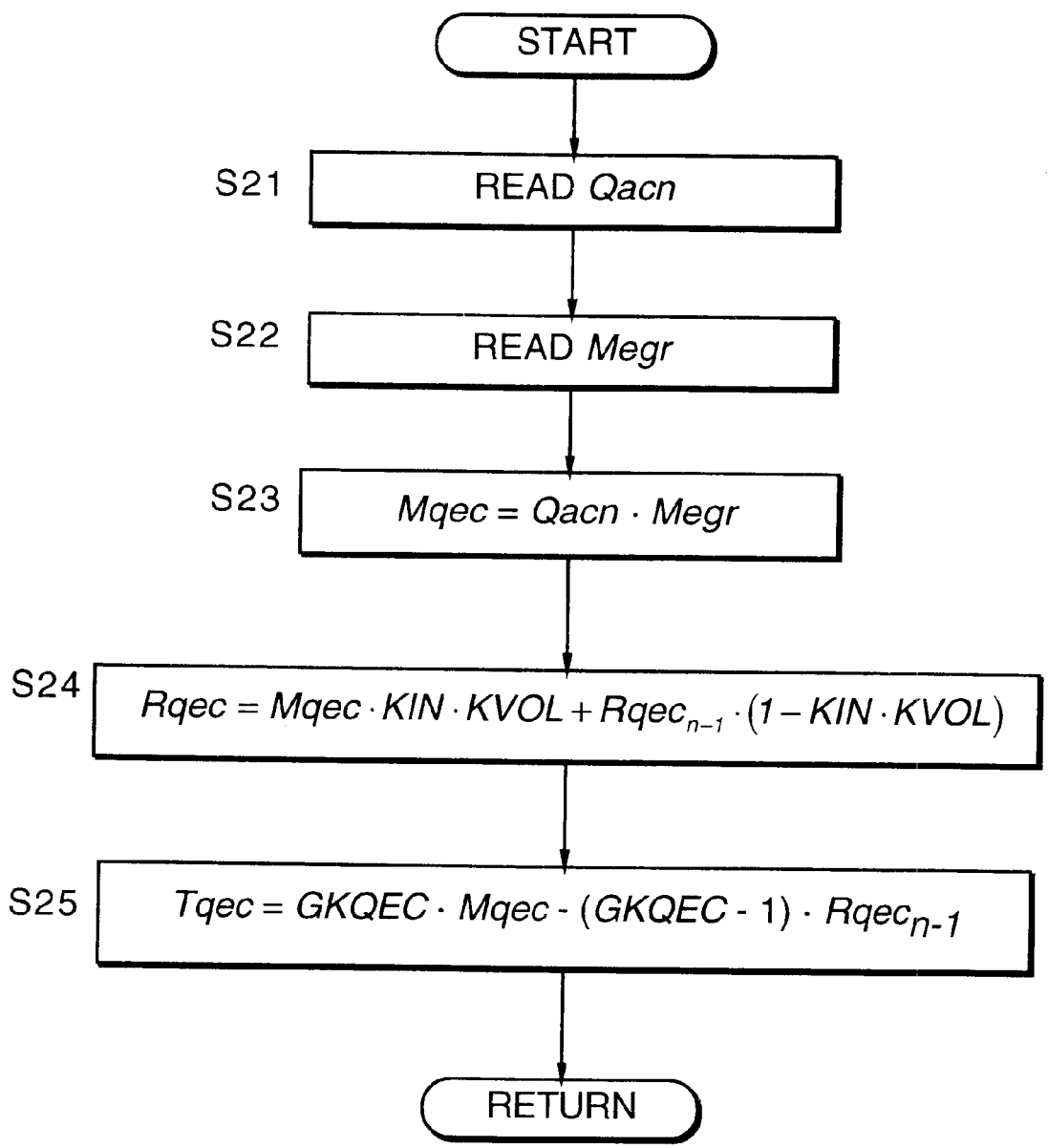
FIG. 7 is a flowchart describing a routine for calculating a target EGR amount Tqec performed by the control unit.

First, in a step S11, the control unit 41 calculates a target EGR amount Tqec of the EGR valve 6 using a subroutine shown in FIG. 7.

Referring to FIG. 7, in a step S21, the control unit 41 reads the intake air amount Qac$_n$ per cylinder at the inlet of the collector 3A. Qac$_n$ is a value calculated in the above-mentioned step S33 of FIG. 8.

In a following step S22, the target EGR rate Megr is read. The target EGR rate Megr is a value calculated by the routine of FIG. 11.

In a next step S23, a required EGR amount Mqec is calculated by the following equation (16).

$$Mqec = Qac_n \cdot Megr \qquad (16)$$

In a next step S24, delay processing is performed on the required EGR amount Mqec by the following equation (17), using the time constant equivalent value Kkin calculated by the routine of FIG. 18, to convert it to an intermediate value Rqec corresponding to the required EGR amount per cylinder in the intake valve position of the diesel engine 1.

$$Rqec = Mqec \cdot Kkin + Rqec_{n-1} \cdot (1-Kkin) \qquad (17)$$

where,

RQec$_{n-1}$=Rqec calculated on the immediately preceding occasion the subroutine was executed.

In a last step S25, the target EGR amount Tqec per cylinder in the position of the EGR valve 6 is calculated by performing advance processing by the following equation (18) using the intermediate value Rqec and the required EGR amount Mqec.

$$Tqec = Mqec \cdot GKQEC + Rqec_{n-1} \cdot (1-GKQEC) \qquad (18)$$

where,

GKQEC=advance correction gain.

Figure 50:
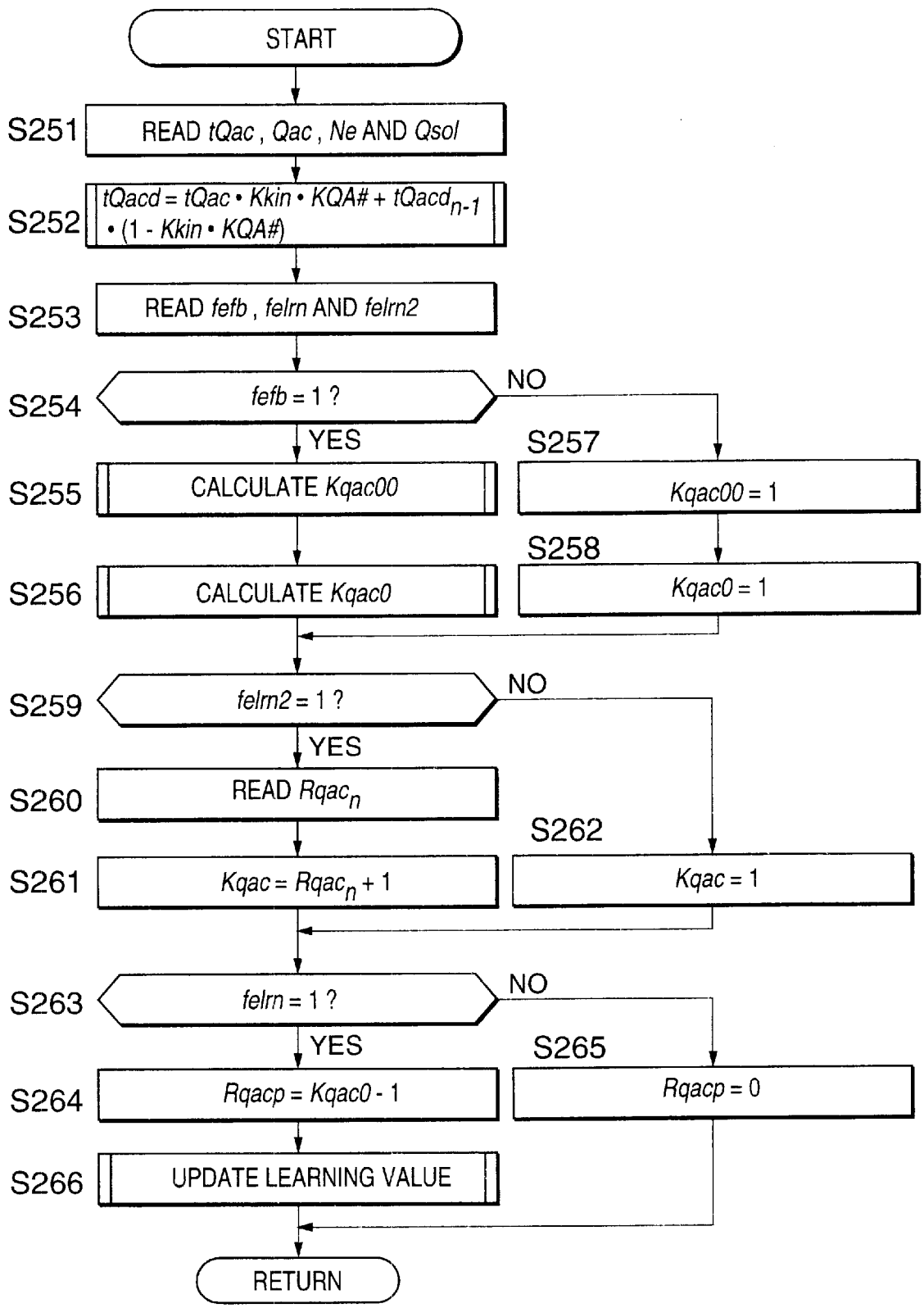
FIG. 50 is a flowchart describing a subroutine for calculating an EGR amount feedback correction coefficients Kqac00, an EGR flow velocity feedback correction coefficient Kqac0, and an EGR flow velocity learning correction coefficient Kqac, performed by the control unit.

Referring again to FIG. 5, after calculating the target EGR amount Tqec in the step S11, in a step S12, the control unit 41 calculates the EGR flow velocity feedback correction coefficient Kqac0, the EGR amount feedback correction coefficient Kqac00, and the EGR flow velocity learning correction coefficient Kqac, using a subroutine of FIG. 50.

Referring to FIG. 50, in a step S251, the control unit 41 first reads the target intake air amount tQac, real intake air amount Qac, engine rotation speed Ne and target fuel injection amount Qsol.

Figure 8:
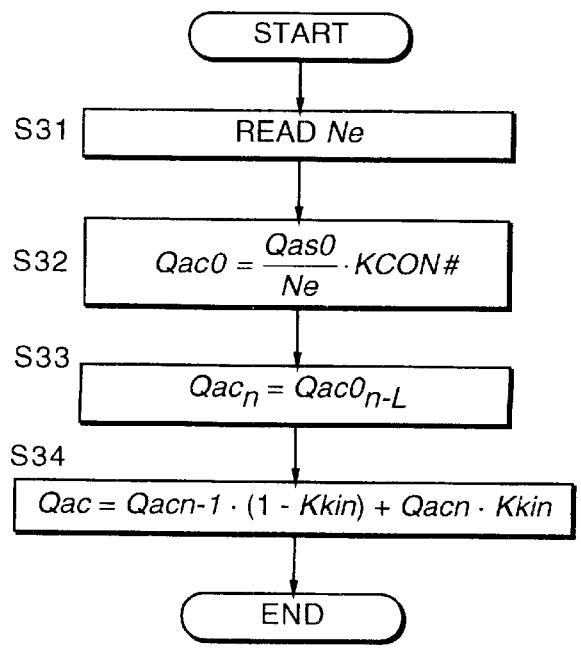
FIG. 8 is a flowchart describing a routine for calculating a cylinder intake air amount Qac performed by the control unit.

In a step S252, a delay processing value tQacd of the target intake air amount tQac is calculated using the following equation (19), from the target intake air amount tQac and the time constant equivalent value Kkin calculated by the routine of FIG. 8. This value corresponds to the target intake air amount in the intake valve position of the diesel engine 1.

$$tQacd = tQac \cdot Kkin \cdot KQA\# + tQacd_{n-1} \cdot (1-Kkin \cdot KQA\#) \qquad (19)$$

where,

KQA#=constant, and tQacd$_{n-1}$=tQacd calculated on the immediately preceding occasion when the subroutine was executed.

In a following step S253, a feedback permission flag fefb, a learning permission flag felrn and a learning value reflection permission flag felrn2 which are related to the control of the EGR valve opening are read.

Figure 51:
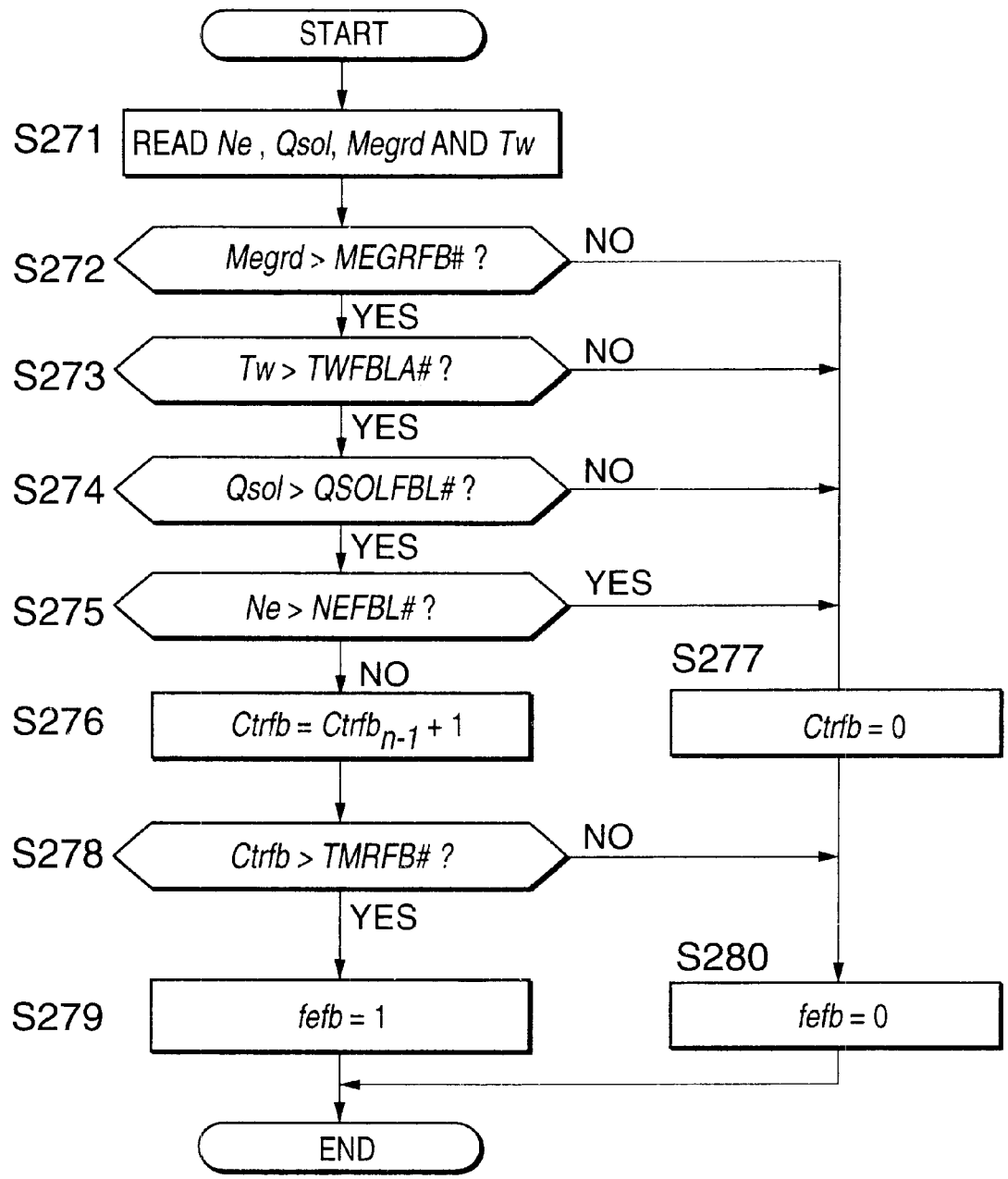
FIG. 51 is a flowchart describing a routine for setting a feedback permission flag fefb performed by the control unit.
Figure 52:
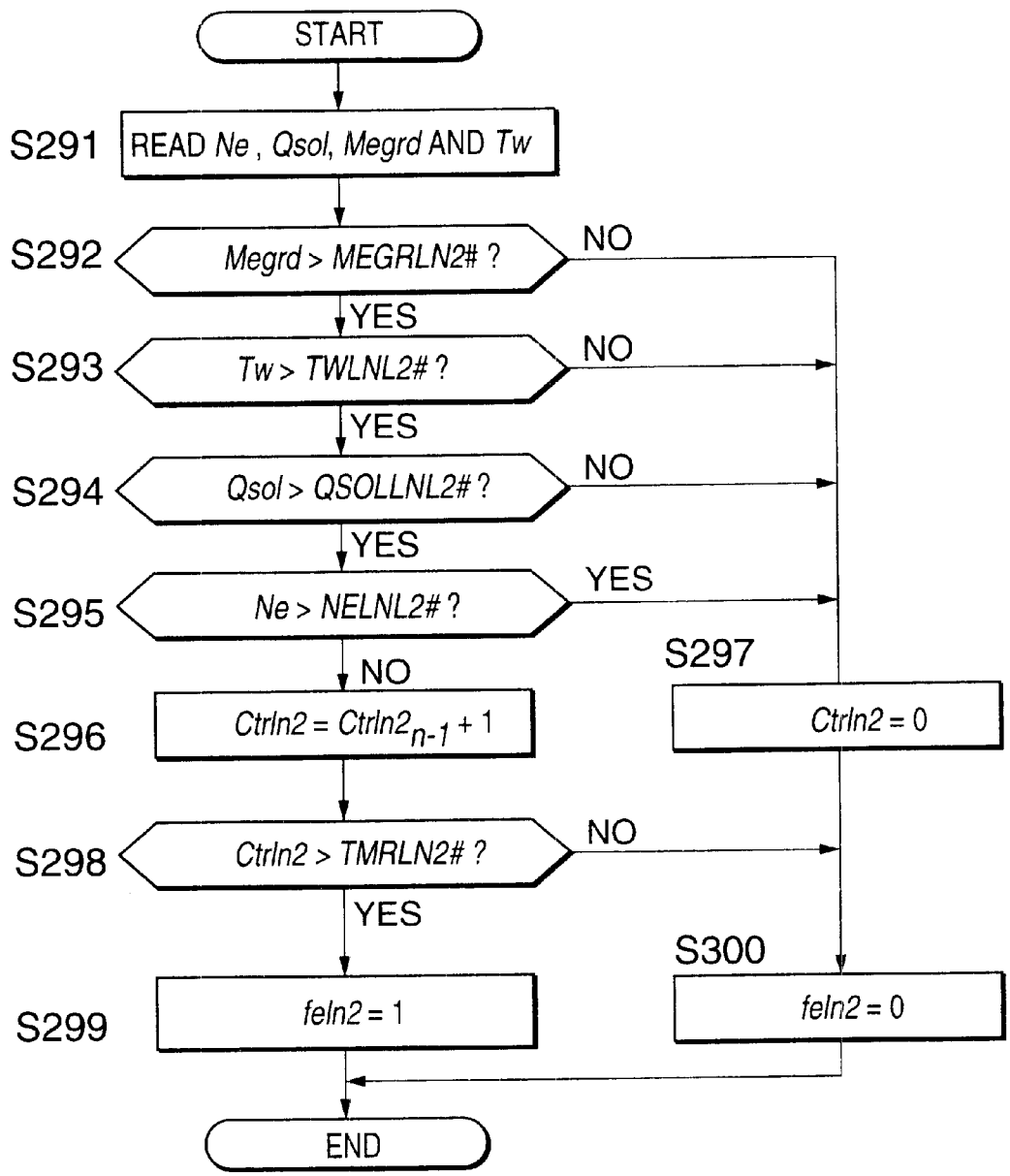
FIG. 52 is a flowchart describing a routine for setting a learning value reflection permission flag felrn2 performed by the control unit.
Figure 53:
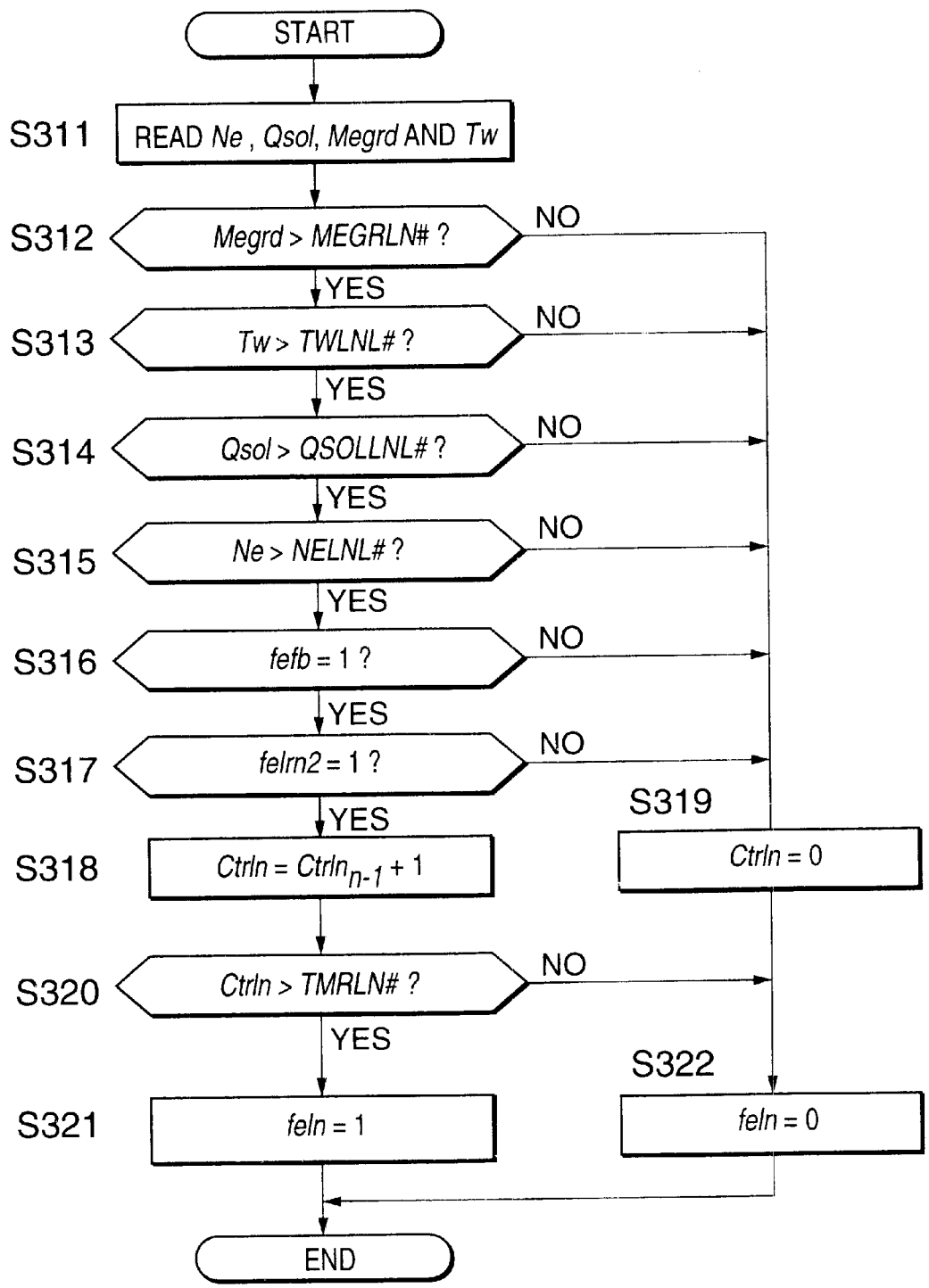
FIG. 53 is a flowchart describing a routine for setting a learning permission flag felrn performed by the control unit.

These flags are set by the independent routines shown in FIG. 51, FIG. 52 and FIG. 53, respectively.

FIG. 51 shows the routine for setting the feedback permission flag fefb. This routine is performed at an interval of 10 milliseconds.

Referring to FIG. 51, firstly in a step S271, the control unit 41 reads the engine rotation speed Ne, target fuel injection amount Qsol, real EGR rate Megrd and water temperature Tw.

In subsequent steps S272–S275, the EGR amount feedback control conditions are determined.

In the step S272, it is determined whether or not the real EGR rate Megrd exceeds a predetermined value MEGRFB#. The predetermined value MEGRFB# is a value for checking that exhaust gas recirculation is actually performed. In the step S273, it is determined whether or not the cooling water temperature Tw exceeds a predetermined value TwFBL#. The predetermined value TwFBL# is set to 30' C. In a step S274, it is determined whether or not the target fuel injection amount Qsol exceeds a predetermined value QSOLFBL#.

The predetermined value QSOLFBL# is a value for checking that the diesel engine 1 is not in a fuel cut state. In a step S275, it is determined whether or not the engine rotation speed Ne exceeds a predetermined value NeFBL#. The predetermined value NeFBL# is a value for checking that the vehicle is not in a low-speed region where the diesel engine 1 stops rotation.

When all of the conditions of step S272–S275 are satisfied, the subroutine proceeds to a step S276 and increments a timer value Ctrfb.

In a following step S278, it is determined whether or not the timer value Ctrfb is greater than a predetermined value TMRFB#. The predetermined value TMRFB# is set to, for example, a value less than 1 second. When the result of this determination is affirmative, the subroutine sets the feedback permission flag fefb to 1 in a step S279, and the subroutine is terminated. On the other hand, if any of the conditions of the steps S272–S275 is not satisfied, in a step S277, the subroutine resets the timer value Ctrfb to 0, and proceeds to a following step S280.

When the determination of the step S278 is negative, the subroutine also proceeds to the step S280.

In the step S280, the feedback permission flag fefb is reset to 0 and the subroutine is terminated.

According to this subroutine, the feedback permission flag fefb is set to 1 only when the state where all of the conditions of the steps S272–S275 were satisfied, continues for a time exceeding the predetermined value TMRFB#, and in other cases, the feedback permission flag fefb is reset to 0.

FIG. 52 shows a routine for setting the learning value reflection permission flag felrn2. This routine is also performed at an interval of 10 milliseconds.

Referring to FIG. 52, firstly in a step S291, the control unit 41 reads the engine rotation speed Ne, target fuel injection amount Qsol, real EGR rate Megrd and cooling water temperature Tw.

In subsequent steps S292–S295, EGR amount learning value reflection conditions are determined.

In the step S292, it is determined whether or not the real EGR rate Megrd exceeds a predetermined value MEGRLN2#. The predetermined value MEGRLN2# is a value for checking that exhaust gas recirculation is actually performed. In the step S293, it is determined whether or not the cooling water temperature Tw exceeds a predetermined value TwLNL2#. The predetermined value TWLNL2# is set to 20'C. In the step S294, it is determined whether or not the target fuel injection amount Qsol exceeds a predetermined value QSOLLNL2#. The predetermined value QSOLLNL2# is a value for checking that the diesel engine 1 is not in a fuel cut state. In the step S295, it is determined whether or not the engine rotation speed Ne exceeds a predetermined value NeLNL2#. The predetermined value NeLNL2# is a value for checking that the vehicle is not in a low-speed region where the diesel engine 1 stops rotation.

Only when all of the conditions of step S292–S295 are satisfied, the subroutine proceeds to a step S296 and increments a timer value Ctrln2.

In the following step S298 it is determined whether or not the timer value Ctrln2 exceeds a predetermined value TMRLN2#. The predetermined value TMRLN2# is set to 0.5 seconds. When the result of this determination is affirmative, the subroutine sets the learning value reflection permission flag felrn2 to 1 in a step S299, and the subroutine is terminated.

On the other hand, when any of the conditions of the steps S292–S295 is not satisfied, in a step S297, the subroutine resets the timer value Ctrln2 to 0, and proceeds to a following step S300. When the determination of the step S298 is negative, the subroutine also proceeds to the step S300.

In the step S300, the learning value reflection permission flag felrn2 is reset to 0 and the subroutine is terminated.

FIG. 53 shows the routine for setting the learning permission flag felrn. This routine is also performed at an interval of 10 milliseconds.

Referring to FIG. 53, firstly in a step S311, the control unit 41 reads the engine rotation speed Ne, target fuel injection amount Qsol, real EGR rate Megrd, and water temperature Tw.

In subsequent steps S312–S317, the EGR amount learning permission conditions are determined.

In the step S312, it is determined whether or not the real EGR rate Megrd exceeds a predetermined value MEGRLN#. The predetermined value MEGRLN# is a value for checking that exhaust gas recirculation is actually performed. In the step S313, it is determined whether or not the cooling water temperature Tw exceeds a predetermined value TwLNL#. The predetermined value TwLNL# is set to 70–80'C. In the step S314, it is determined whether or not the target fuel injection amount Qsol exceeds a predetermined value QSOLLNL#. The predetermined value QSOLLNL# is a value for checking that the diesel engine 1 is not in a fuel cut state. In the step S315, it is determined whether or not the engine rotation speed Ne exceeds a predetermined value NeLNL#. The predetermined value NeLNL# is a value for checking that the vehicle is not in a low-speed region where the diesel engine 1 stops rotation. In the step S316, it is determined whether or not the feedback permission flag fefb is 1. In the step S317, it is determined whether or not the learning value reflection permission flag felrn2 is 1.

Only when all of the conditions of the steps S2312–S317 are satisfied, the subroutine proceeds to a step S318 and increments a timer value Ctrln.

In a following step S320, it is determined whether or not the timer value Ctrln exceeds a predetermined value TMRLN#. The predetermined value TMRLN# is set to 4 seconds. When the result of this determination is affirmative, the subroutine sets the learning permission flag felrn to 1 in a step S321, and the subroutine is terminated. On the other hand, if any of the conditions of the steps S312–S317 are not satisfied, in a step S319, the subroutine resets the timer value Ctrln to 0, and proceeds to a following step S322. The subroutine also proceeds to the step S322 when the determination of the step S320 is negative. In the step S322, the learning permission flag felrn is reset to 0, and the subroutine is terminated.

Referring again to FIG. 50, after reading this feedback permission flag fefb, learning value reflection permission flag felrn2 and learning permission flag felrn, in a step S254, the control unit 41 determines whether or not the feedback permission flag fefb is 1.

When the feedback permission flag fefb is 1, after calculating the feedback correction coefficient Kqac00 of the EGR amount in a step S255, and the feedback correction coefficient Kqac0 of the EGR flow velocity in a step S256, the control unit 41 proceeds to a step S259.

On the other hand, when the feedback permission flag fefb is not 1 in the step S254, the control unit 41 sets the feedback correction coefficient Kqac00 of the EGR amount to 1 in a step S257, sets the feedback correction coefficient Kqac0 of the EGR flow velocity to 1 in a following step S258, and then proceeds to the step S259.

Now, the calculation of the feedback correction coefficient Kqac00 of the EGR amount performed in the step S255 and the calculation of the feedback correction coefficient Kqac0 of the EGR velocity performed in the step S256, will be described.

Figure 54:
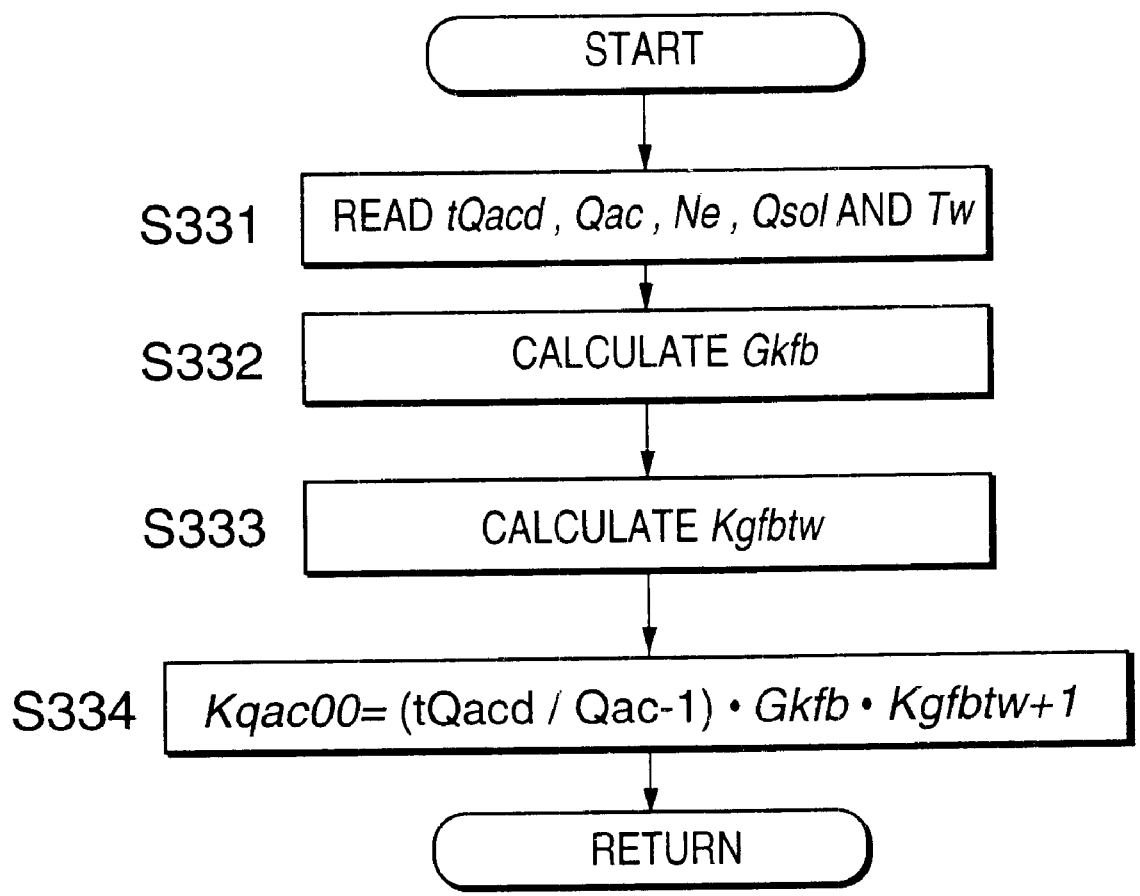
FIG. 54 is a flowchart describing a routine for calculating the feedback correction coefficient Kqac00 performed by the control unit.

The calculation of the feedback correction coefficient Kqac00 of the EGR amount is performed by a subroutine of FIG. 54.

Referring to FIG. 54, in a step S331, the control unit 41 first reads the delay processing value tQacd of the target intake air amount, real intake air amount Qac, engine rotation speed Ne, target fuel injection amount Qsol and the cooling water temperature Tw. The delay processing value tQacd is a value calculated in the step S252 of FIG. 50.

Figure 55:
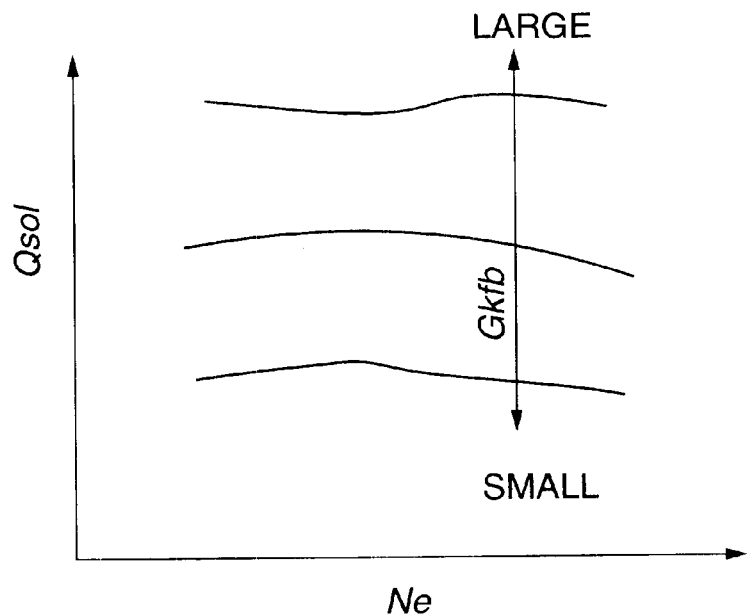
FIG. 55 is a diagram describing the contents of a map of a correction gain Gkfb of an exhaust gas recirculation flowrate stored by the control unit.
Figure 56:
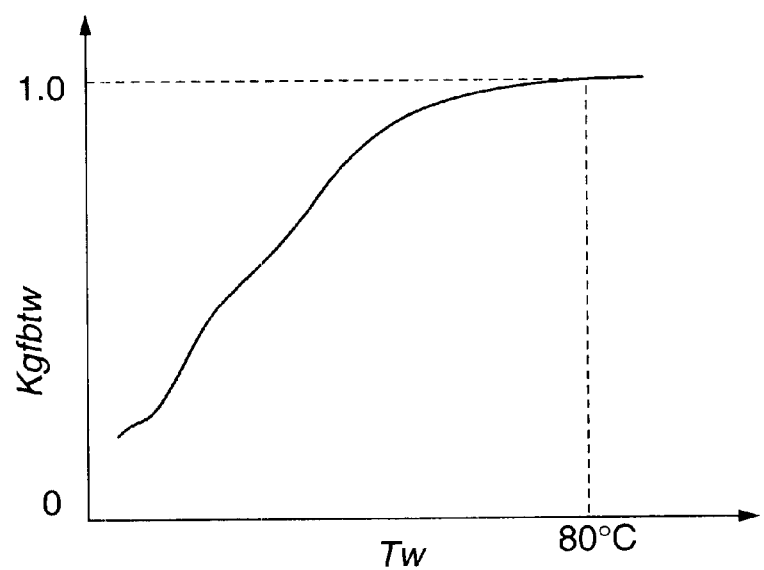
FIG. 56 is a diagram describing the contents of a map of a water temperature correction coefficient KgfbTw stored by the control unit.

In a step S332, a correction gain Gkfb of the EGR flowrate is calculated by looking up a map shown in FIG. 55 previously stored in the memory of the control unit 41, based on the engine rotation speed Ne and the target fuel injection amount Qsol. In a following step S333, a water temperature correction coefficient KgfbTw of the correction gain is calculated by looking up a map shown in FIG. 56 previously stored in the memory of the control unit 41, based on the cooling water temperature Tw.

In a final step S334, the feedback correction coefficient Kqac00 of the EGR amount is calculated by the following equation (20), using the correction gain Gkfb and the water temperature correction coefficient KgfbTw.

$$Kqac00=(tQacd/Qac-1)\cdot Gkfb\cdot Kgfbtw+1 \quad (20)$$

(tQacd/Qac−1), the first term on the right hand side of equation (20), is an error ratio of the target intake air amount delay processing value tQacd relative to the real intake air amount Qac. Therefore, the feedback correction coefficient Kqac00 of the EGR amount is a value centered on 1. According to equation (20), the feedback correction coefficient Kqac00 of the EGR amount is determined to be proportional to the error ratio of the delay processing value tQacd of the target intake air amount.

Figure 57:
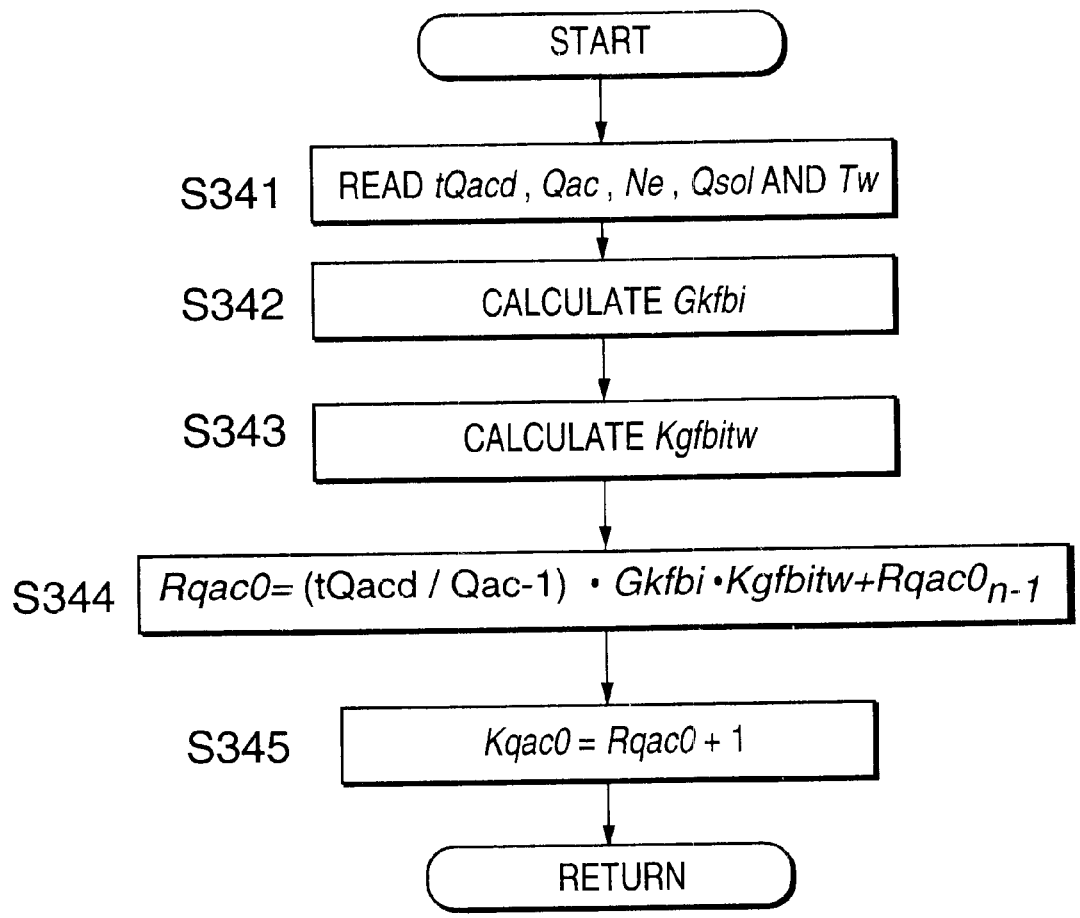
FIG. 57 is a flowchart describing a routine for calculating the flow velocity feedback correction coefficient Kqac0 performed by the control unit.

The calculation of the feedback correction coefficient Kqac0 of the EGR flow velocity is performed by a subroutine shown in FIG. 57.

Referring to FIG. 57, in a step S341, the control unit 41 first reads the delay processing value tQacd of the target intake air amount, real intake air amount Qac, engine rotation speed Ne, target fuel injection amount Qsol and the cooling water temperature Tw.

Figure 58:
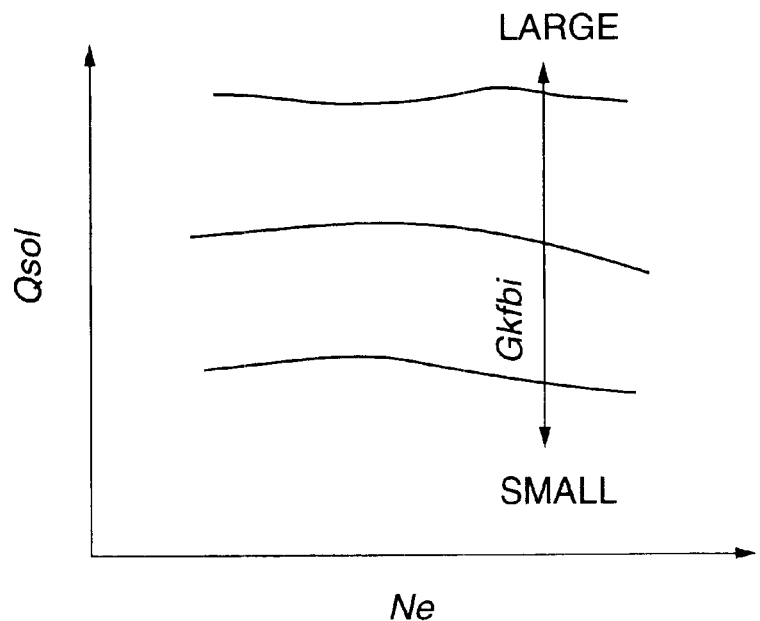
FIG. 58 is a diagram describing the contents of a map of a correction gain Gkfbi of the exhaust gas recirculation flow velocity stored by the control unit.

In a step S342, a correction gain Gkfbi of the EGR flow velocity is calculated by looking up a map shown in FIG. 58 previously stored in the memory of the control unit 41, based on the engine rotation speed Ne and the fuel injection amount Qsol.

Figure 59:
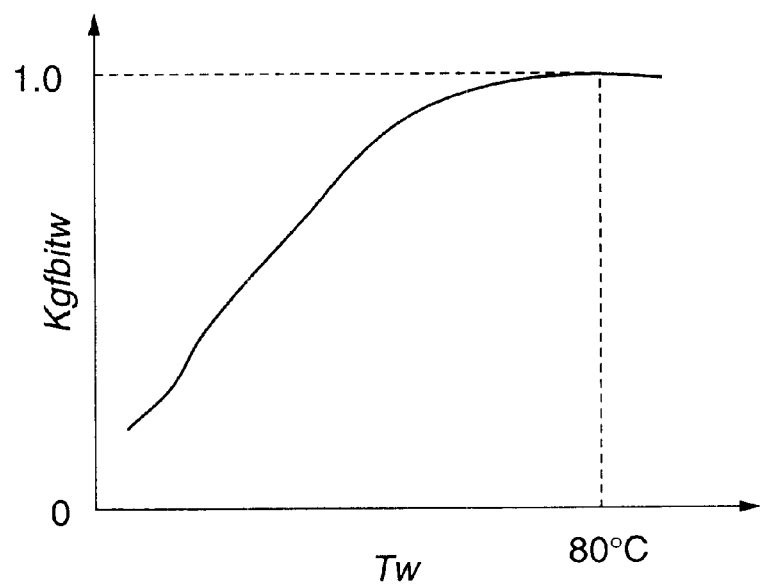
FIG. 59 is a diagram describing the contents of a map of a water temperature correction coefficient KgfbiTw stored by the control unit.

In a step S343, a water temperature correction coefficient KgfbiTw of the correction gain is calculated by looking up a map shown in FIG. 59 previously stored in the memory of the control unit 41, based on the cooling water temperature Tw.

In a following step S344, an error ratio Rqac0 is calculated by the following equation (21), using the correction gain Gkfbi and the water temperature correction coefficient KgfbiTw.

$$Rqac0=(tQacd/Qac-1)\cdot Gkfbi\cdot Kgfbitw+Rqac0_{n-1} \quad (21)$$

where, $Rqac0_{n-1}$=Rqac0 calculated on the immediately preceding occasion the subroutine was executed.

In a following step S245, by adding 1 to the error ratio Rqac0, the EGR flow velocity feedback correction coefficient Kqac0 is calculated. Therefore, the feedback correction coefficient Kqac0 of the EGR flow velocity is a value proportional to the integral of the error ratio.

Now, referring again to FIG. 50, after setting the feedback correction coefficient Kqac00 of the EGR amount and the feedback correction coefficient Kqac0 of the EGR flow velocity, in the step S259, the control unit 41 determines whether or not the learning value reflection permission flag felrn2 is 1.

Figures 60, 61:
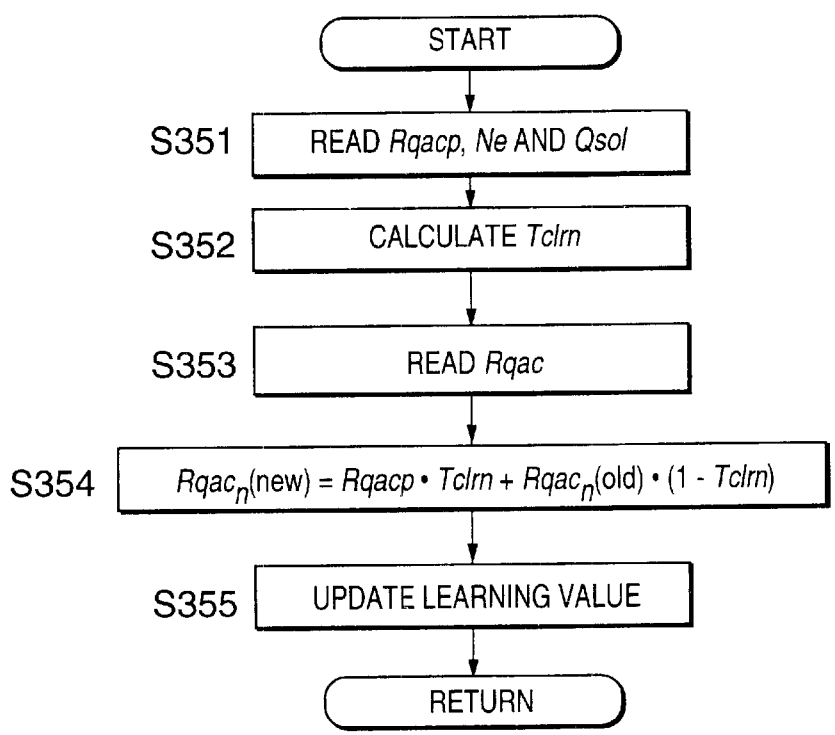
FIG. 60 is a diagram describing the contents of a map of an error rate learning value $Rqac_n$ stored by the control unit.
FIG. 61 is a flowchart describing a routine for updating a learning value performed by the control unit.

When the learning value reflection permission flag felrn2 is 1, i.e., when reflection in EGR amount control of the learning value is permitted, in a step S260, the control unit 41 reads the error ratio learning value $Rqac_n$ by looking up a map shown in FIG. 60 previously stored in the memory of the control unit 41, based on the engine rotation speed Ne and the target fuel injection amount Qsol. In a next step S261, the EGR flow velocity learning correction coefficient Kqac is calculated by adding 1 to the error ratio learning value $Rqac_n$.

When the learning value reflection permission flag felrn2 is not 1 in the step S259, the control unit 41 sets the EGR flow velocity learning correction coefficient Kqac to 1 in a step S262.

After the processing of the step S261 or step S262, in a step S263, the control unit 41 determines whether or not the learning permission flag felrn is 1.

When the learning permission flag felrn is 1, in a step S264, the control unit 41 subtracts 1 from the EGR flow velocity feedback correction coefficient Kqac0 to calculate the current value Rqacp of the error ratio. In a following step S266, the learning value is updated using the subroutine of FIG. 61, and the subroutine is terminated.

When the learning permission flag felrn is not 1, in a step S265, the control unit 41 resets the current value Rqacp of the error ratio to 0, and terminates the subroutine of FIG. 50.

Next, the updating of the learning value performed in the step S266 will be described.

Referring to FIG. 61, in a step S351, the control unit 41 first reads the engine rotation speed Ne, target fuel injection amount Qsol and error ratio Rqacp calculated in the step S264.

Figure 62:
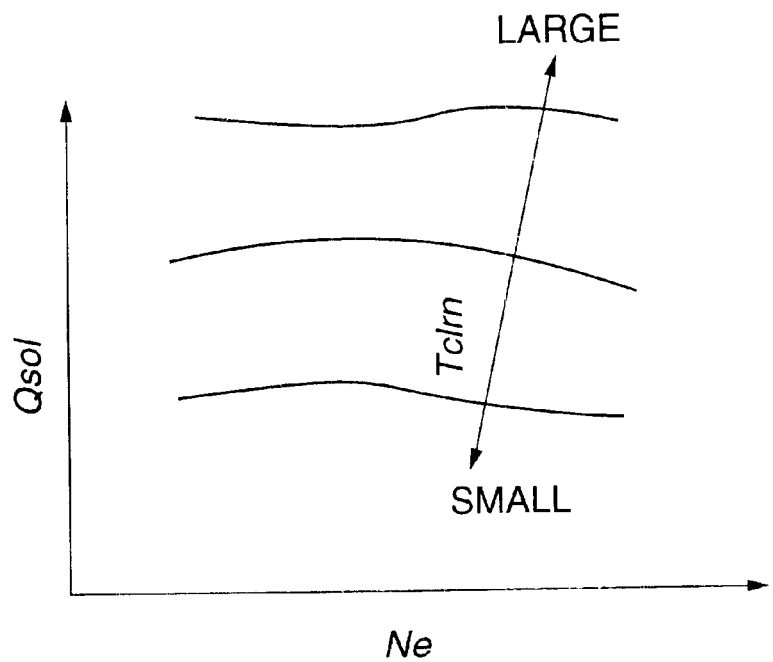
FIG. 62 is a diagram describing the contents of a map of a learning rate Tclrn stored by the control unit.

In a step S352, a learning rate Tclrn is calculated by looking up a map shown in FIG. 62 previously stored in the memory of the control unit 41, based on the engine rotation speed Ne and target fuel injection amount Qsol.

In a step S353, the error ratio learning value $Rqac_n$ is calculated by looking up the aforesaid map of FIG. 60, based on the engine rotation speed Ne and target fuel injection amount Qsol.

In a following step S354, weighted average processing by the following formula (22) is added to the error ratio Rqacp read in the step S351, and updating of the error ratio learning value is performed.

$$Rqac_n(new)=Rqacp\cdot Tclrn+Rqac_n(old)\cdot(1-Tclrn) \quad (22)$$

where, $Rqac_n$(new)=error ratio learning value $Rqac_n$ to be written on the map, Rqacp=error ratio read in the step S351, and $Rqac_n$(old)=error ratio learning value $Rqac_n$ read from the map in the step S353.

In a next step S355, the stored value of the map of FIG. 60 is overwritten using the error ratio learning value $Rqac_n$ (new) calculated in this way.

Figure 5:
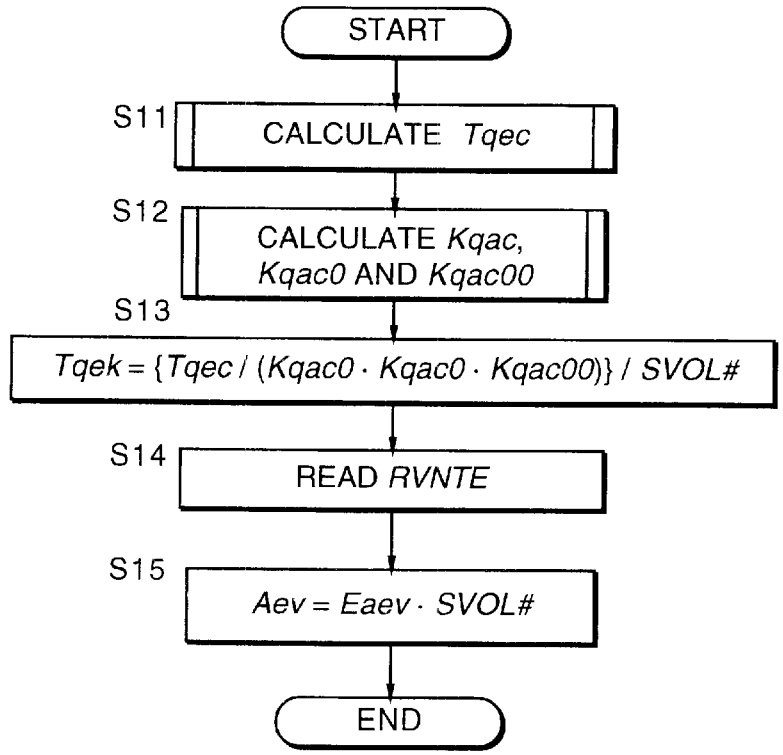
FIG. 5 is a flowchart describing a routine for calculating an EGR valve opening area Aev performed by the control unit.

By terminating the subroutine of FIG. 50, the control unit 41 terminates the processing of the step S12 of the main routine of FIG. 5.

Referring again to FIG. 5, after the processing of the step S12, the control unit 41 performs the processing of a step S13.

In the step S13, the target EGR amount Tqek per cylinder of the diesel engine 1 is calculated by the following equation (23), using the target EGR amount Tqec calculated in the step S11, the flow velocity learning correction coefficient Kqac, the EGR flow velocity feedback correction coefficient Kqac0, and the EGR amount feedback correction coefficient Kqac00 calculated in the step S12.

$$Tqek=\{Tqec/(Kqac0\cdot Kqac0\cdot Kqac00)\}/SVOL\# \quad (23)$$

where,

SVOL#=piston displacement of cylinder.

In a following step S14, the delay processing value RVNTE of the target opening Rvnt is read.

Figure 63:
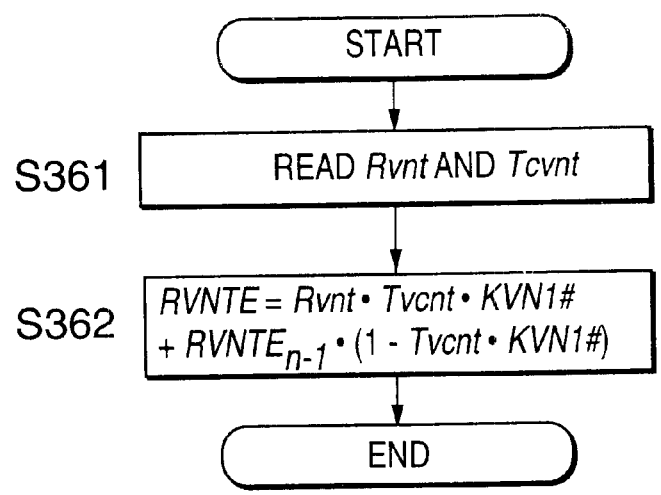
FIG. 63 is a flowchart describing a routine for calculating a delay processing value RVNTE performed by the control unit.

The delay processing value RVNTE is a value obtained by adding delay processing by the routine shown in FIG. 63, performed in synchronism with the REF signal, to the target opening Rvnt calculated by the aforesaid routine of FIG. 25.

Describing the routine of FIG. 63, in a step S361, the control unit 41 reads the target opening Rvnt, and advance correction time constant equivalent value Tcvnt set in the step S144 of the subroutine in FIG. 29 for controlling turbocharging pressure. The advance correction time constant equivalent value Tcvnt is a value for correcting the operating delay of the variable nozzle 53, as mentioned above.

In a next step S362, the delay processing value RVNTE is calculated by the following equation (24) from the target opening Rvnt, and the advance correction time constant equivalent value Tcvnt:

$$RVNTE=Rvnt\cdot Tcvnt\cdot KVN1\#+RVNTE_{n-1}\cdot(1-Tcvnt\cdot KVN1\#) \quad (24)$$

where,

KVN1#=constant, and $RVNTE_{n-1}$=RVNTE calculated on the immediately preceding occasion the subroutine was executed.

The delay processing value RVNTE calculated by the formula (24) shows the actual opening of the variable nozzle 53 corresponding to the duty signal output to the pressure control valve 56 by the control unit 41.

Figure 64:
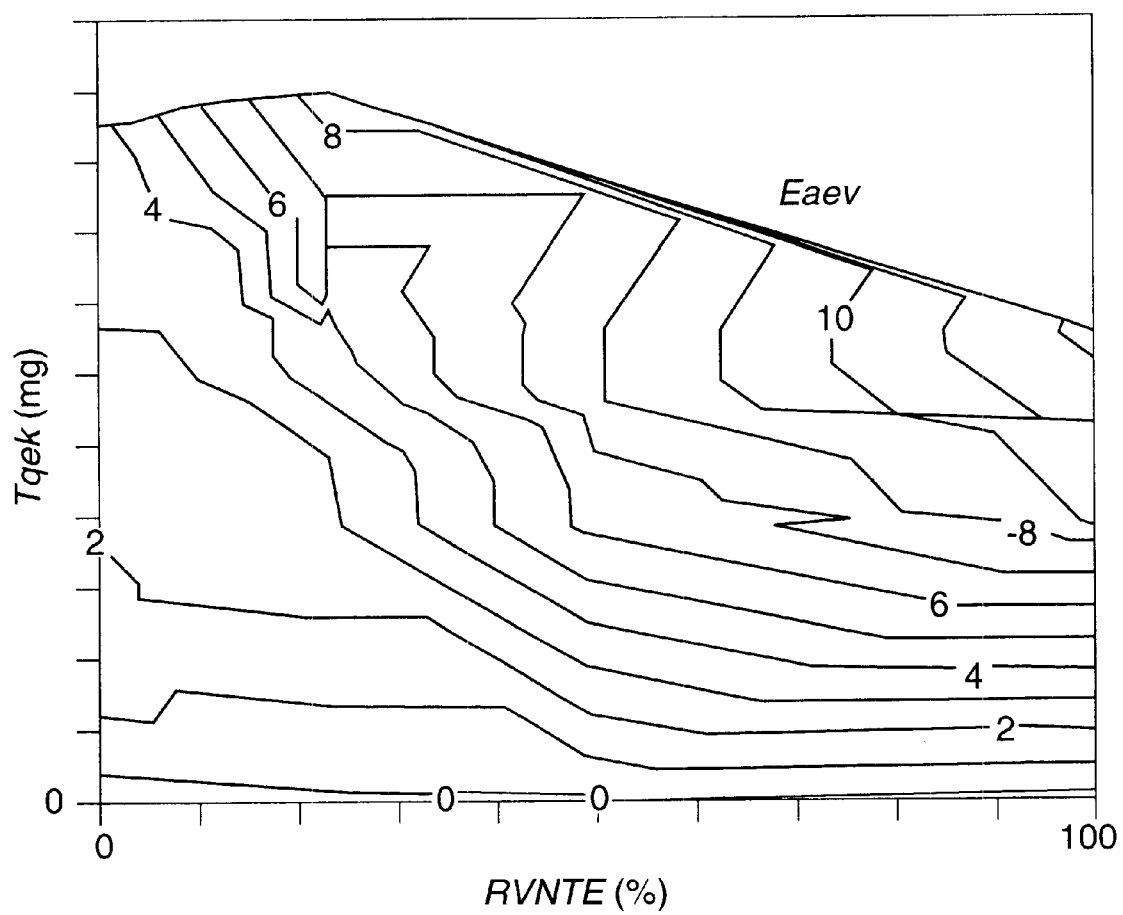
FIG. 64 is a diagram describing the contents of a map of experimental values of an exhaust gas recirculation valve opening area per unit exhaust amount stored by the control unit.

After reading the delay processing value RVNTE calculated in this way in the step S14 of FIG. 5, in a step S15, the control unit 41 calculates an opening area EAev per unit displacement by looking up a map shown in FIG. 64, based on the delay processing value RVNTE and the target EGR amount Tqek per cylinder of the diesel engine 1.

In the map of FIG. 64, the delay processing value RVNTE which is the horizontal axis, may be considered to be approximately equal to the differential pressure upstream and downstream of the EGR valve 6. For example, providing that the opening of the EGR valve 6 is set constant, the smaller the delay processing value RVNTE, the larger the opening of the variable nozzle 53 and the higher the turbocharging pressure. Consequently, the differential pressure upstream and downstream of the EGR valve 6 becomes large. Conversely, the larger the delay processing value RVNTE, the larger the opening of the variable nozzle 53 and the lower the turbocharging pressure. Consequently, the differential pressure upstream and downstream of the EGR valve 6 decreases.

Thus, the delay processing value RVNTE which is the horizontal axis may be considered to represent the differential pressure upstream and downstream of the EGR valve 6. By taking the EGR amount as the vertical axis, the opening of the EGR valve 6 can be specified with these parameters as can be understood from the map of FIG. 64.

The figures in FIG. 64 are temporary value assigned to show the relative magnitude of the opening of the EGR valve 6.

Figure 65:
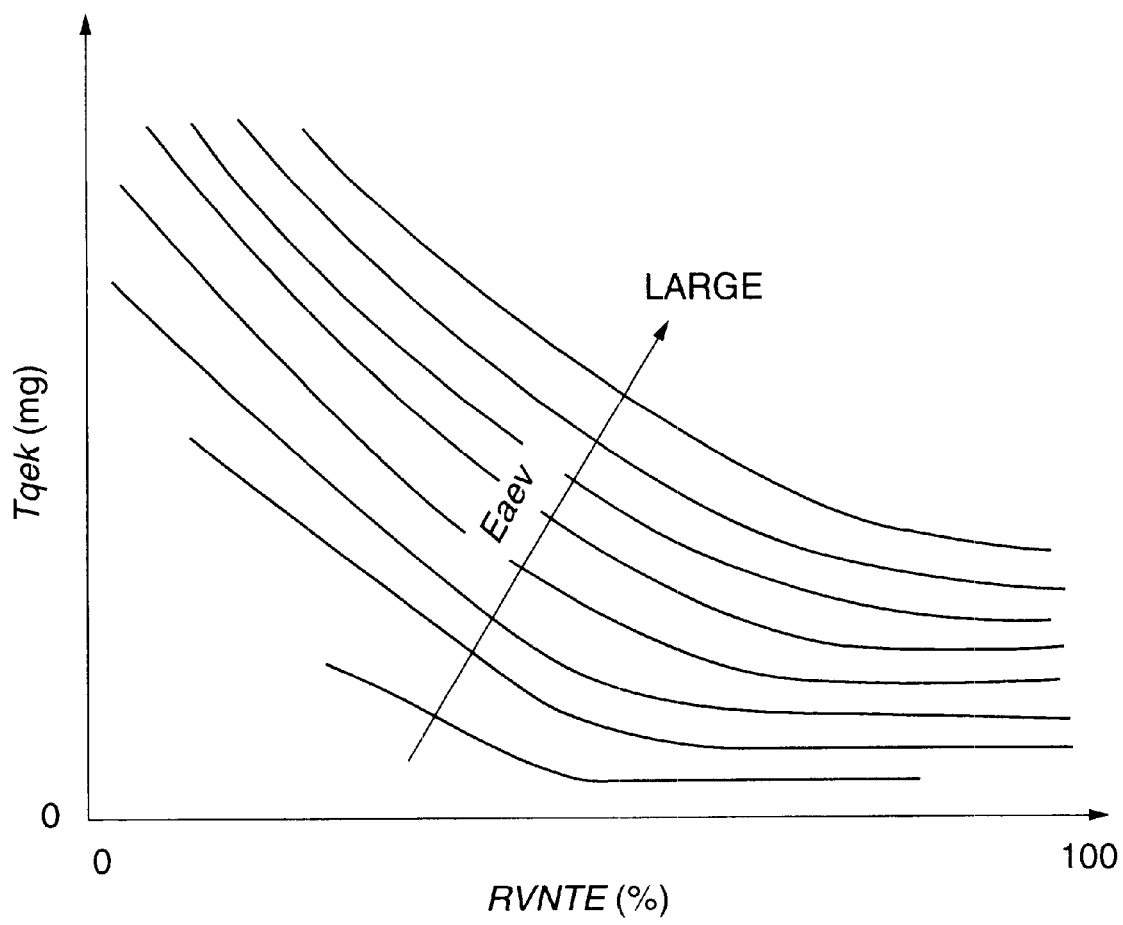
FIG. 65 is similar to FIG. 64, but showing theoretical values.

The inventors obtained the map of FIG. 64 by experiment, but the EGR valve opening area Aev may also be determined using a theoretically defined map as shown in FIG. 65.

In FIG. 64 and FIG. 65, the characteristics largely differ in the region of the right-hand side of the map, but as control is not actually performed in this region, there is no effect on the control whichever map is used.

What is read from these maps is not the opening area of the EGR valve 6, but the target EGR valve opening area EAev per unit piston displacement. This is in order to be able to apply the map without depending on the displacement of the diesel engine 1.

After the control unit 41 calculates the target EGR valve opening area EAev per unit displacement volume in the step S15 of FIG. 5, the target EGR valve opening area Aev is calculated by multiplying EAev by the displacement SLOV# of the diesel engine 1 in a step S16, and the routine of FIG. 5 is terminated.

Figure 6:
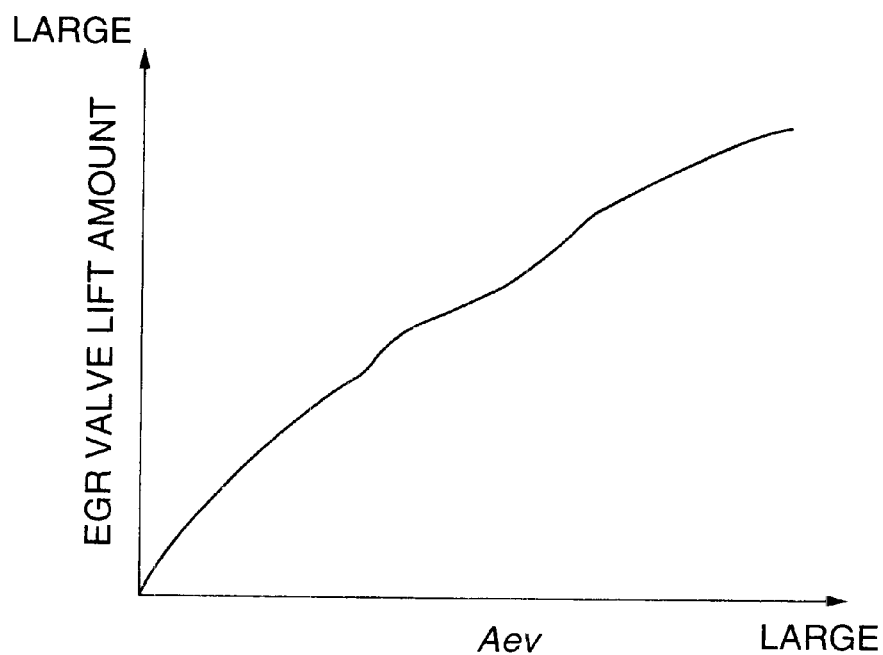
FIG. 6 is a diagram describing the contents of an EGR valve lift amount map stored by the control unit.

The target EGR valve opening area Aev obtained by the routine of FIG. 5 is converted for example to a lift amount or a drive signal of the EGR valve 6 using a map of FIG. 6. The control unit 41 controls the opening of the EGR valve 6 to the target EGR valve opening area Aev by outputting a corresponding duty signal to the pressure control valve 5 which drives the EGR valve 6 to realize the target EGR amount Tqek. This invention calculates the target EGR valve opening area Aev taking the delay processing value RVNTE corresponding to the real opening of the variable nozzle 53 of the turbocharger 50 as a parameter. Therefore, EGR control of the diesel engine in the turbocharging state can be optimized by simple logic.

Further, the pressure control valve 5 of the EGR valve 6 is controlled based on the target EGR valve opening area Aev, and if the pressure control valve 5 is changed to an electrical actuator, for example, provision can be made for the change-over to an actuator simply by replacing the map which converts the target EGR valve opening area Aev to the control signal of the pressure control valve 5, by a map which converts the target EGR valve opening area Aev to a control signal of the actuator.

In the map of FIG. 64 used in the calculation of the target EGR valve opening area Aev, the delay processing value RVNTE on the vertical axis and target EGR amount Tqek on the horizontal axis are both physical state amounts.

Therefore, the target EGR valve opening area Aev can be adapted to any situation where these physical state amounts are known including transient states of the diesel engine 1.

In transient states such as acceleration or deceleration, as there is a delay in the operation of the variable nozzle 53 of the turbocharger 50, a delay occurs in the variation of the real opening of the variable nozzle 53 relative to the target opening Rvnt which is calculated. However, according to this invention, the delay processing value RVNTE representing the real opening is further calculated by adding delay processing to the target opening Rvnt, and the target EGR valve opening area Aev is calculated based on the delay processing value RVNTE. Hence, precise EGR control can be performed even in transient states.

The size of the EGR valve 6 is usually selected to be directly proportional to the exhaust gas amount of the diesel engine 1, but according to this invention, the target EGR valve opening area Aev is calculated as the product of the target EGR valve opening area EAev per unit displacement volume and the piston displacement SLOV#, so it is easy to adapt to diesel engines having different displacements.

Next, referring to FIG. 16, a second embodiment of this invention will be described relating to the pressure control of the turbocharger 50.

Figure 16:
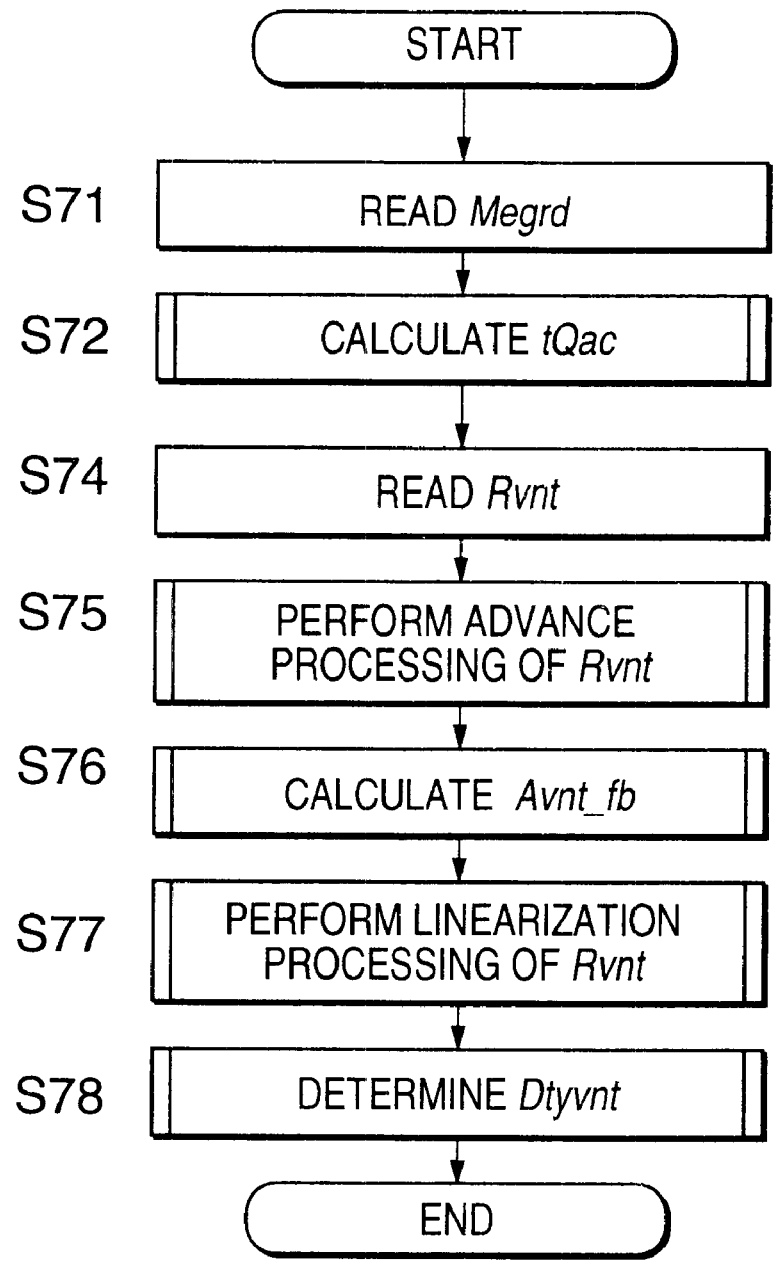
FIG. 16 is similar to FIG. 15, but showing a second embodiment of this invention.

According to this embodiment, a routine shown in FIG. 16 is used instead of the routine of FIG. 15 for calculating the duty value Dtyvnt of the pressure control valve of the turbocharger. As in the case of the routine of FIG. 15, the routine of FIG. 16 is also performed at an interval of 10 milliseconds.

In the routine of FIG. 15, the target opening Rvnt of the variable nozzle 53 was calculated based on the real EGR amount Qec, but in the routine of FIG. 16, the target opening Rvnt is calculated based on the real EGR rate Megrd.

Figure 27:
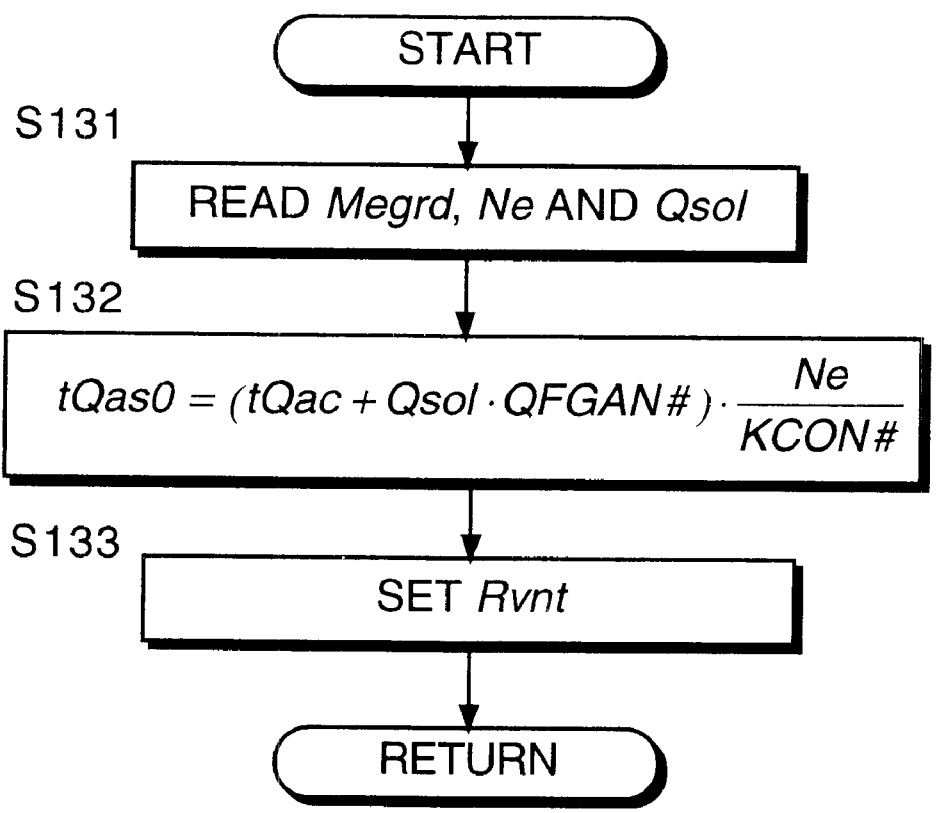
FIG. 27 is similar to FIG. 25, but showing the second embodiment of this invention.

Specifically, in the routine of FIG. 16, the processing of the step S73 of FIG. 15 which calculates the real EGR amount Qec, is omitted. At the same time, the routine shown in FIG. 27 is applied instead of the routine shown in FIG. 25 in the calculation of the target opening Rvnt of the variable nozzle 53. The remaining processing details are identical to those of the first embodiment.

Referring to FIG. 27, in a step S131, the control unit 41 reads the target intake air amount Qtac, real EGR rate Megrd, engine rotation speed Ne and target fuel injection amount Qsol.

In a step S132, an identical calculation is performed to that of the step S122 of FIG. 15, and the intake air amount equivalent value tQas0 is calculated.

Figure 28:
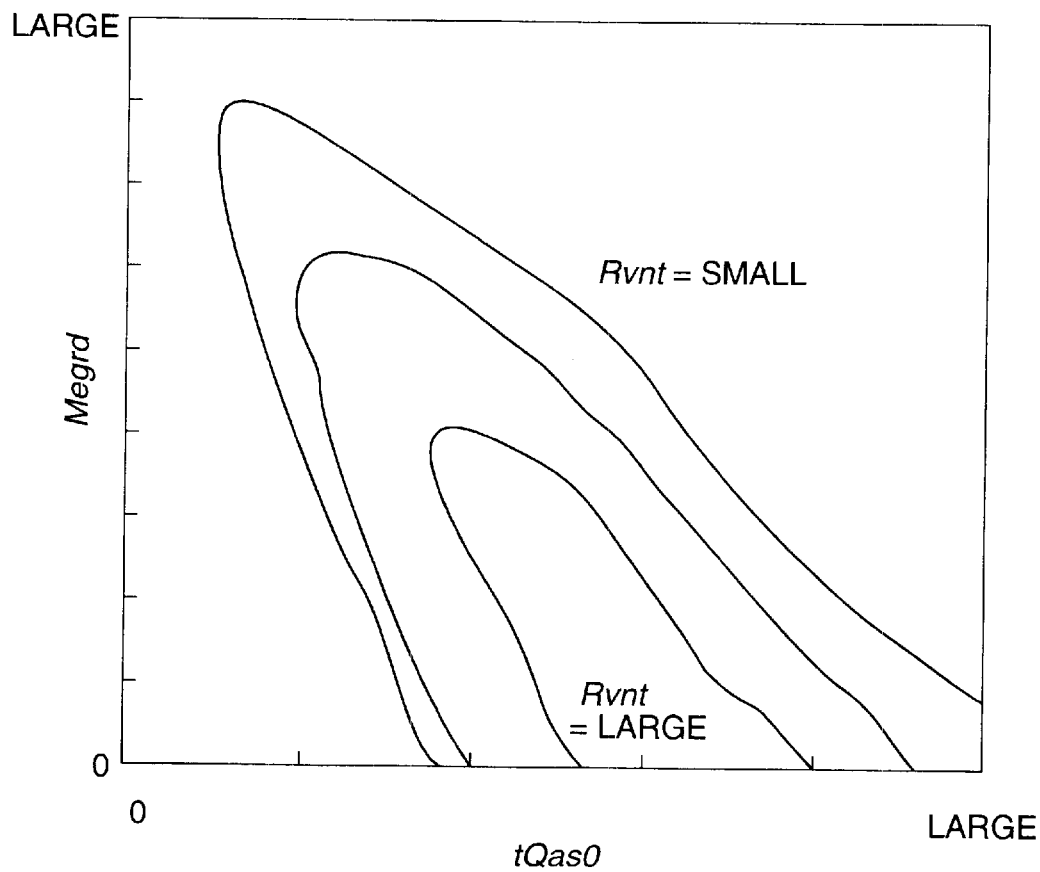
FIG. 28 is similar to FIG. 26, but showing the second embodiment of this invention.

In a step S133, the target opening Rvnt of the variable nozzle 53 is calculated by looking up a map shown in FIG. 28 previously stored in the memory of the control unit 41, based on the intake air amount equivalent value tQas0 and real EGR rate Megrd.

In the map of FIG. 26 of the first embodiment, the vertical axis represents the EGR rate equivalent value Qes0, but in the map of FIG. 28, the vertical axis represents the real EGR rate Megrd. The two maps differ only with regard to these parameters, and the characteristics of the target opening Rvnt obtained are identical whichever map is used.

The map used to calculate the target opening Rvnt may be specified using various parameters in addition to the above.

For example, in the map of FIG. 26, instead of the EGR amount equivalent value Qes0 on the vertical axis, the real EGR amount Qec or the EGR amount Qec0 per cylinder at the inlet of the collector 3A may be taken. In a map of FIG. 28, instead of the intake air amount equivalent value tQas0 on the horizontal axis, the target intake air amount tQac may be taken. Further, instead of the real EGR rate Megrd on the vertical axis, the target EGR rate Megr may be taken.

The contents of Tokugan Hei 2000-139929, with a filing date of May 12, 2000 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, in all the above embodiments, the target EGR valve opening area Aev was calculated using the delay processing value RVNTE corresponding to the real opening of the variable nozzle 53 of the turbocharger 50 as a parameter, but it will be understood that it is also within the scope of the invention to detect the real opening of the variable nozzle 53 by a sensor, and to calculate the target EGR valve opening area Aev using the detected real opening as a parameter. If the variable nozzle 53 is driven by a step motor, the step number of the step motor may be used as a representative value for the real opening of the variable nozzle 53.

In an exhaust gas turbine of a turbocharger, the turbocharging pressure is varied by varying the surface area across which the exhaust gas passes. Therefore, in addition to the variable nozzle, the turbocharging pressure can be varied also by varying the opening of a scroll or diffuser. This type of variable capacity turbocharger is referred to as a variable geometric turbocharger. In an engine provided with a variable geometric turbocharger, the target EGR valve opening area Aev can be calculated based on the substantial cross-sectional area of the exhaust gas passage of the exhaust gas turbine as a parameter.

Further, in a fixed capacity turbocharger having a waste-gate valve for bypassing part of the exhaust gas, the turbocharging pressure may be varied by opening and closing the waste gate valve. In this case, although the cross-sectional area of the exhaust gas passage of the exhaust gas turbine does not change due to the opening and closing of the waste gate valve, the pressure variation may be converted into a variation of an apparent cross-sectional area of the exhaust gas passage, and the target EGR valve opening area Aev calculated using the converted value as a parameter.

In other words, even using an EGR device which is used in conjunction with a turbocharger having a turbocharging pressure adjusting mechanism other than a variable nozzle, if a parameter identical to the opening of the variable nozzle can be detected, precise EGR amount control corresponding to the variation of the turbocharging pressure can be realized by applying this invention.

The embodiments of this invention in which an exclusive property or privilege is claimed are defined as follows:

What is claimed is:

1. A control device for an engine, the engine comprising an intake passage, an exhaust passage and a turbocharger having an exhaust gas turbine in the exhaust passage and turbocharging an intake air in the intake passage according to a rotation of an exhaust gas turbine, the exhaust gas turbine having an adjusting mechanism of a cross-sectional area of an exhaust gas flow in the exhaust gas turbine, and an exhaust gas recirculation valve which recirculates part of an exhaust gas in the exhaust passage upstream of the exhaust gas turbine to the intake passage, the control device comprising:

a sensor which detects a running condition of the engine;

a sensor which detects the cross-sectional area; and a microprocessor programmed to:
determine a target recirculation amount of the exhaust gas recirculation valve according to the running condition;
calculate a target control value of the exhaust gas recirculation valve based on the target recirculation amount and the cross-sectional area; and
control the exhaust gas recirculation valve according to the target control value.

2. The control device as defined in claim 1, wherein the cross-sectional area detecting sensor comprises a microprocessor programmed to set an operating target value of the adjusting mechanism based on the running condition, control the adjusting mechanism according to the operating target value, and calculate the cross-sectional area based on the operating target value.

3. The control device as defined in claim 2, wherein the microprocessor is further programmed to calculate the cross-sectional area by performing a predetermined delay processing on the operating target value.

4. The control device as defined in claim 2, wherein the adjusting mechanism comprises a variable nozzle which introduces the exhaust gas in the exhaust passage into the gas turbine, and the operating target value is a target opening of the variable nozzle.

5. The control device as defined in claim 4, wherein the device further comprises an actuator which operates the exhaust gas recirculation valve, and the microprocessor is further programmed to calculate a target exhaust gas recirculation valve opening as the target control value, and control the exhaust gas recirculation valve by outputting a command signal corresponding to the target exhaust gas recirculation valve opening to the actuator.

6. The control device as defined in claim 5, wherein the microprocessor is further programmed to calculate a target exhaust gas recirculation valve opening area per unit displacement from the target recirculation amount and the cross-sectional area, and calculate the target exhaust gas recirculation opening by multiplying the target exhaust gas recirculation valve opening area per unit displacement by a displacement of the engine.

7. The control device as defined in claim 6, wherein the microprocessor is further programmed to calculate the target exhaust gas recirculation valve opening area per unit displacement to be a larger value, as the target recirculation amount becomes larger.

8. The control device as defined in claim 6, wherein the microprocessor is further programmed to calculate the target exhaust gas recirculation valve opening area per unit displacement to be a larger value, as the cross-sectional area becomes smaller.

9. The control device as defined in claim 1, wherein the engine running condition detecting sensor comprises a sensor which detects a rotation speed of the engine, a sensor which detects a fuel injection amount of the engine, and a sensor which detects a cooling water temperature of the engine.

10. The control device as defined in claim 1, wherein the engine comprises a diesel engine.

11. A control device for an engine, the engine comprising an intake passage, an exhaust passage and a turbocharger having an exhaust gas turbine in the exhaust passage and turbocharging an intake air in the intake passage according to a rotation of an exhaust gas turbine, the exhaust gas turbine having an adjusting mechanism of a cross-sectional area of an exhaust gas flow in the exhaust gas turbine, and an exhaust gas recirculation valve which recirculates part of an exhaust gas in the exhaust passage upstream of the exhaust gas turbine to the intake passage, the control device comprising:

means for detecting a running condition of the engine;

means for detecting the cross-sectional area;

means for determining a target recirculation amount of the exhaust gas recirculation valve according to the running condition;

means for calculating a target control value of the exhaust gas recirculation valve based on the target recirculation amount and the cross-sectional area; and means for controlling the exhaust gas recirculation valve according to the target control value.

12. A control method for an engine, the engine comprising an intake passage, an exhaust passage and a turbocharger having an exhaust gas turbine in the exhaust passage and turbocharging an intake air in the intake passage according to a rotation of an exhaust gas turbine, the exhaust gas turbine having an adjusting mechanism of a cross-sectional area of an exhaust gas flow in the exhaust gas turbine, and an exhaust gas recirculation valve which recirculates part of an exhaust gas in the exhaust passage upstream of the exhaust gas turbine to the intake passage, the control method comprising:

detecting a running condition of the engine;

detecting the cross-sectional area;

determining a target recirculation amount of the exhaust gas recirculation calculating a target control value of the exhaust gas recirculation valve based on the target recirculation amount and the cross-sectional area; and controlling the exhaust gas recirculation valve according to the target control value.

* * * * *